US005992318A

United States Patent [19]

DiBello et al.

[11] Patent Number: 5,992,318

[45] Date of Patent: Nov. 30, 1999

[54] SYSTEM FOR MAINTAINING INK DENSITY

[75] Inventors: Dominick J. DiBello, Pleasant Valley; Thomas J. Ham, Jr., Kingston; Bruce McKenna, Peekskill, all of N.Y.

[73] Assignee: Perretta Graphics Corporation, Poughkeepsie, N.Y.

[21] Appl. No.: 08/738,193

[22] PCT Filed: Oct. 11, 1994

[86] PCT No.: PCT/US94/11388

§ 371 Date: Jul. 16, 1998

§ 102(e) Date: Jul. 16, 1998

[87] PCT Pub. No.: WO95/11806

PCT Pub. Date: May 4, 1995

Related U.S. Application Data

[63] Continuation-in-part of application No. 08/141,991, Oct. 28, 1993, abandoned.

[51] Int. Cl.[6] ........................ B41F 33/16; B41F 31/00; G01J 3/46

[52] U.S. Cl. ........................ 101/181; 101/DIG. 45

[58] Field of Search ........................ 101/181, 180, 101/365, 138, 216, 228, 177, 221, 179, 186, 183, 211, DIG. 47, 45; 250/559.01, 559.04, 559.06, 559.39; 395/106, 104; 382/165, 112; 356/407, 408, 429, 445

[56] References Cited

U.S. PATENT DOCUMENTS 4,003,660 1/1977 Christie, Jr. et al. ............... 101/181 X
4,681,455 7/1987 Jeschke et al. ......................... 356/445
4,794,453 12/1988 Gnuechtel et al. ................. 101/365 X
5,029,527 7/1991 Jeschke et al. ......................... 101/365
5,122,977 6/1992 Pfeiffer .................................... 101/211
5,128,879 7/1992 Greve et al. ............................ 382/112
5,141,323 8/1992 Kipphan et al. .................... 356/407 X

*Primary Examiner*—J. Reed Fisher
*Attorney, Agent, or Firm*—Joseph L. Spiegel

[57] ABSTRACT

The invention is a system for a printing press which maintains the density of the colored ink put down on a moving paper web. The system includes a scanning device having a strobe light for illuminating a color patch in a color bar which runs transversely across the web, a camera for photographing the illuminated color patch and a step motor for moving the scanner incrementally across the web. Actuation of the scanner is timed through a microprocessor using input from an optical sensor and encoder. A signal is sent from the camera to a computer which determines the density of the color patch shot. A work station calculates how much the existing ink control console must be adjusted to maintain density and a command signal is sent from the work station to the console to effect the adjustment. Lateral movement of the scanning means is offset or adjusted dependent on signals received from edge detectors, located at the press infeed and at the closed loop roller stand, to compensate for web lateral movement or distortion.

16 Claims, 44 Drawing Sheets

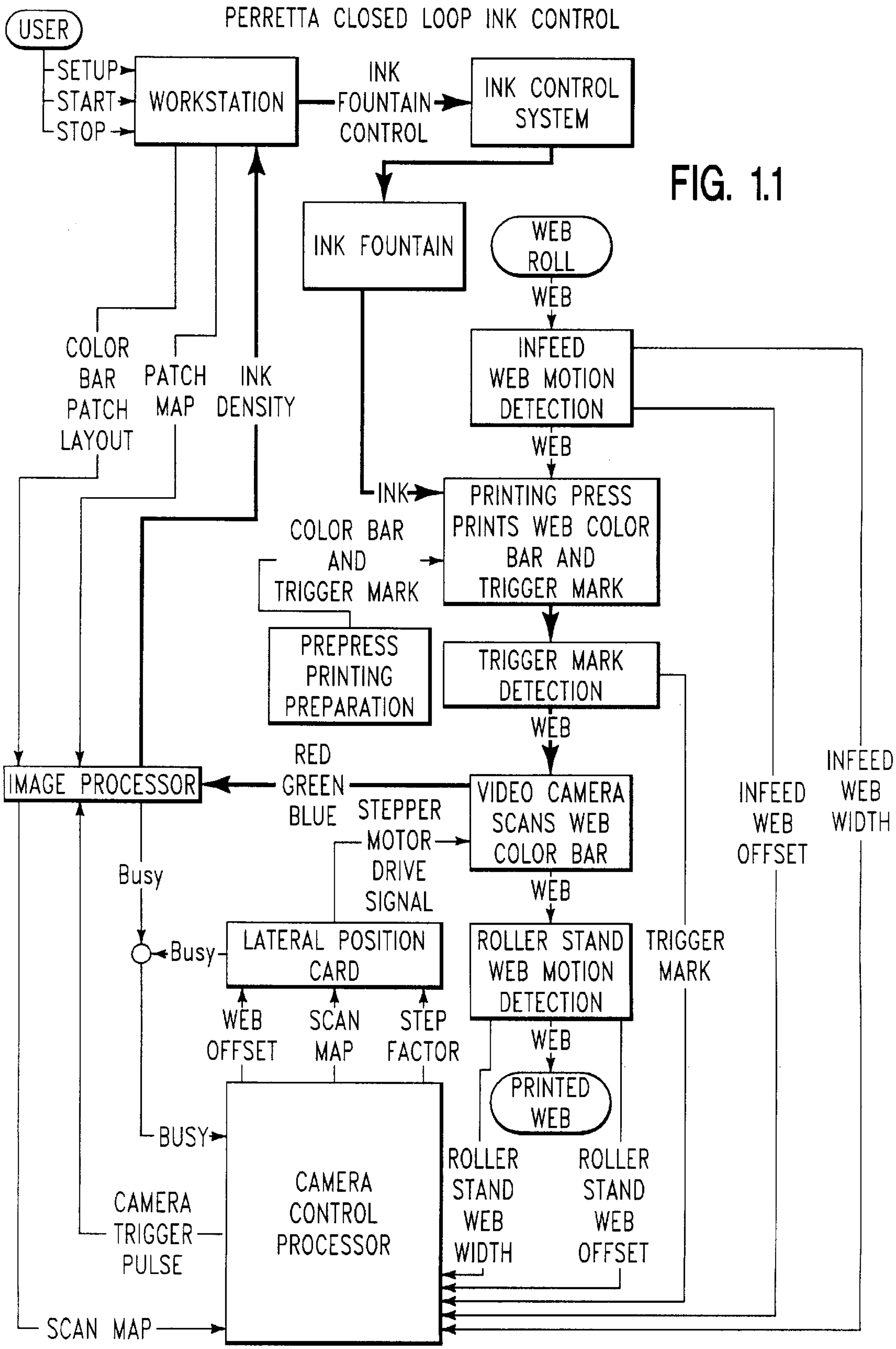
FIG. 1.1

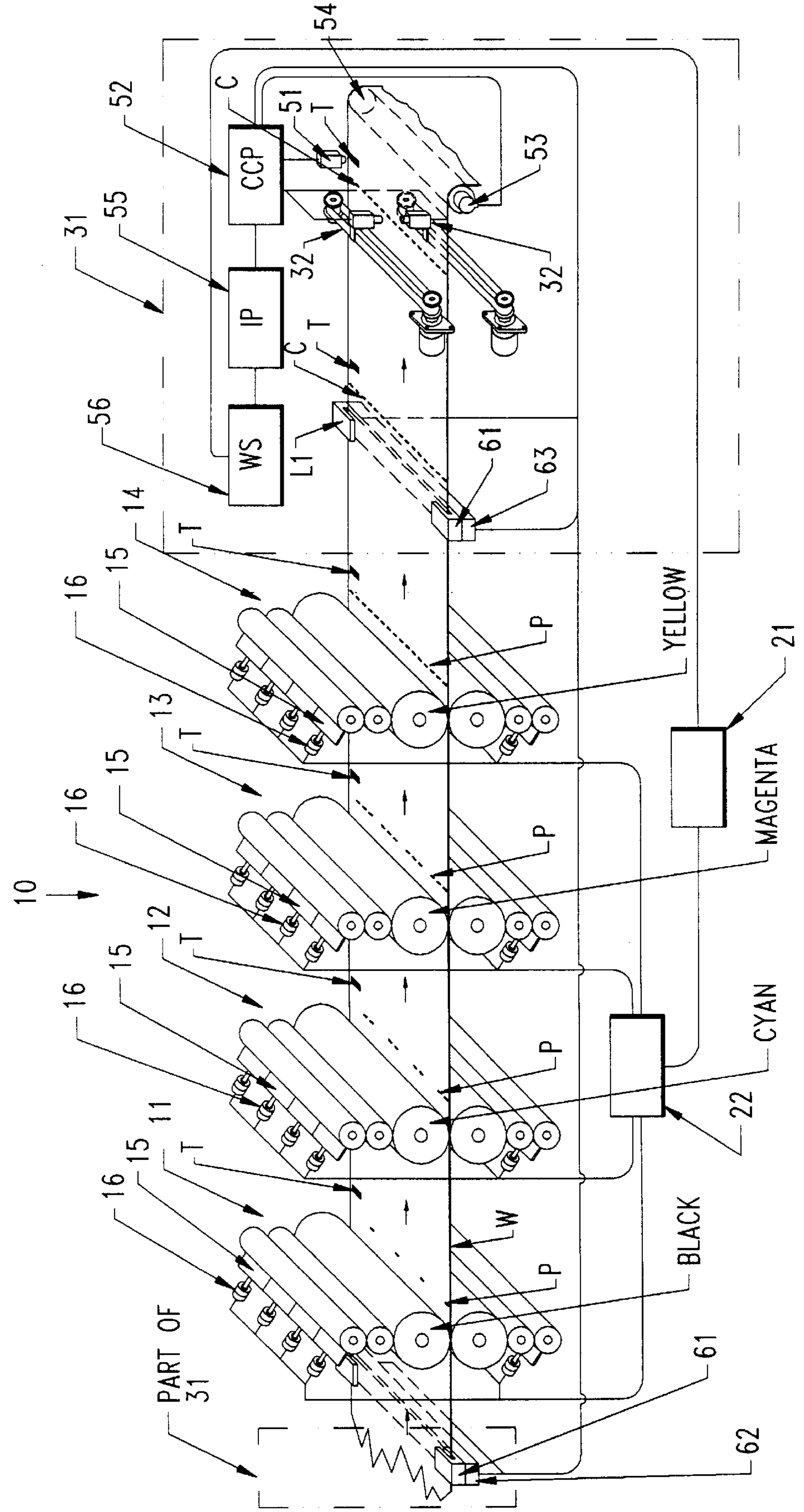
FIG. 2.1

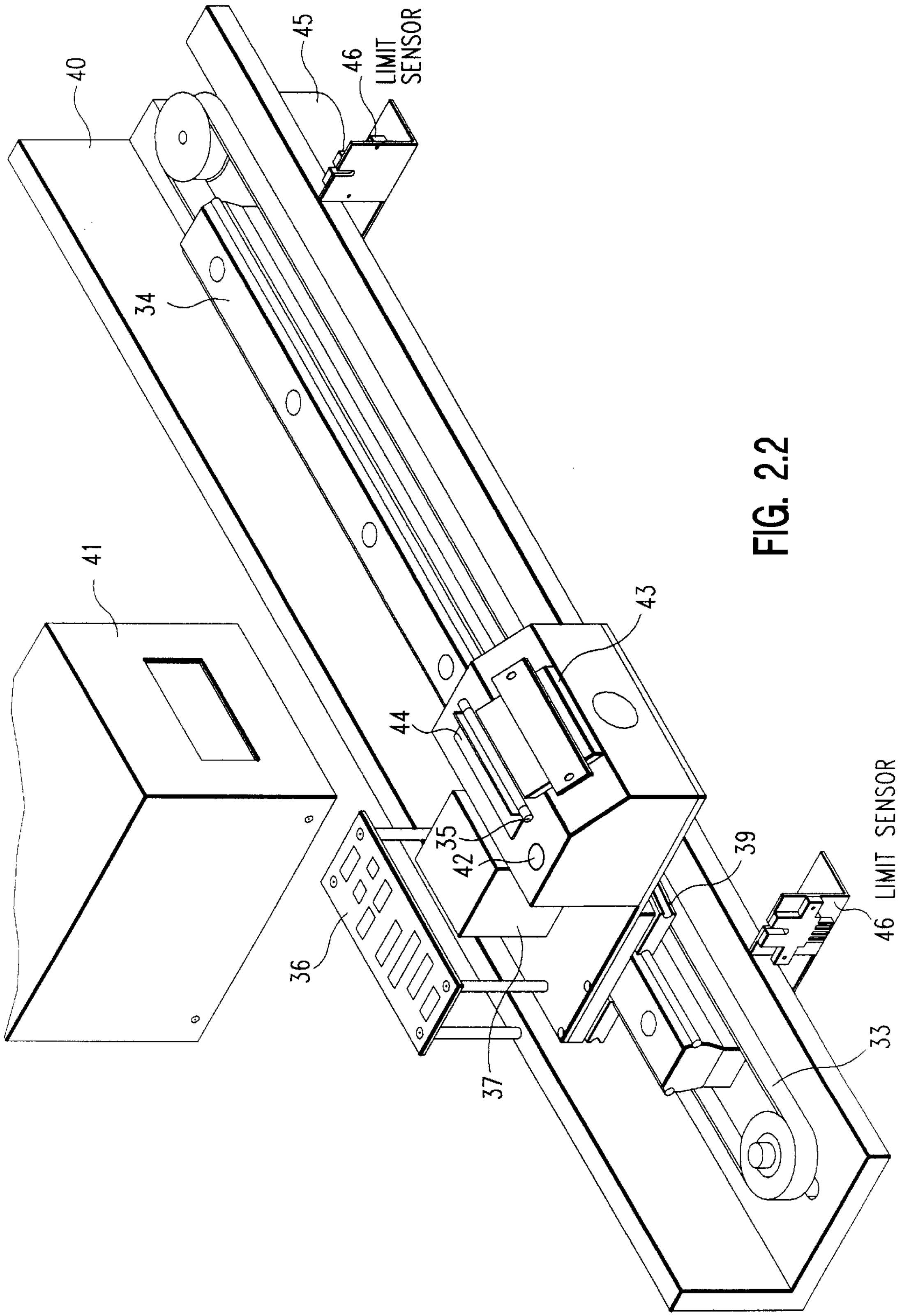
FIG. 2.2

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| C 100% | C 50% | M 100% | M 50% | Y 100% | Y 50% | K 100% | K 50% | C 100% | PAPER | M 100% | PAPER | Y 100% | PAPER | K 100% | PAPER |

| 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|
| C 100% | C 75% | M 100% | M 75% | Y 100% | Y 75% | K 100% | K 75% | C 100% | PAPER | M 100% | PAPER | Y 100% | PAPER | K 100% | PAPER |

FIG. 3.1

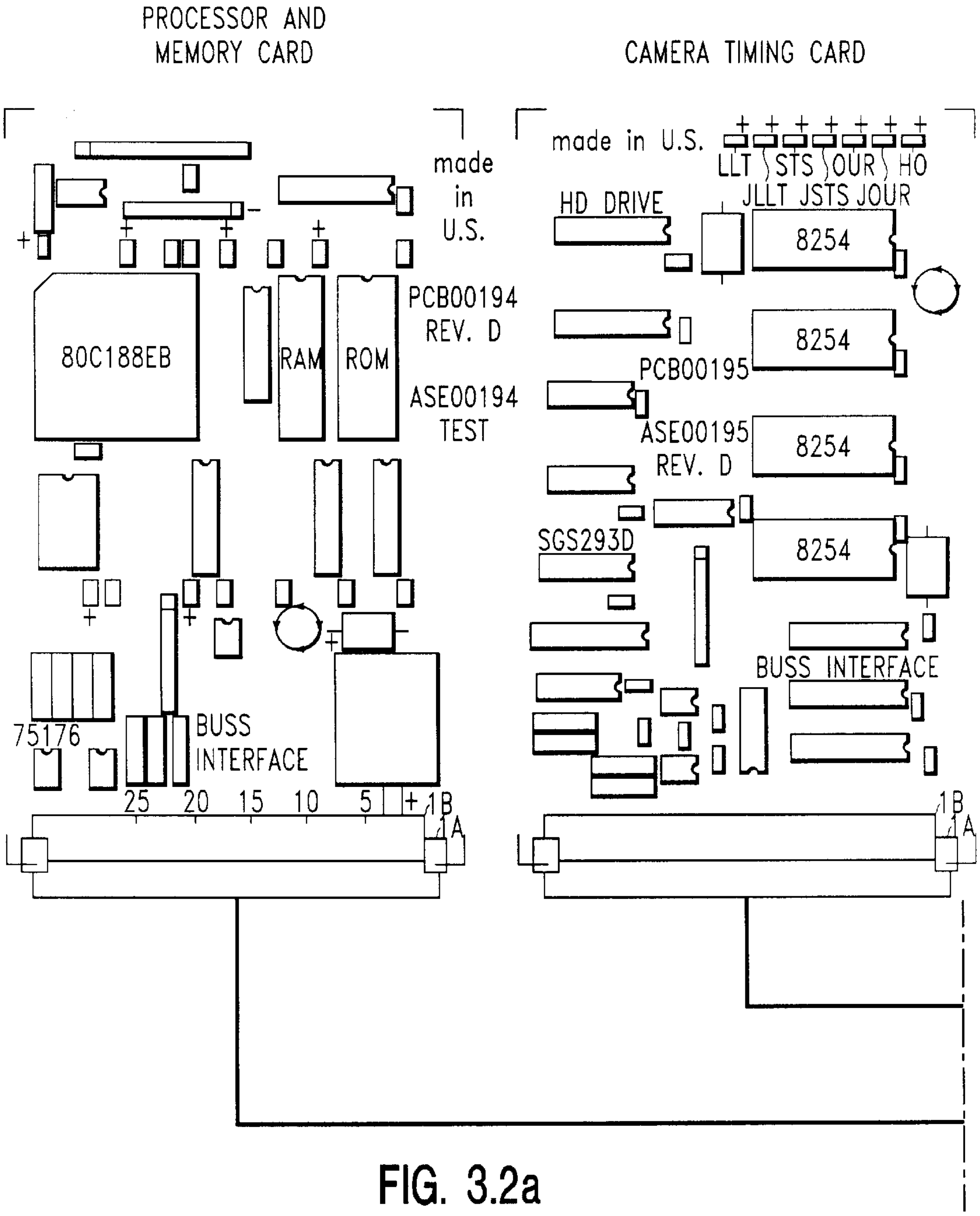
FIG. 3.2a

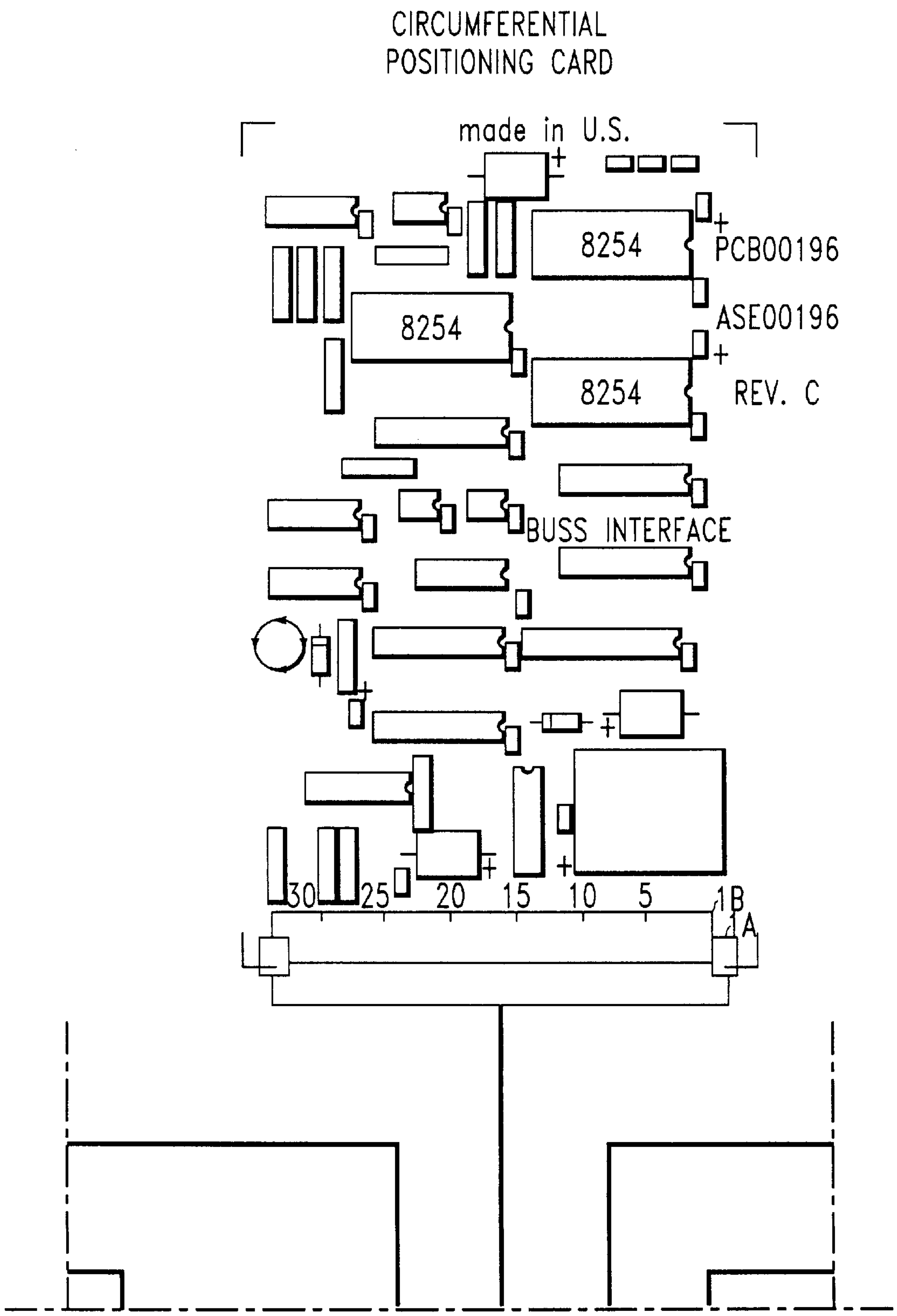
FIG. 3.2b

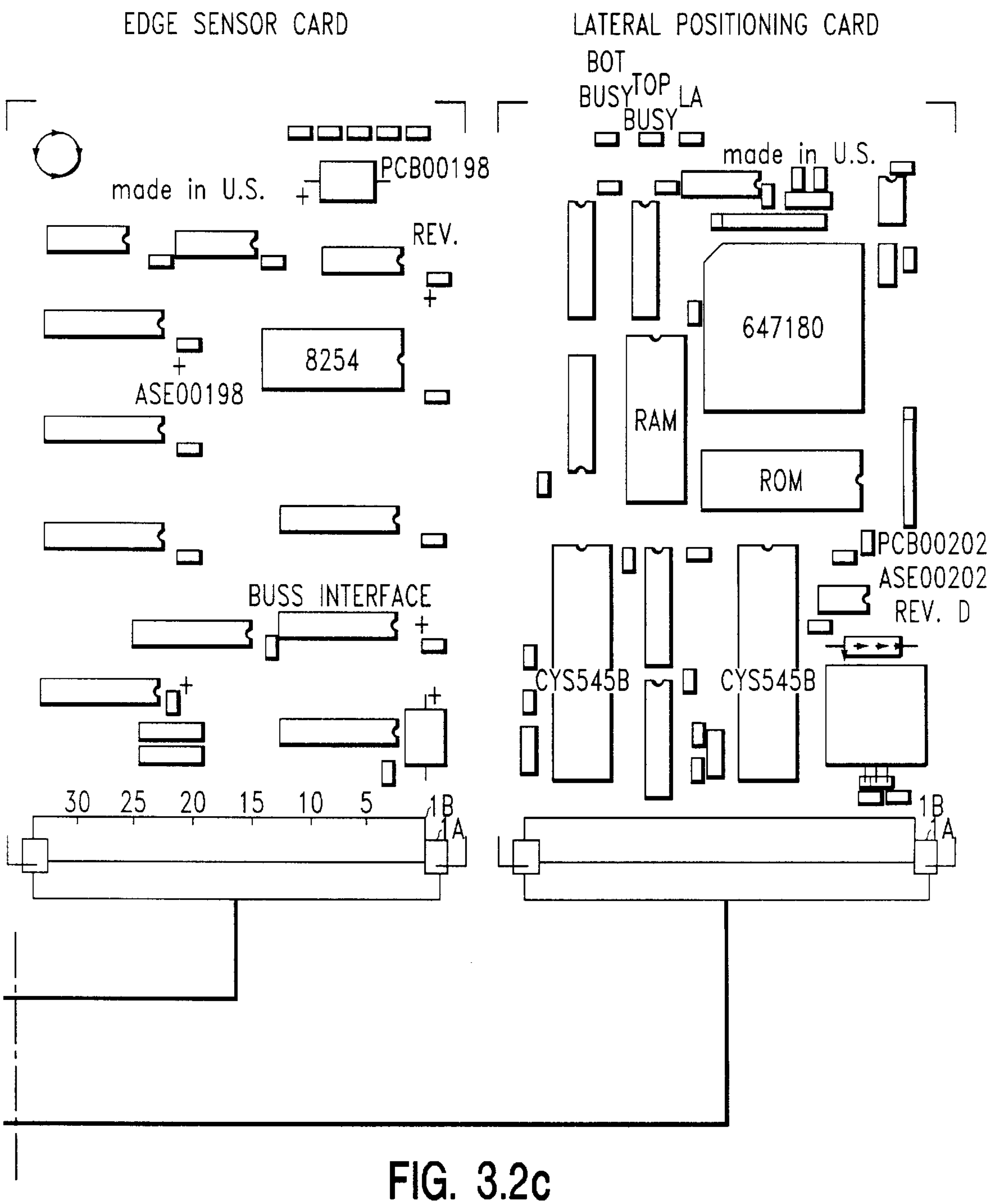
FIG. 3.2c

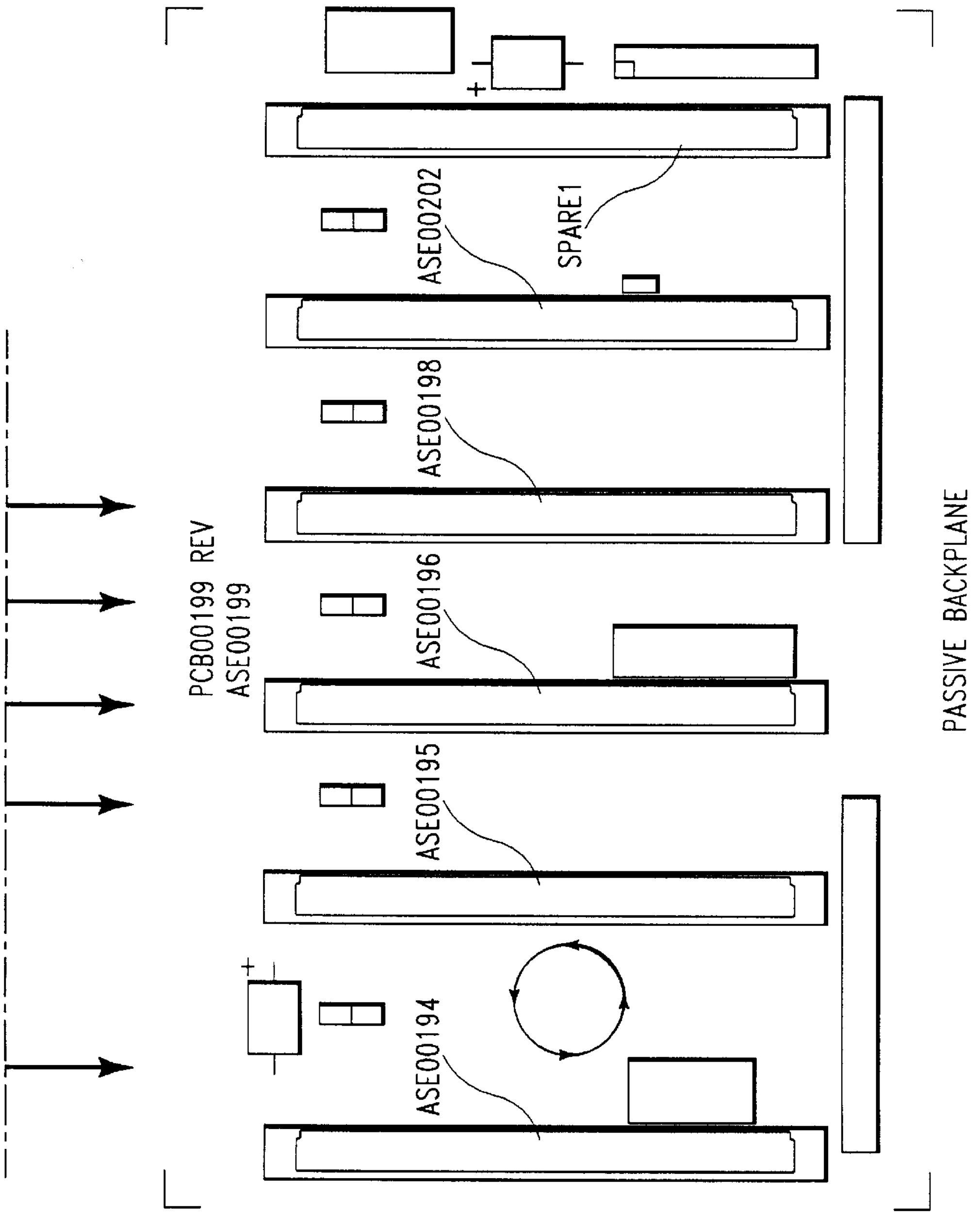
FIG. 3.2d
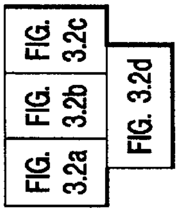
FIG. 3.2

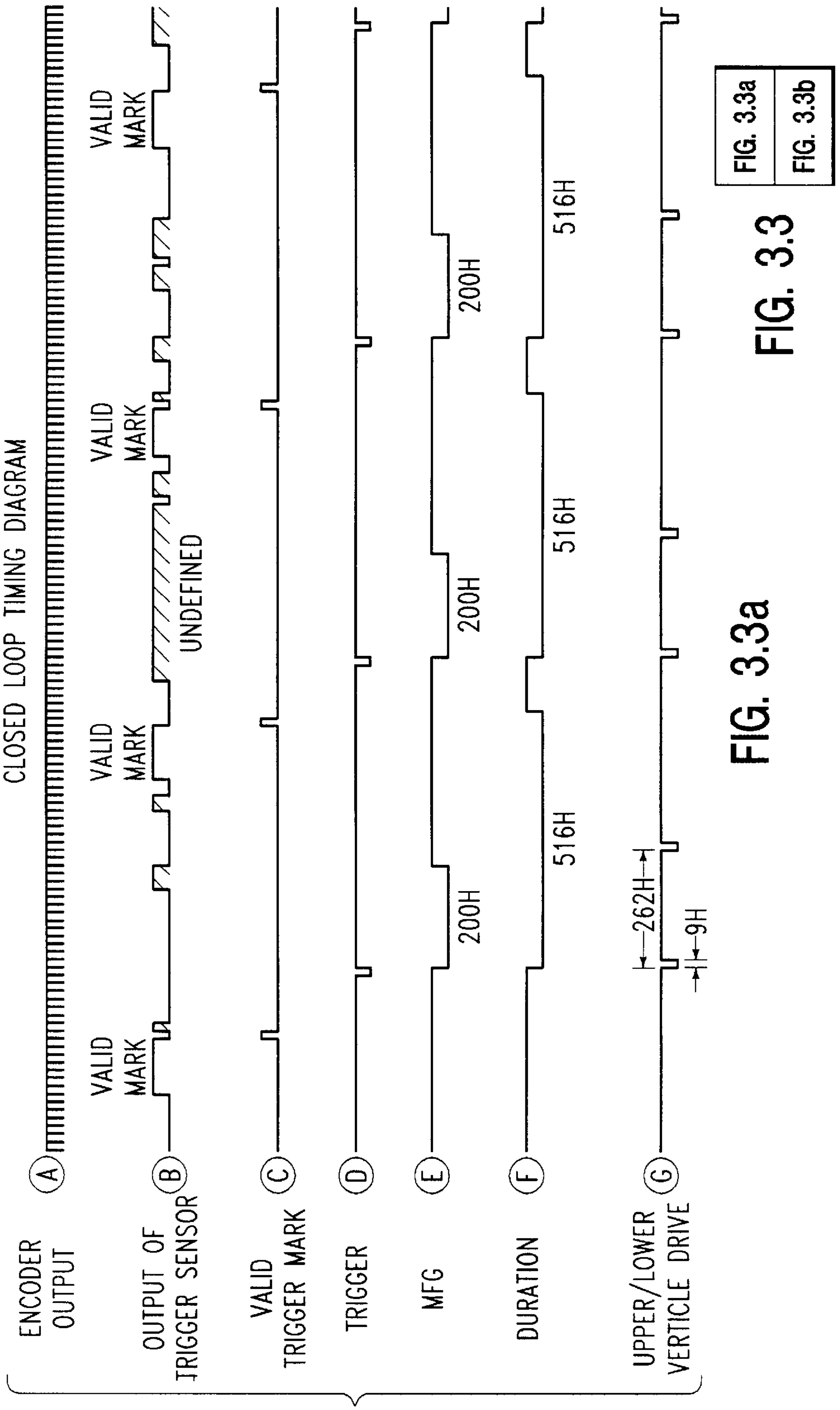
FIG. 3.3a
FIG. 3.3

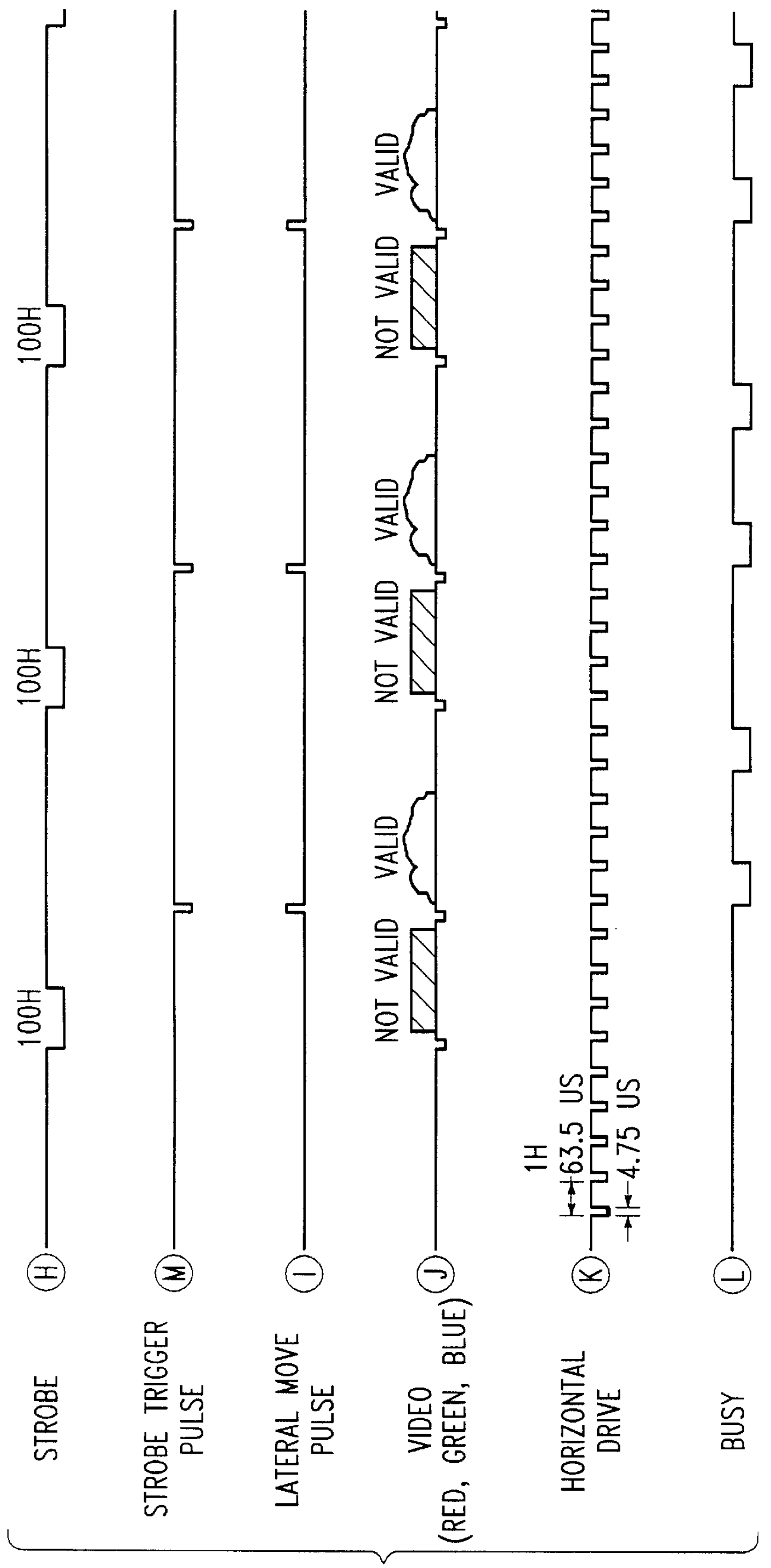
FIG. 3.3b

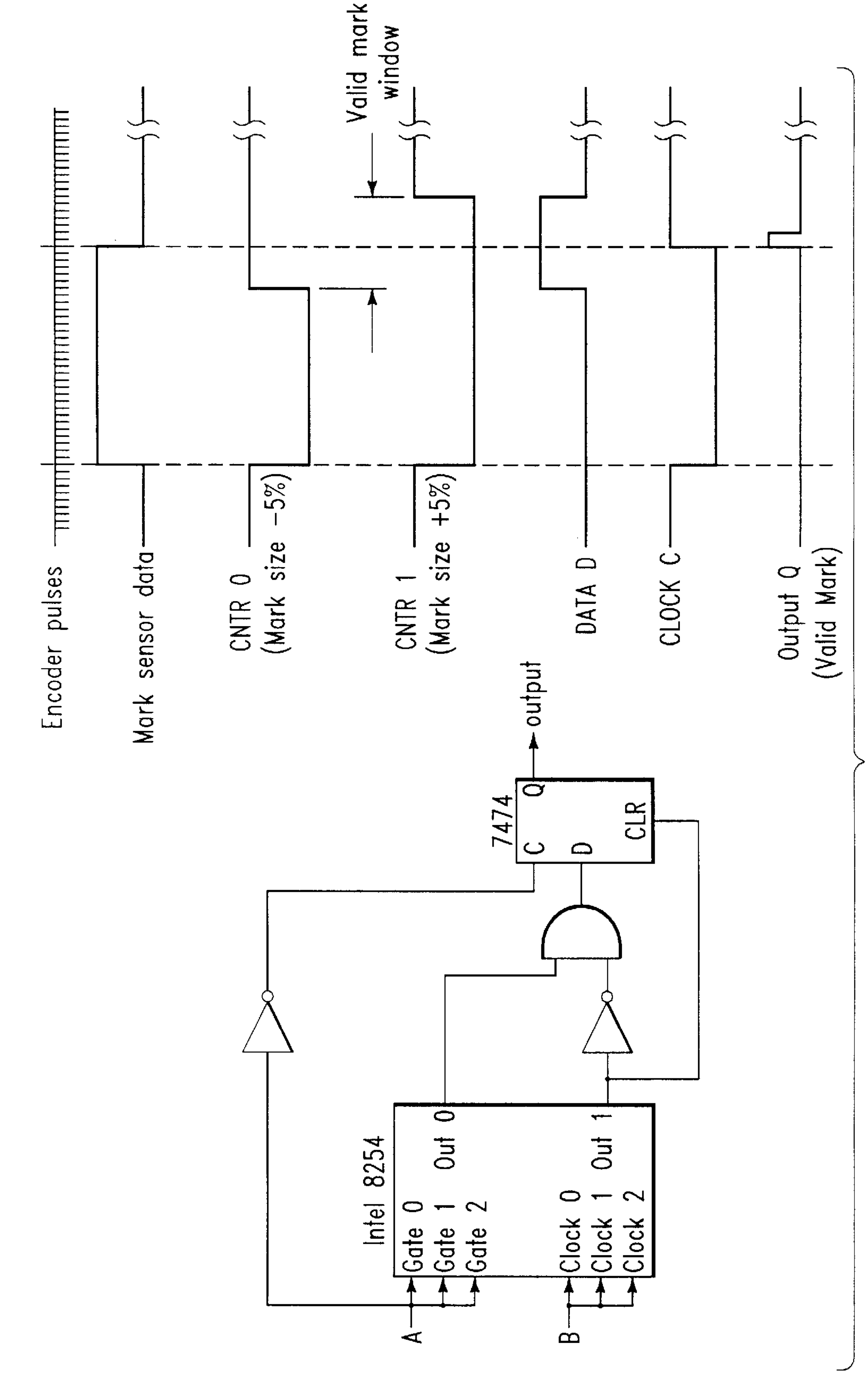
FIG. 3.4

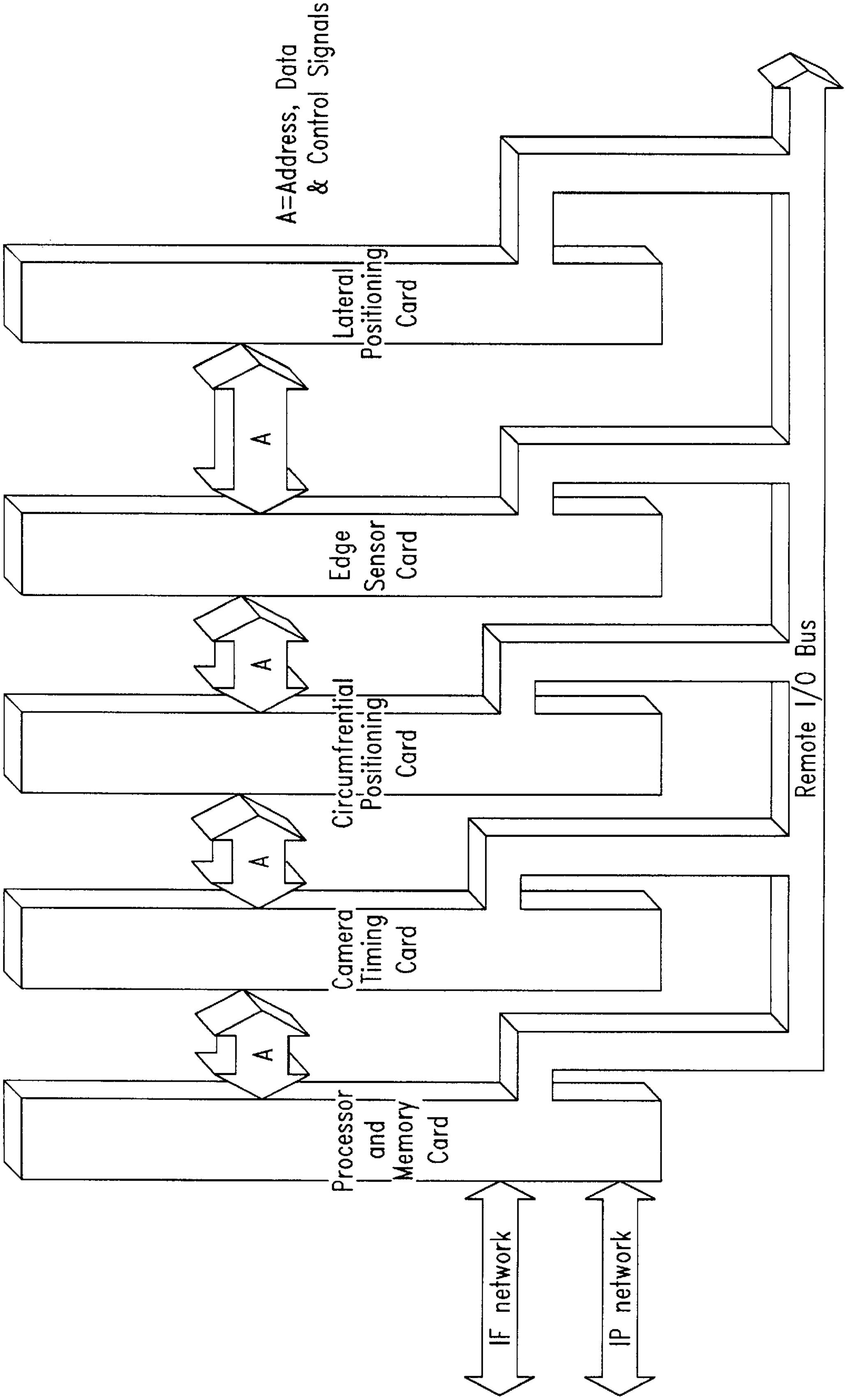
FIG. 3.5

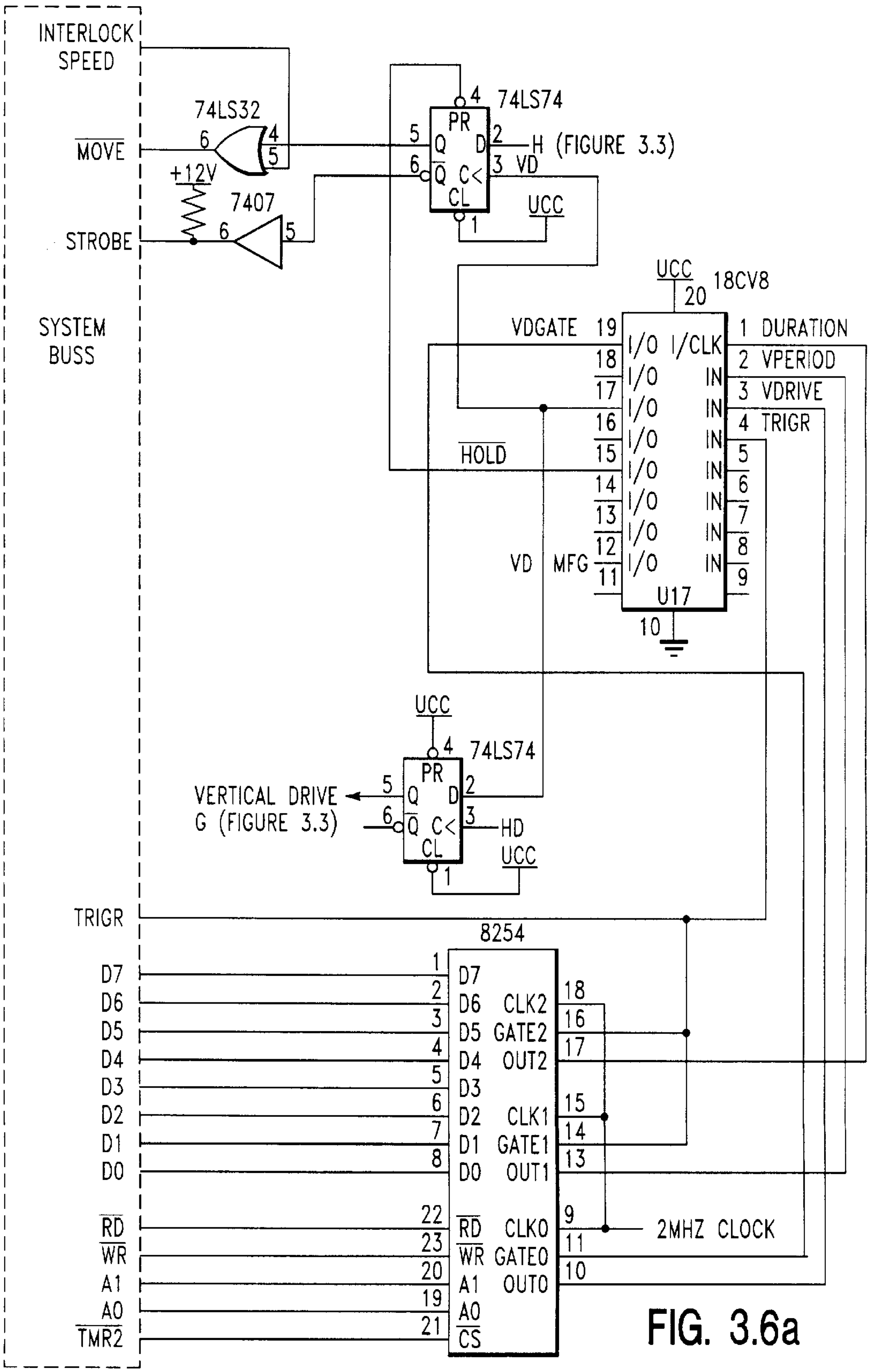
FIG. 3.6a

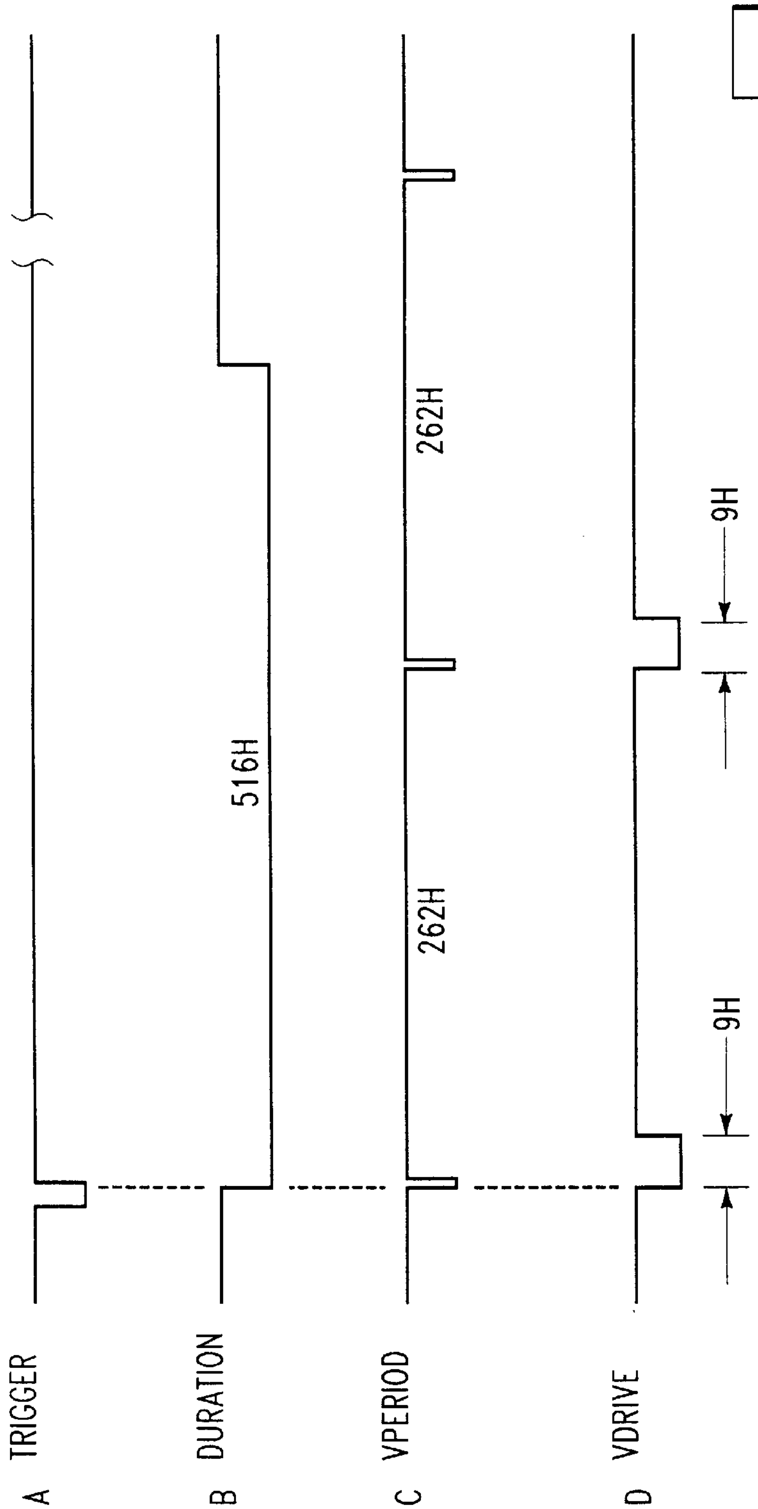
FIG. 3.6b
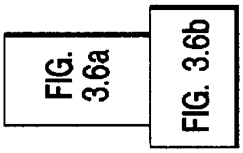
FIG. 3.6

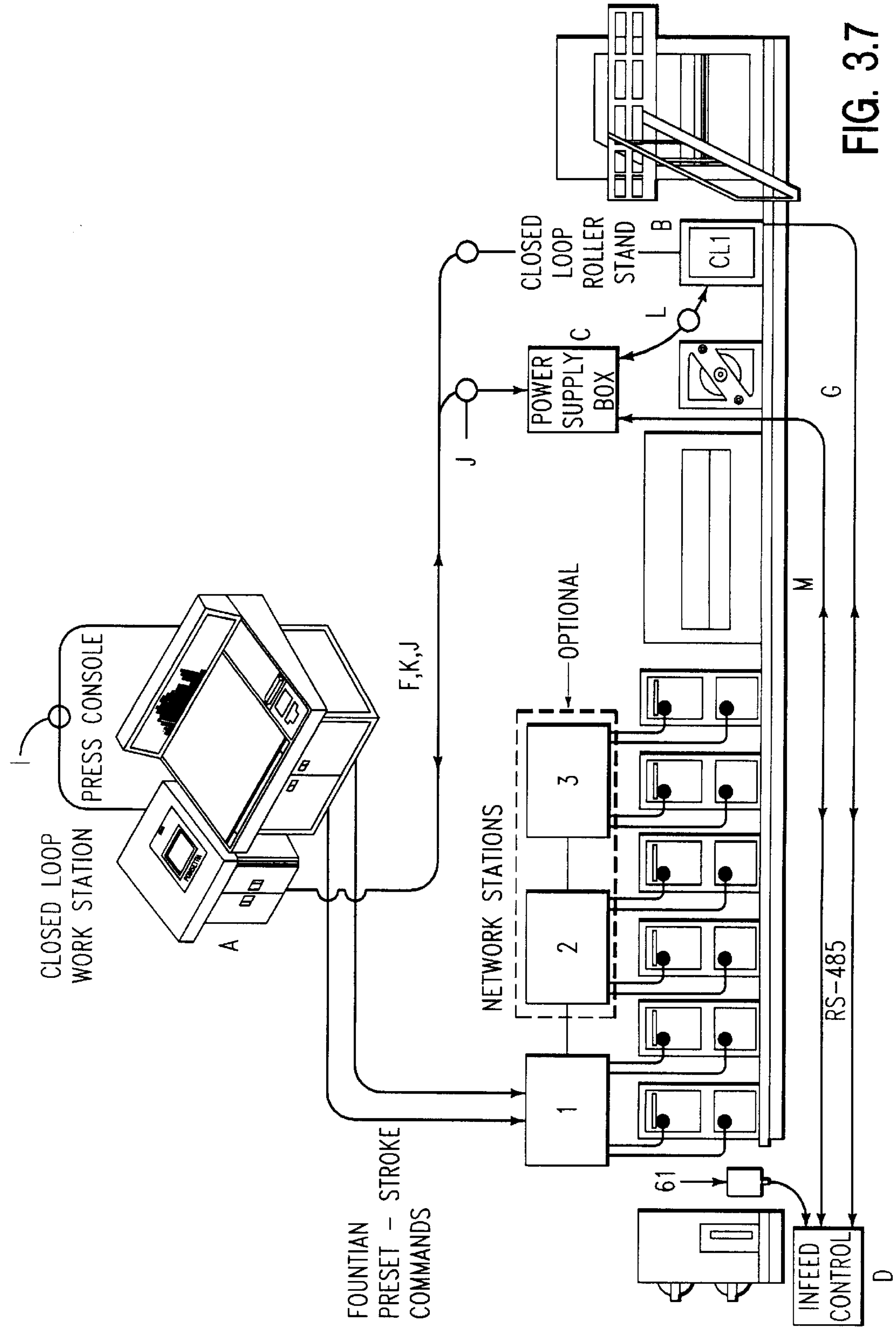
FIG. 3.7

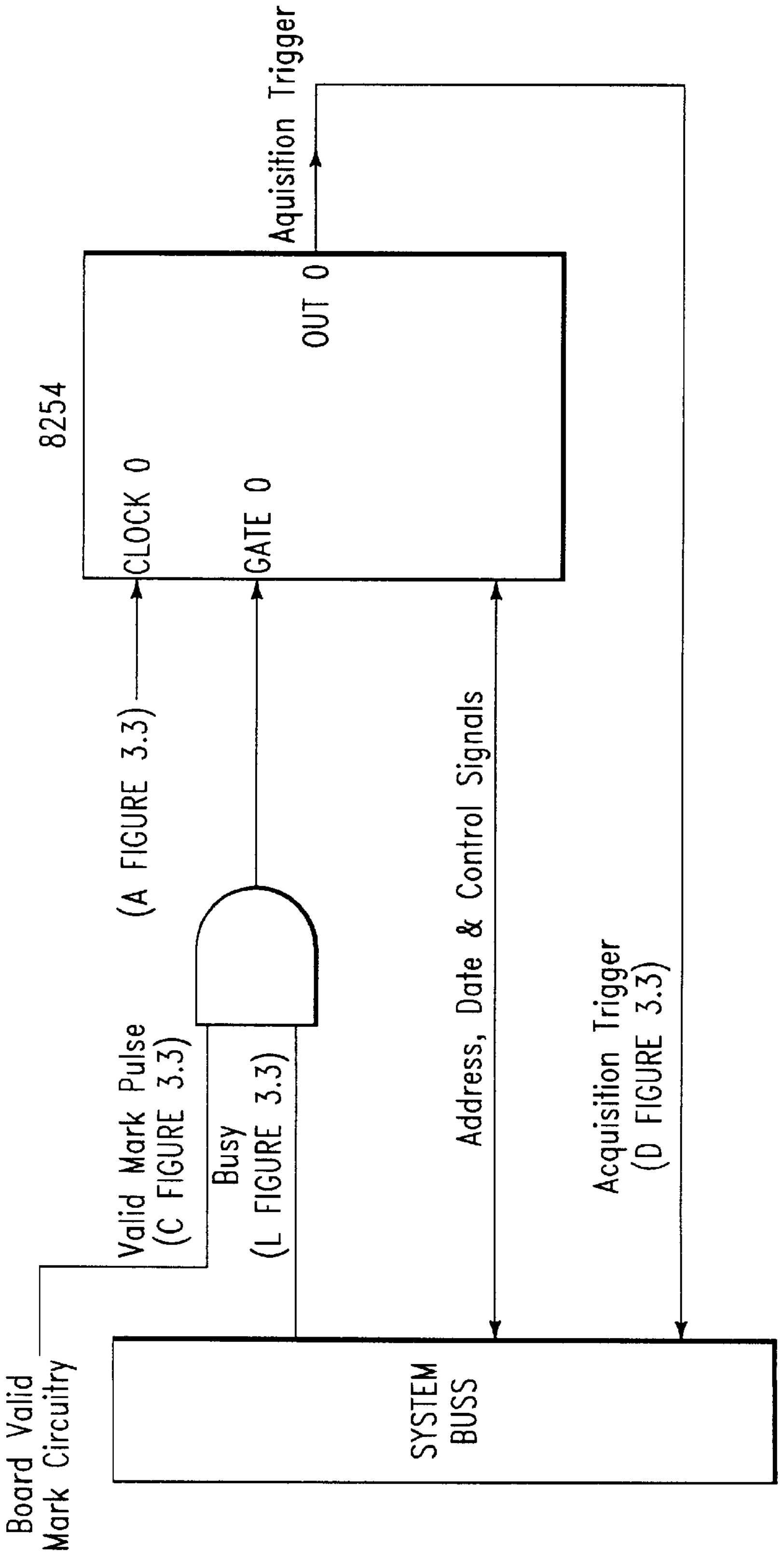
FIG. 3.8

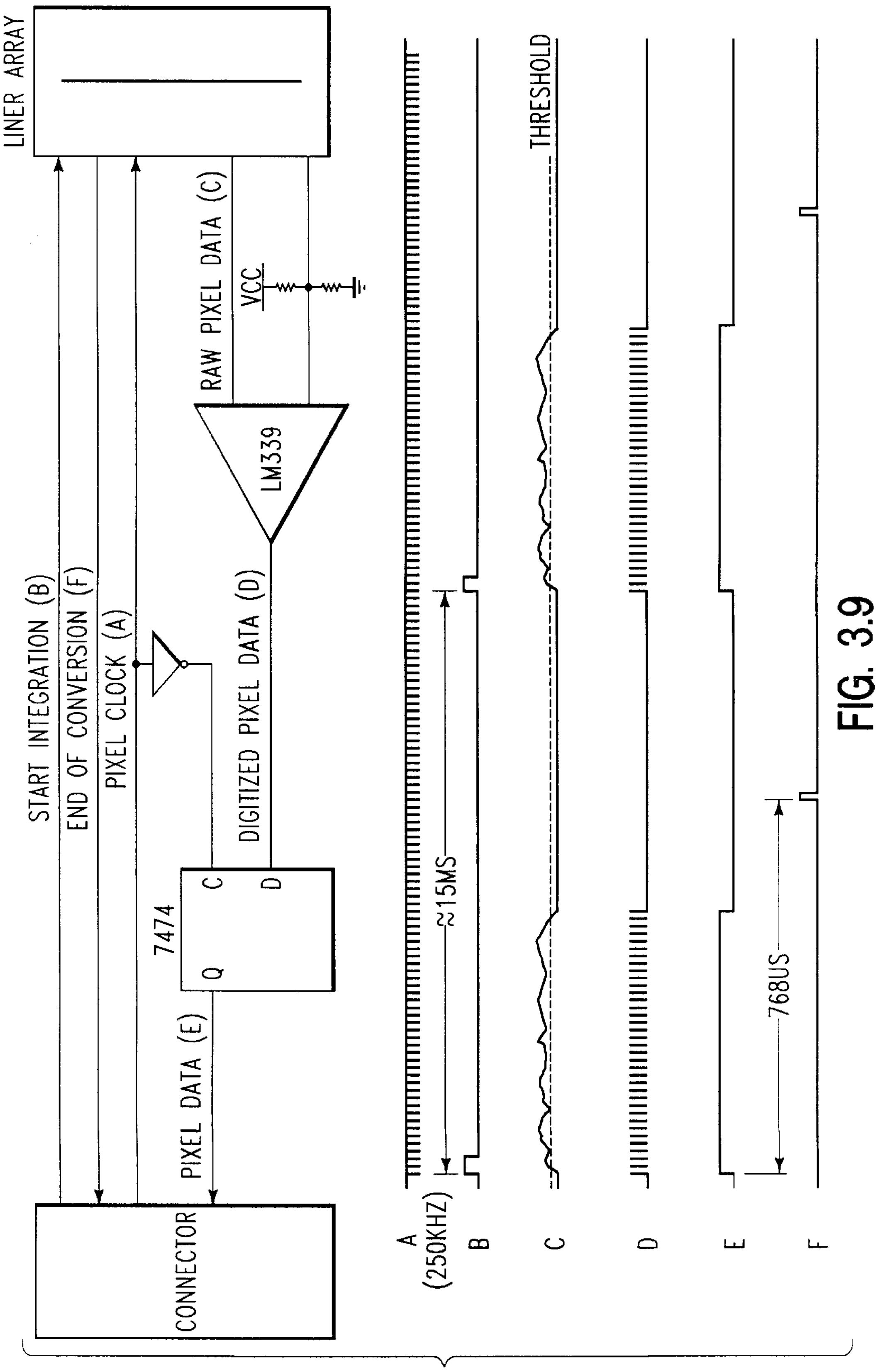
FIG. 3.9

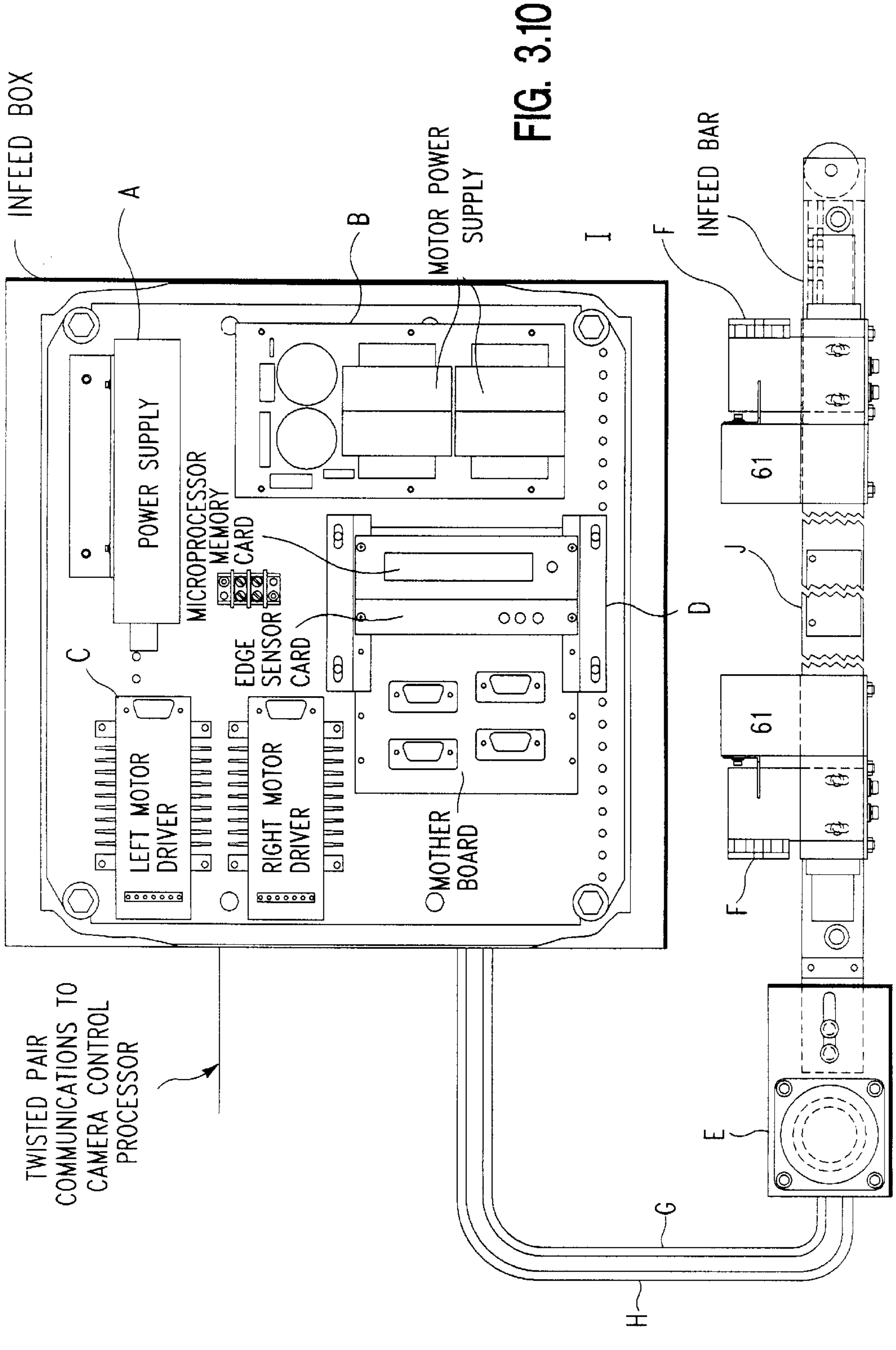
FIG. 3.10

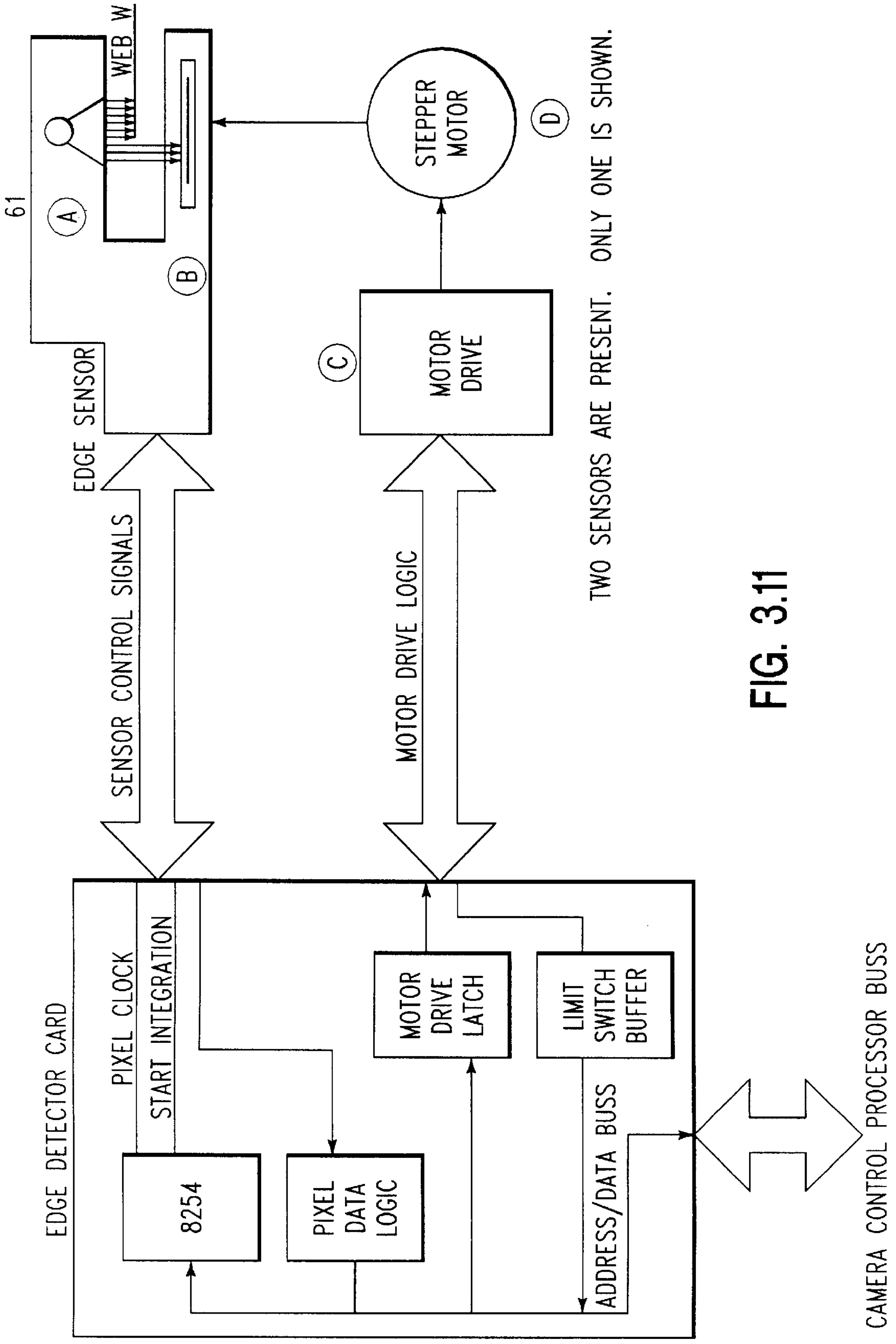
FIG. 3.11

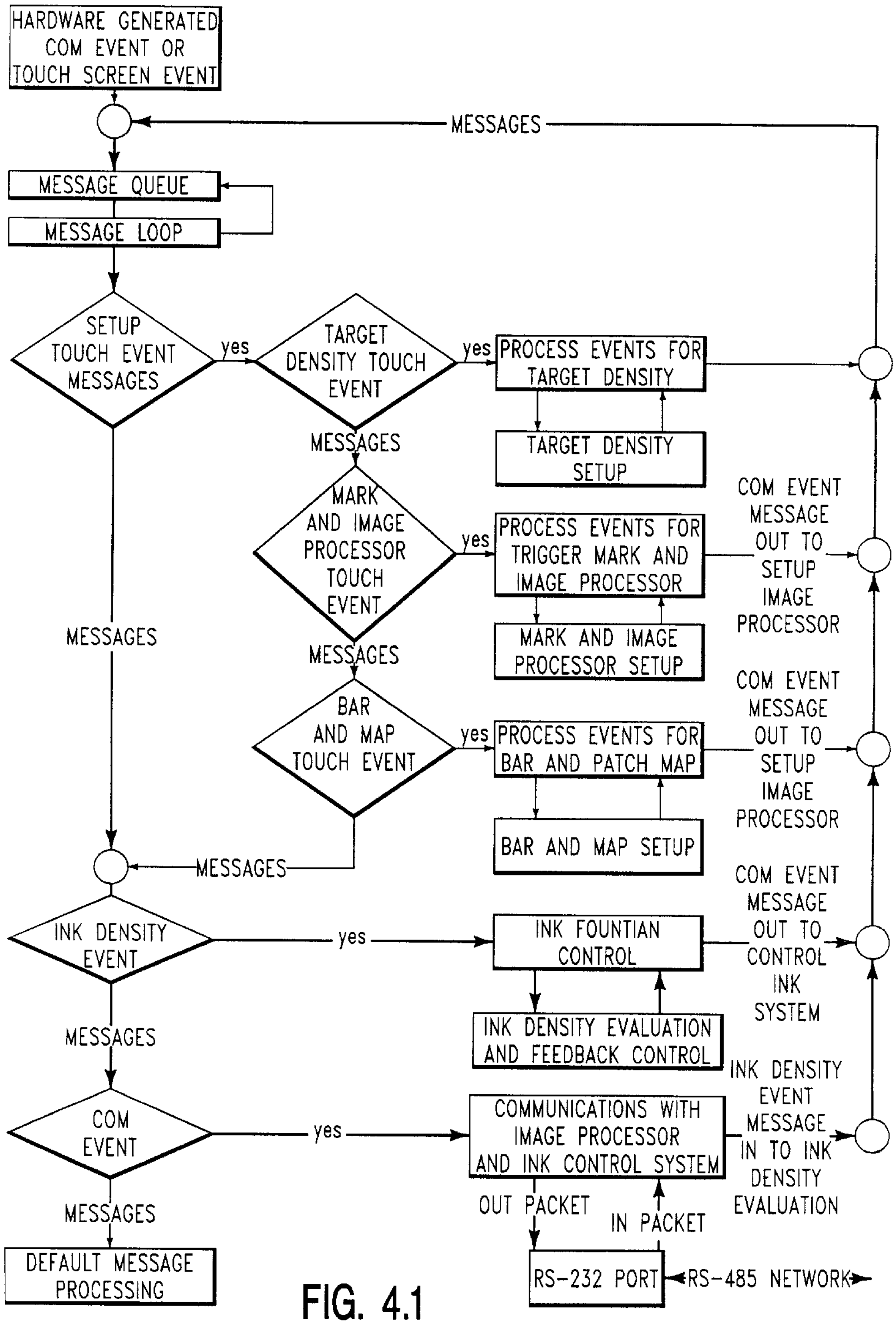
FIG. 4.1

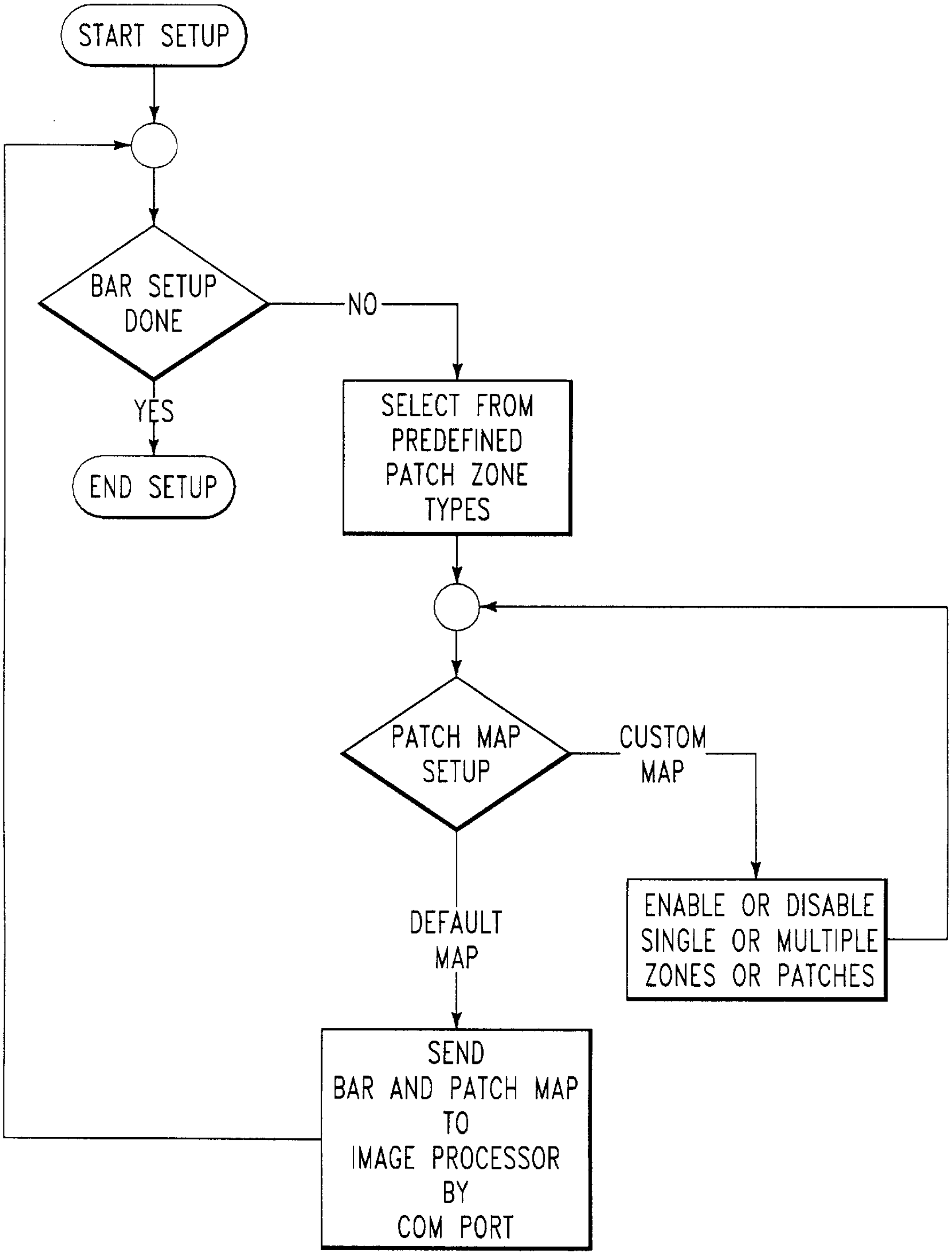
FIG. 4.2

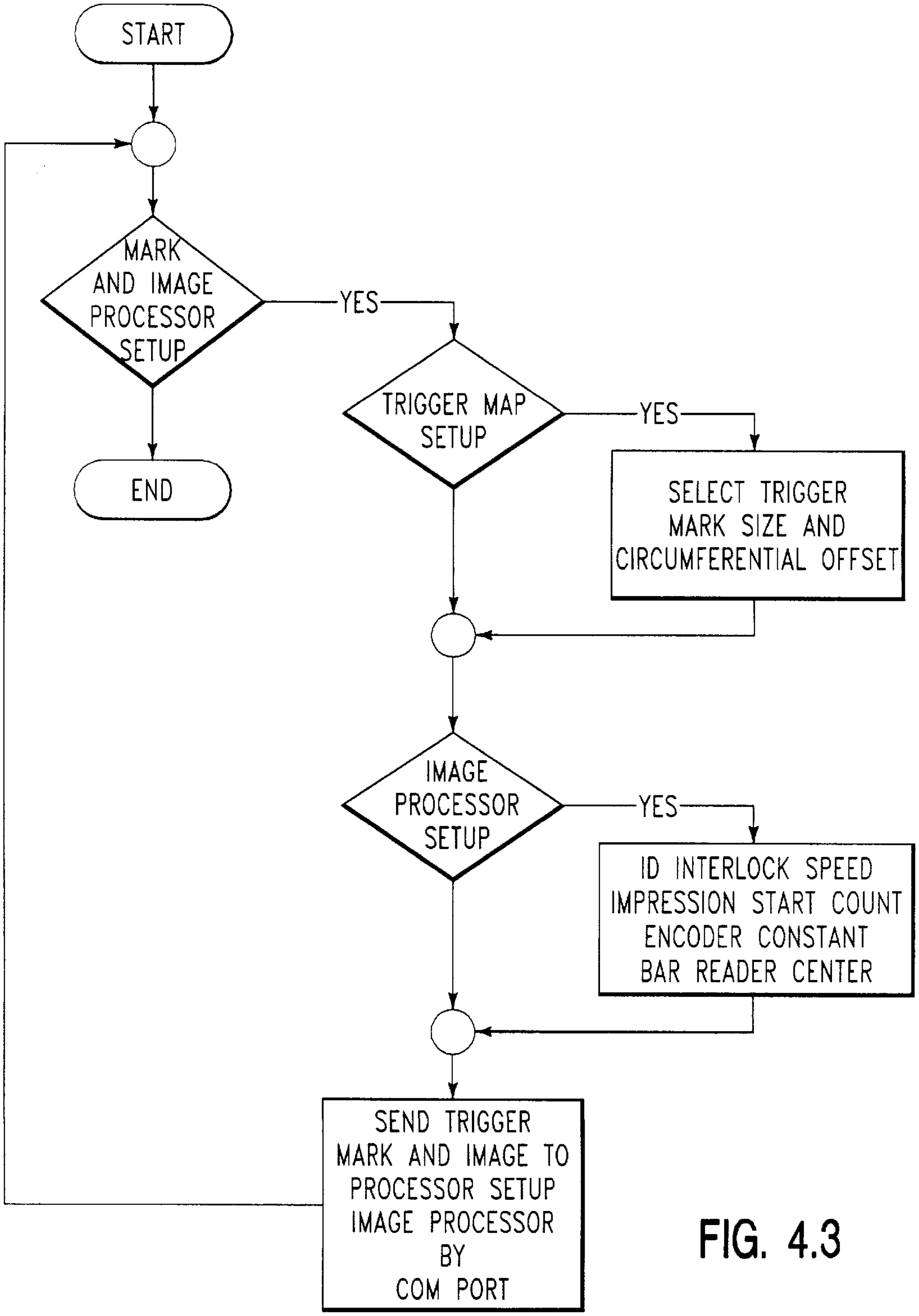
FIG. 4.3

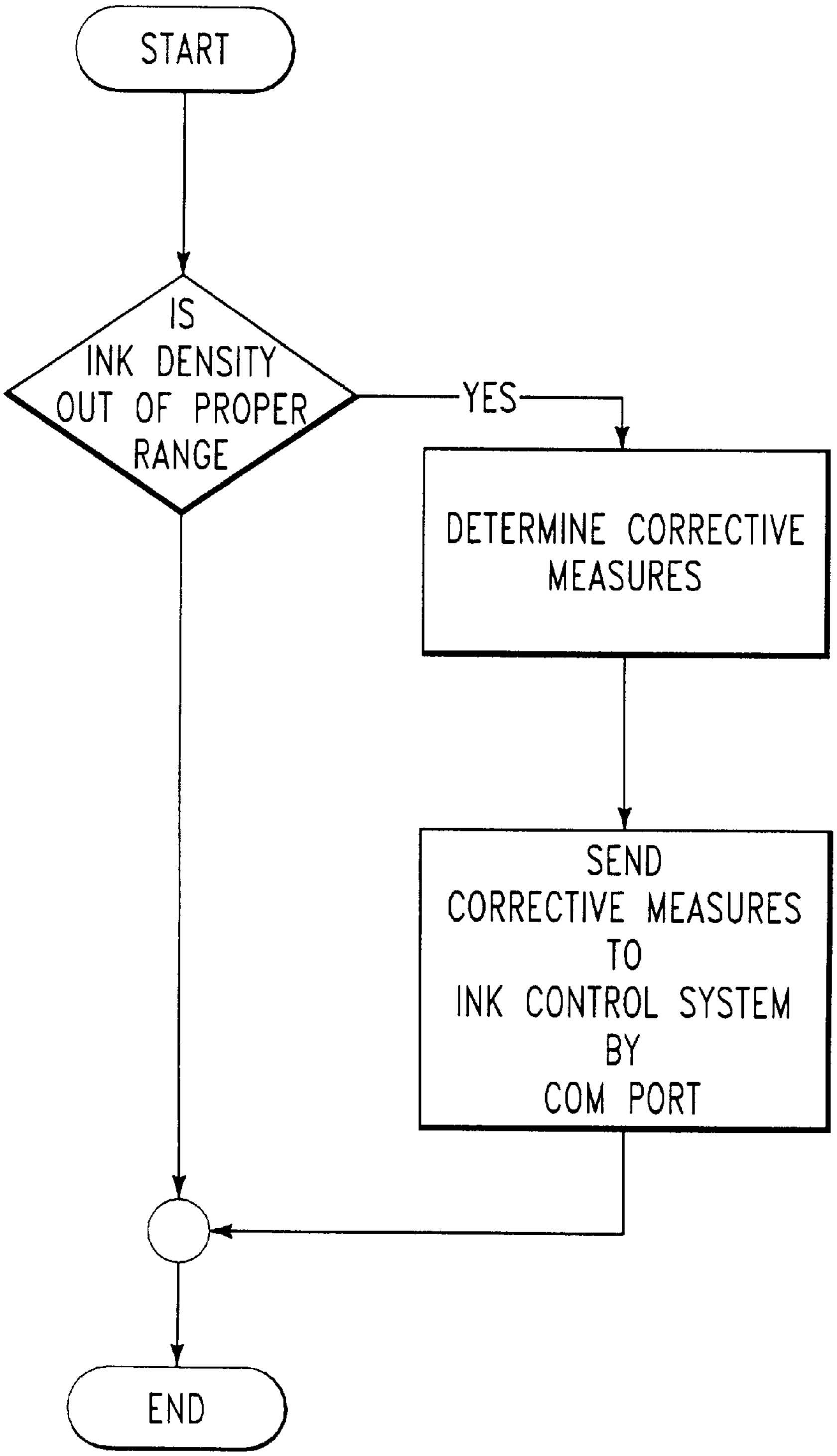
FIG. 4.4

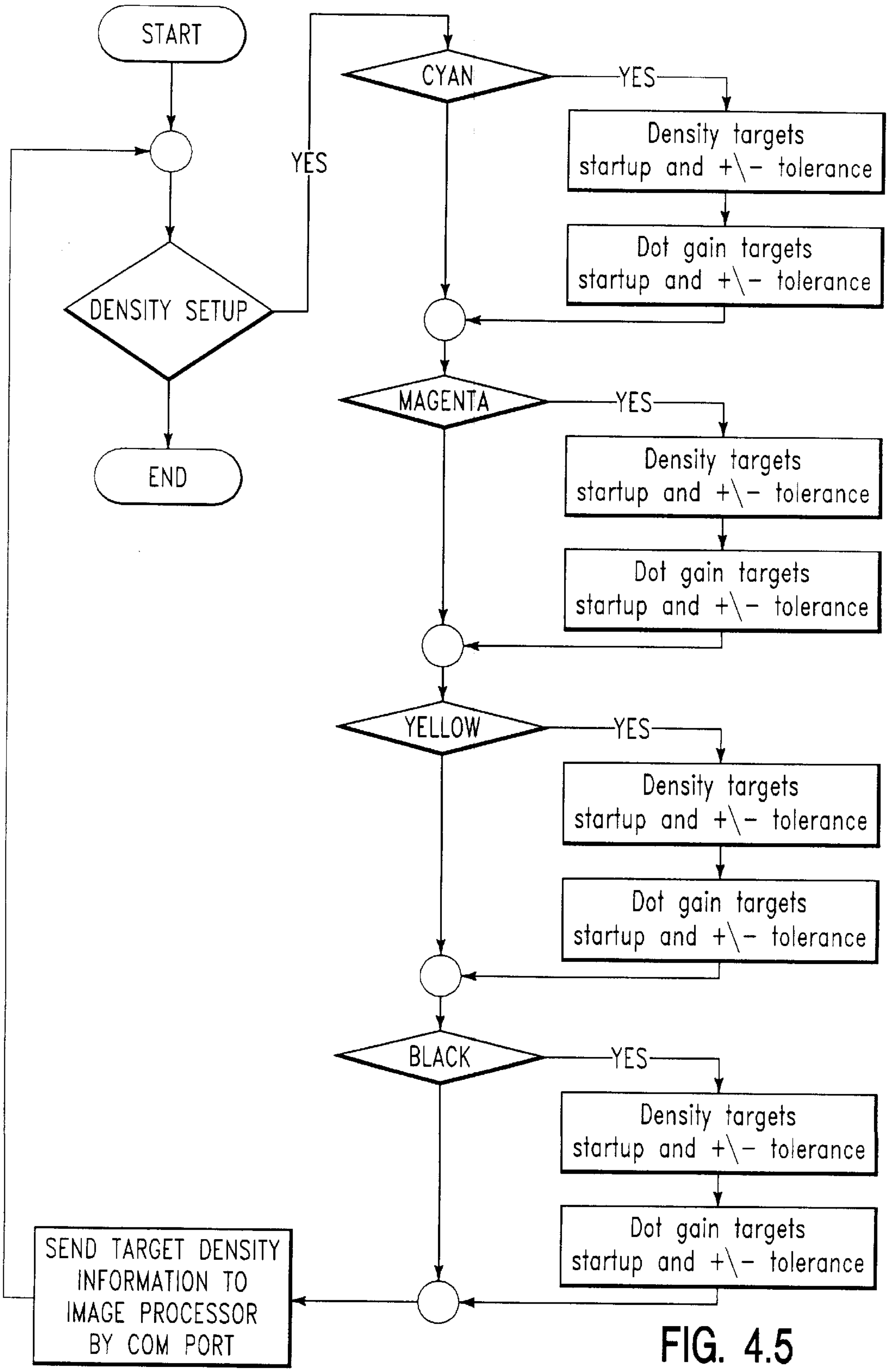
FIG. 4.5

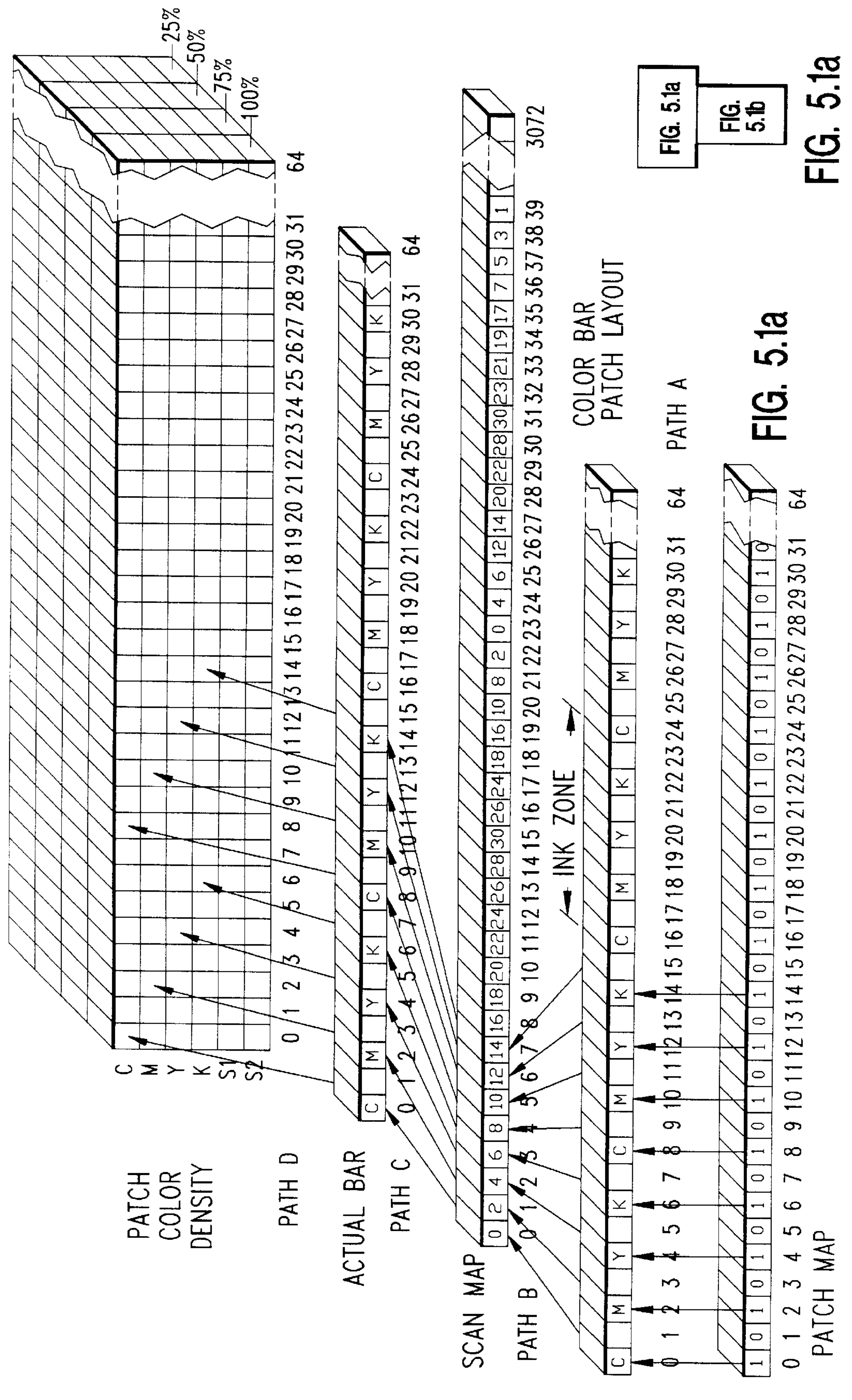
FIG. 5.1a
FIG. 5.1a

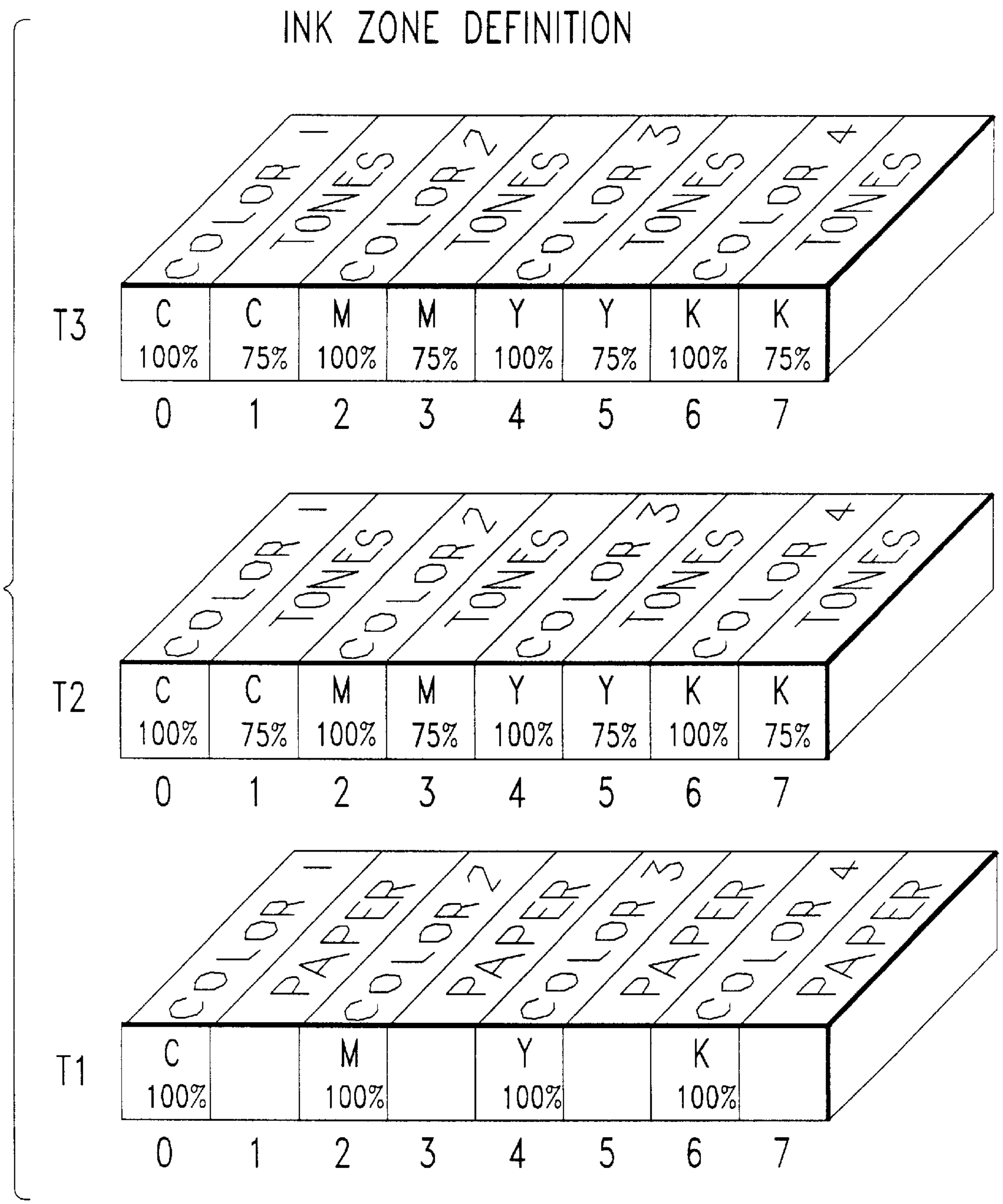
FIG. 5.1b

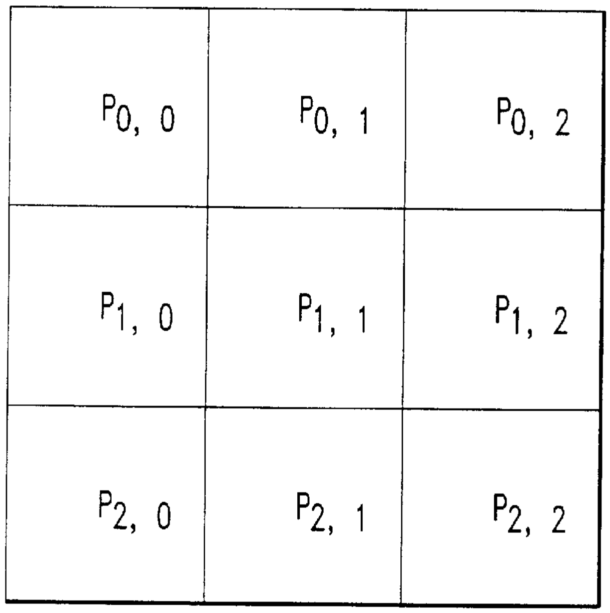
FIG. 5.2
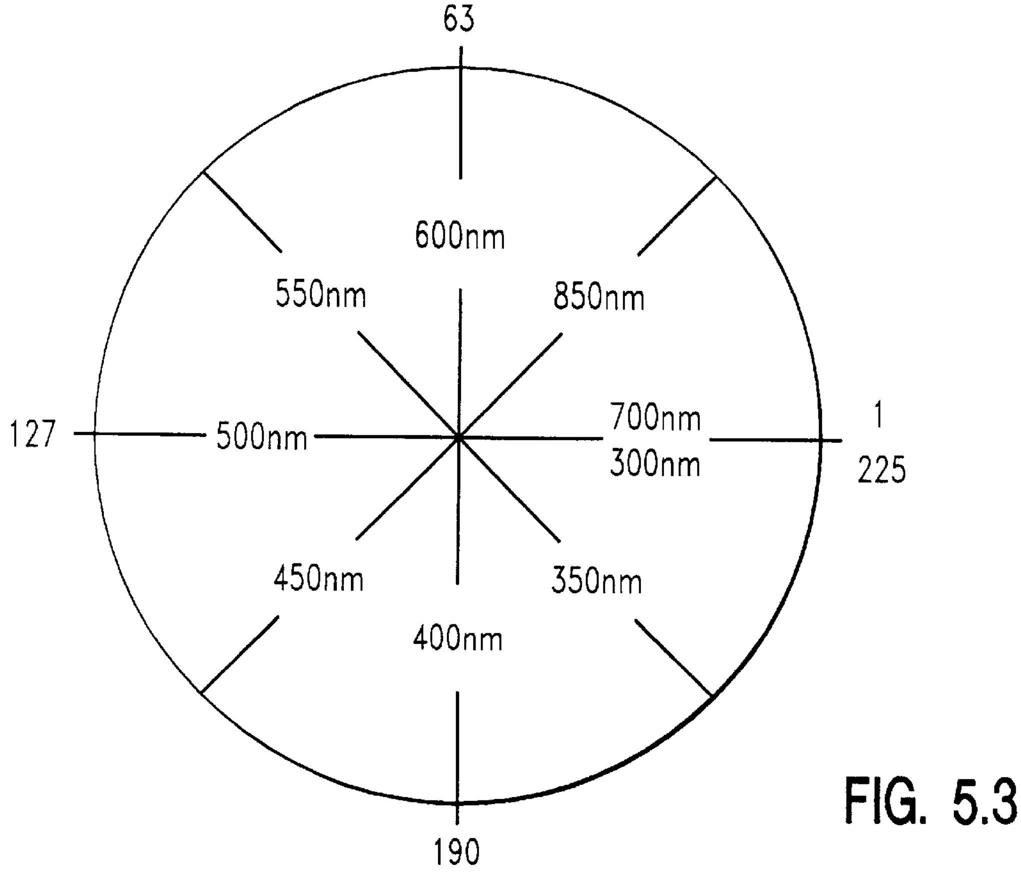
FIG. 5.3

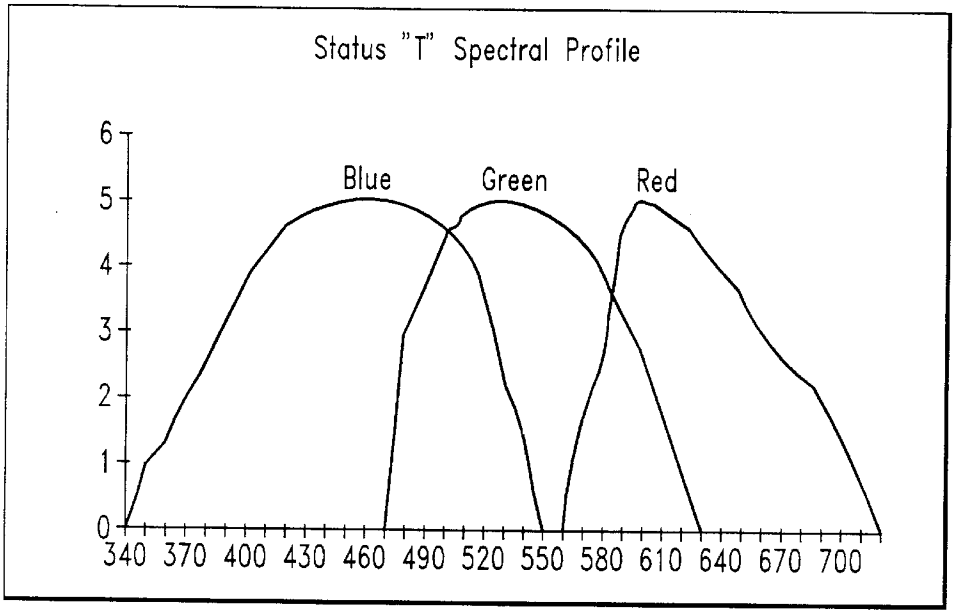
FIG. 5.4
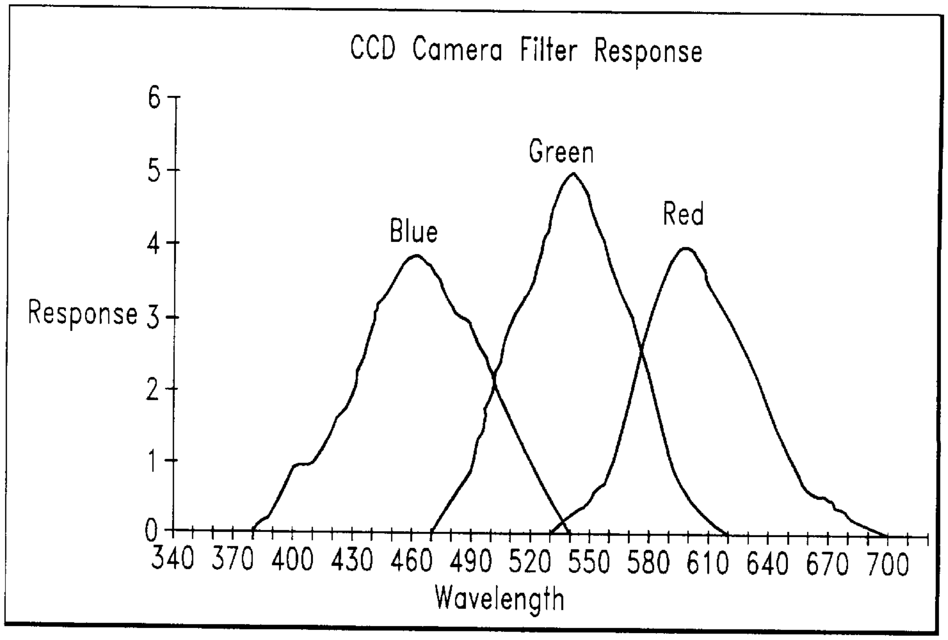
FIG. 5.5

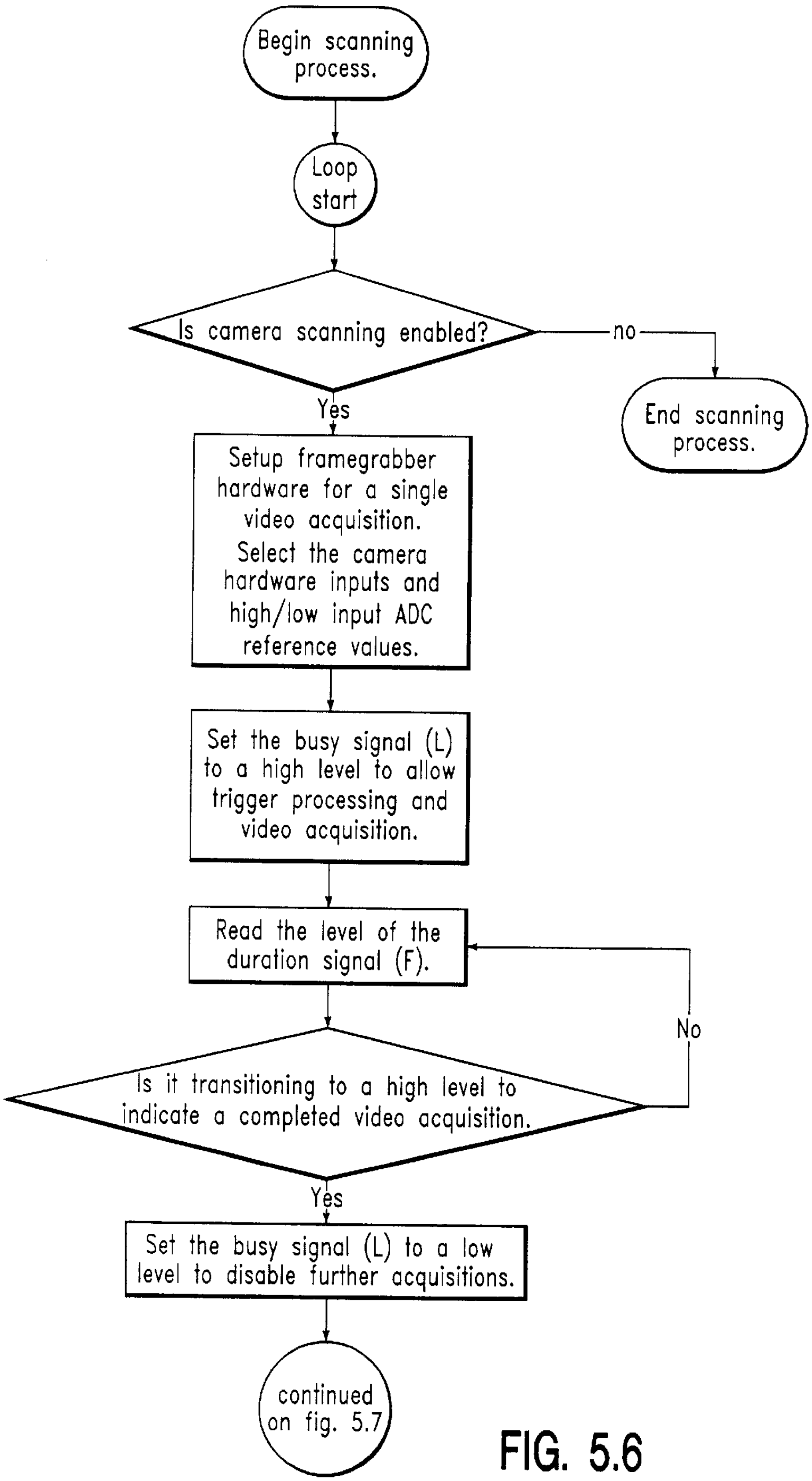
FIG. 5.6

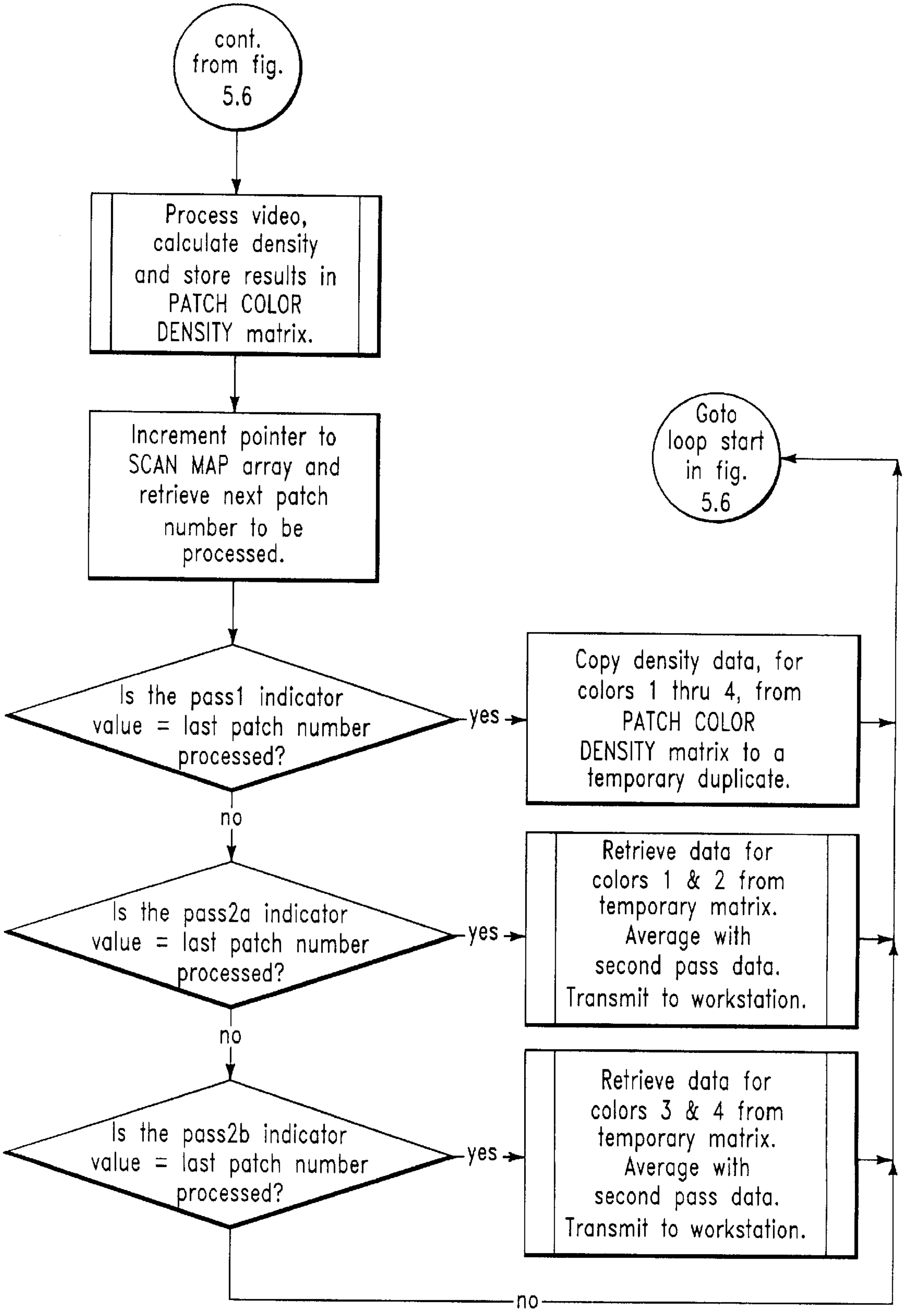
FIG. 5.7

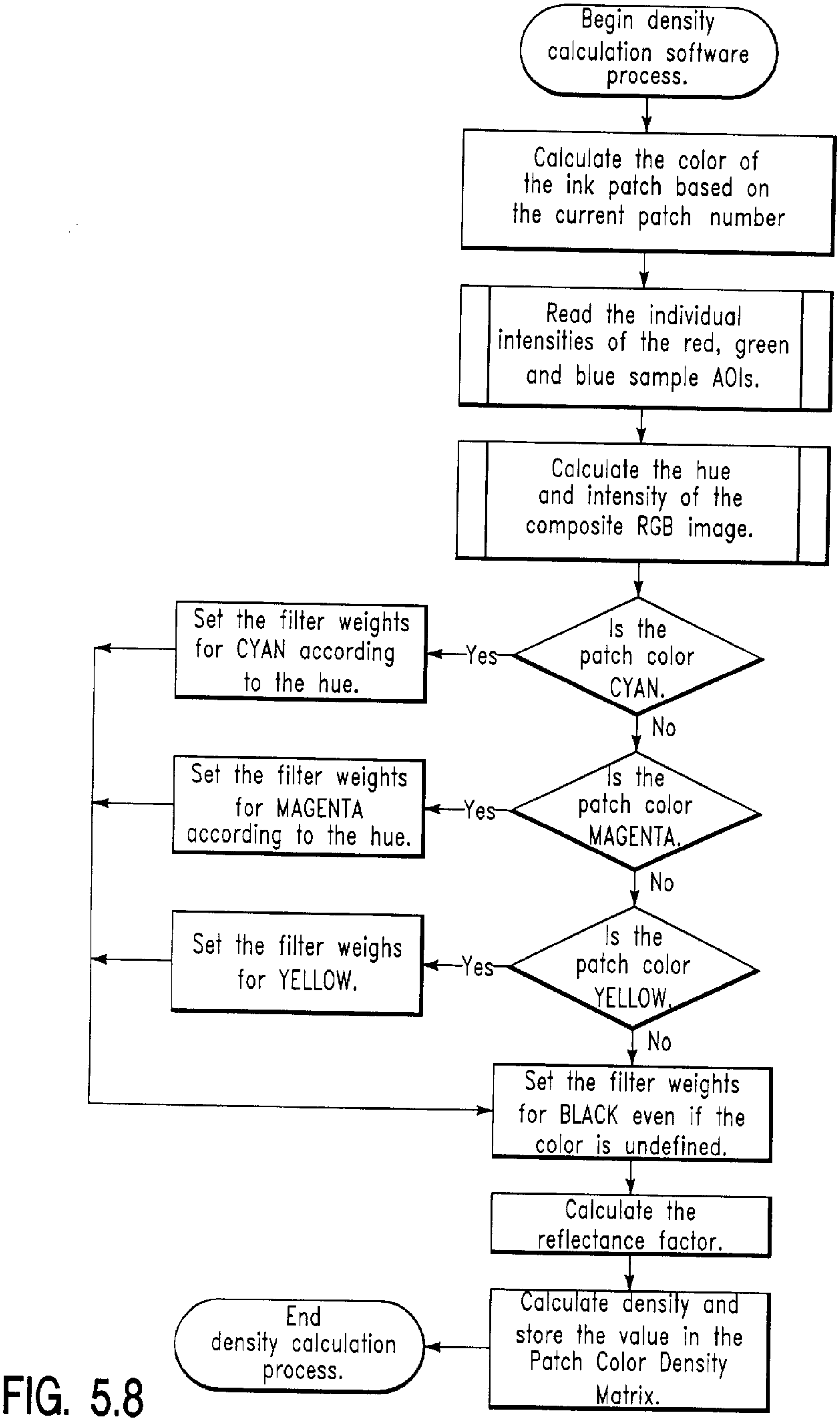
FIG. 5.8

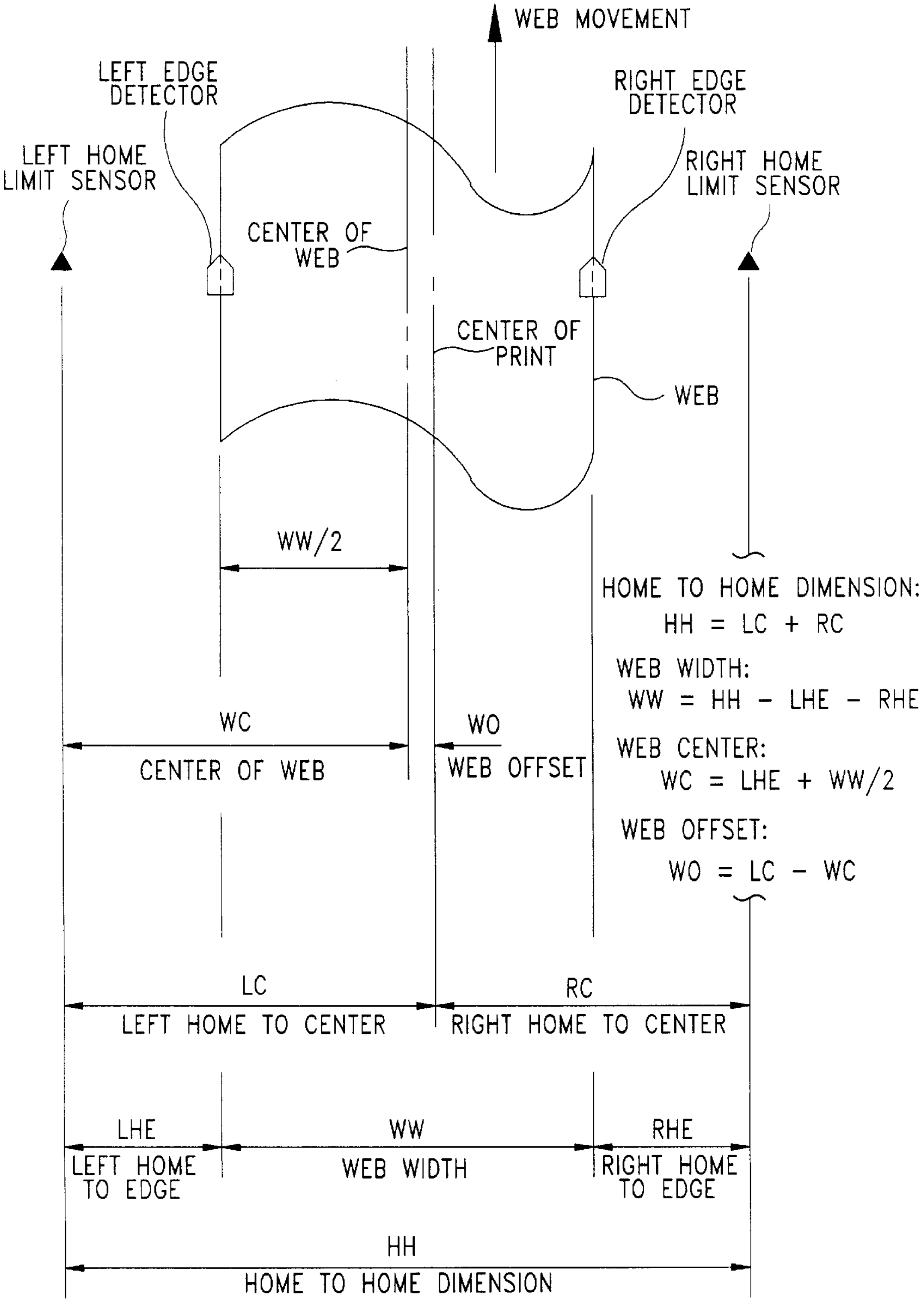
FIG. 6.1

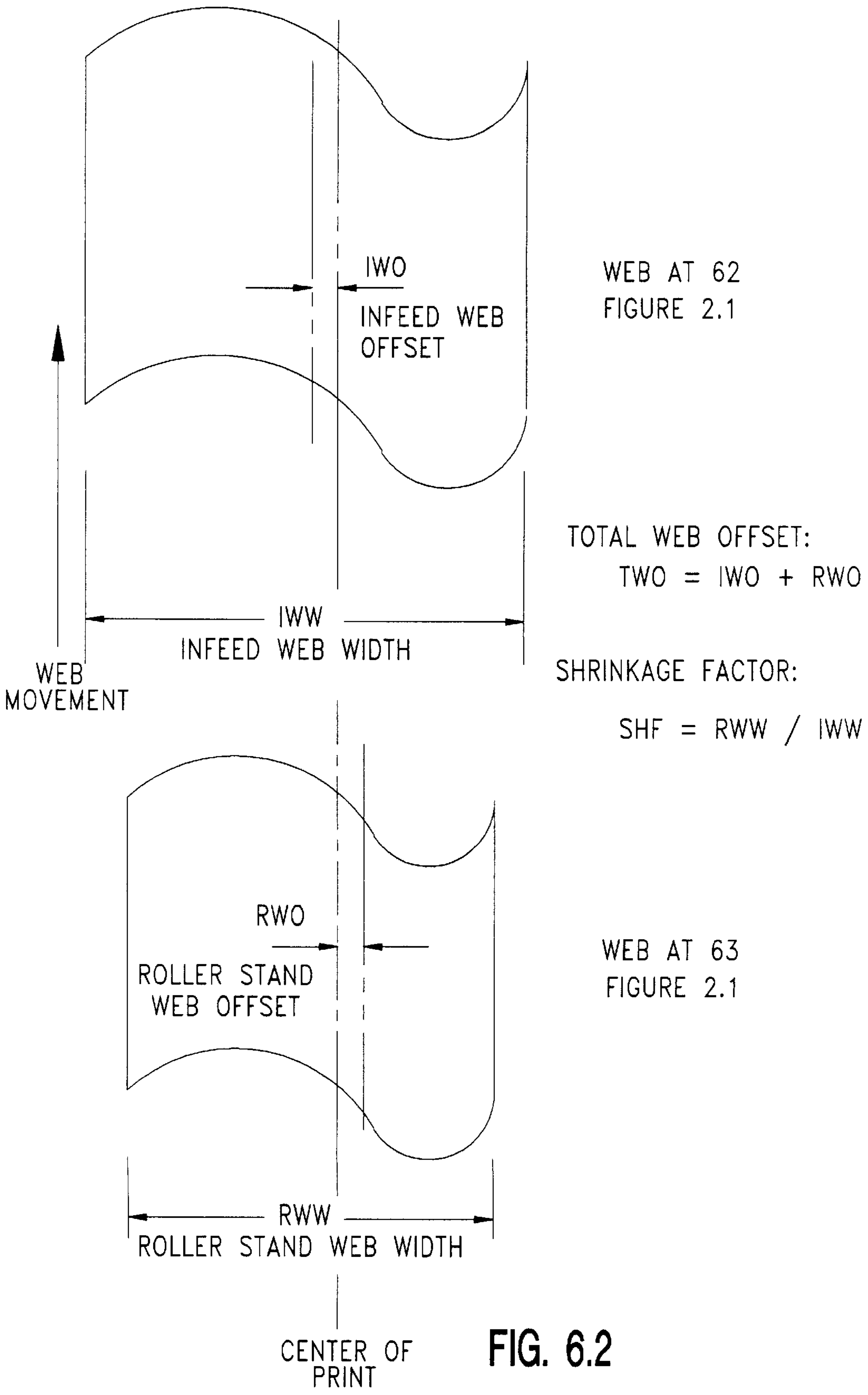
FIG. 6.2

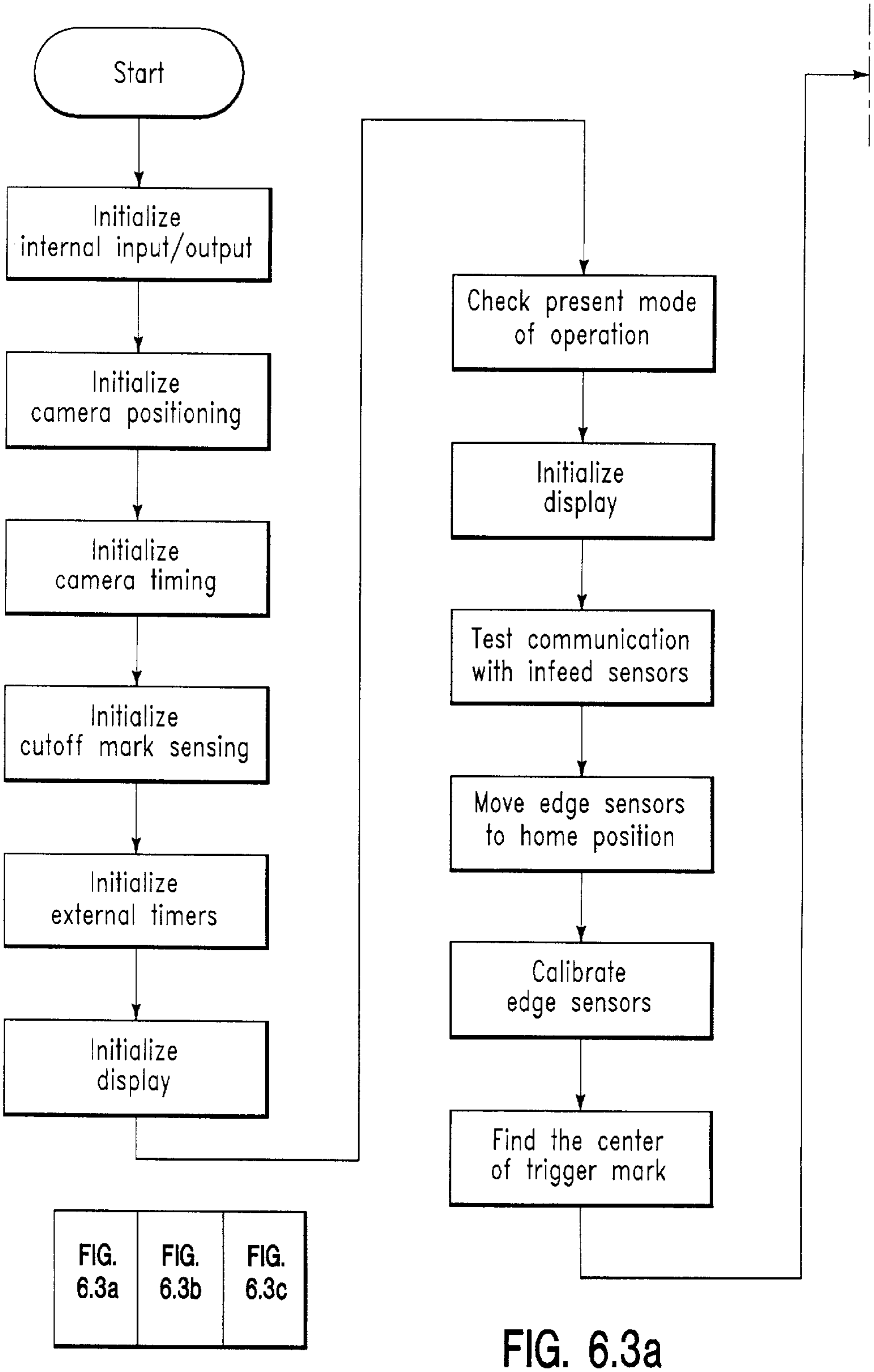
FIG. 6.3
FIG. 6.3a

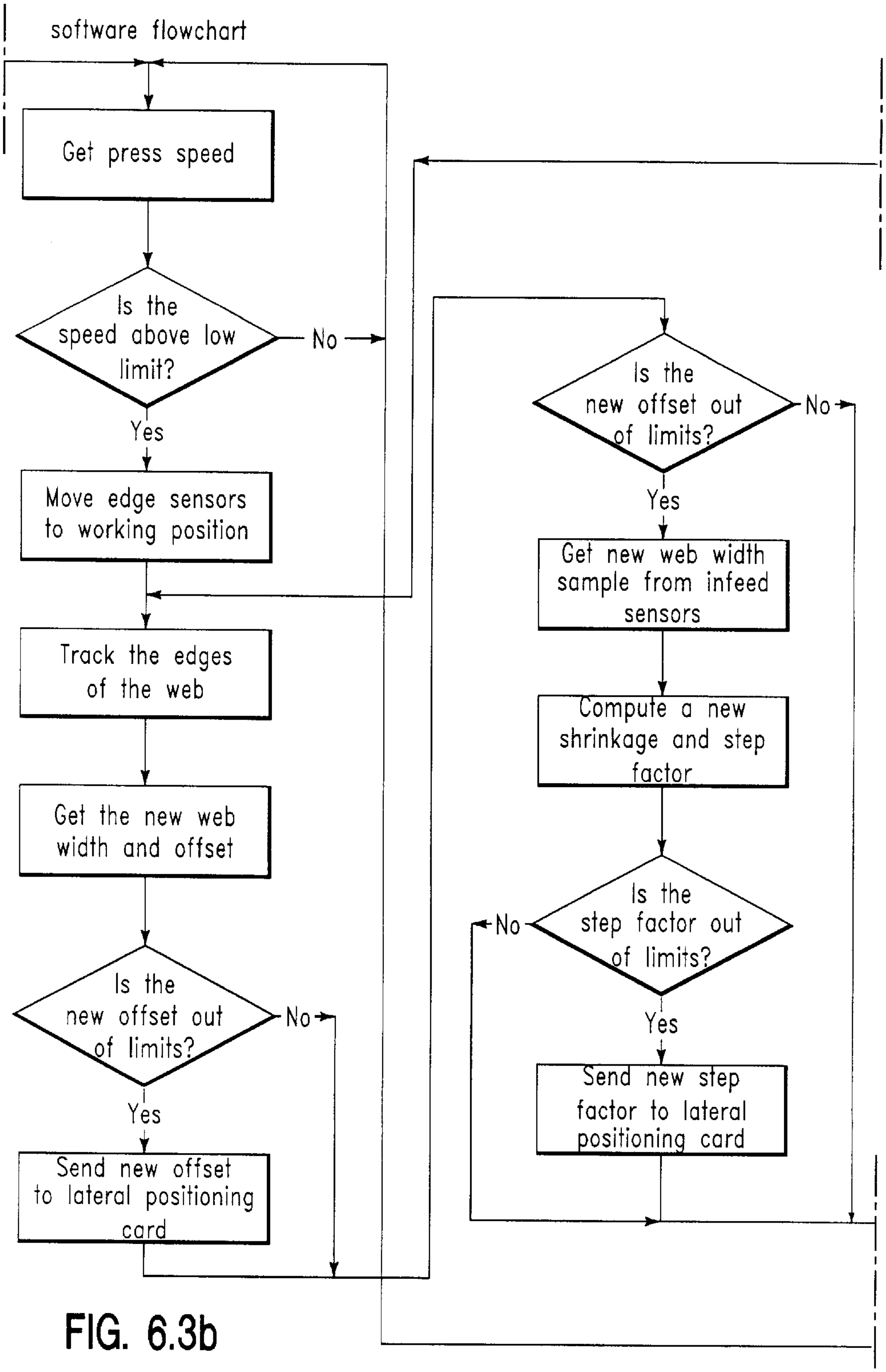
FIG. 6.3b

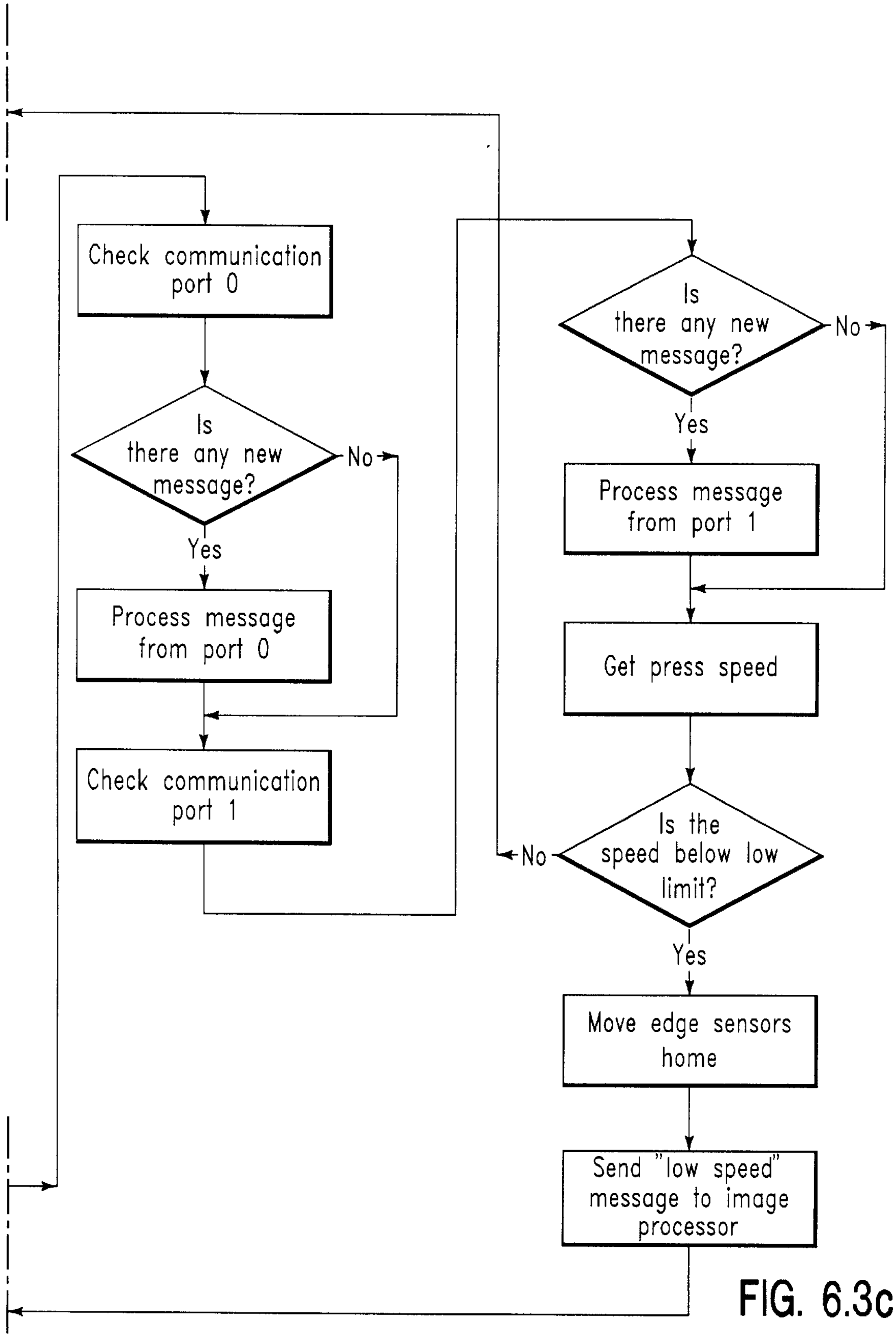
FIG. 6.3c

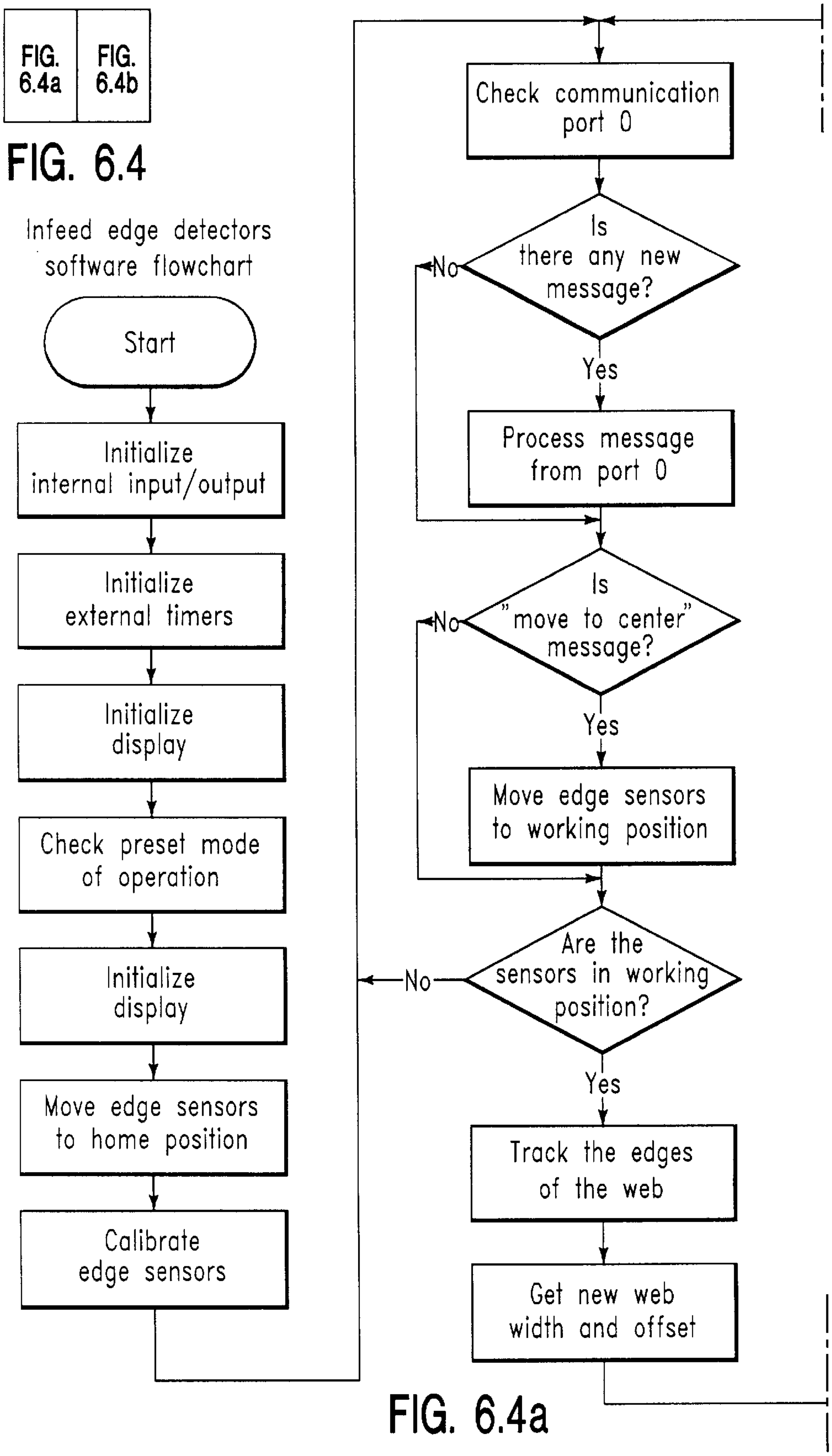
FIG. 6.4a

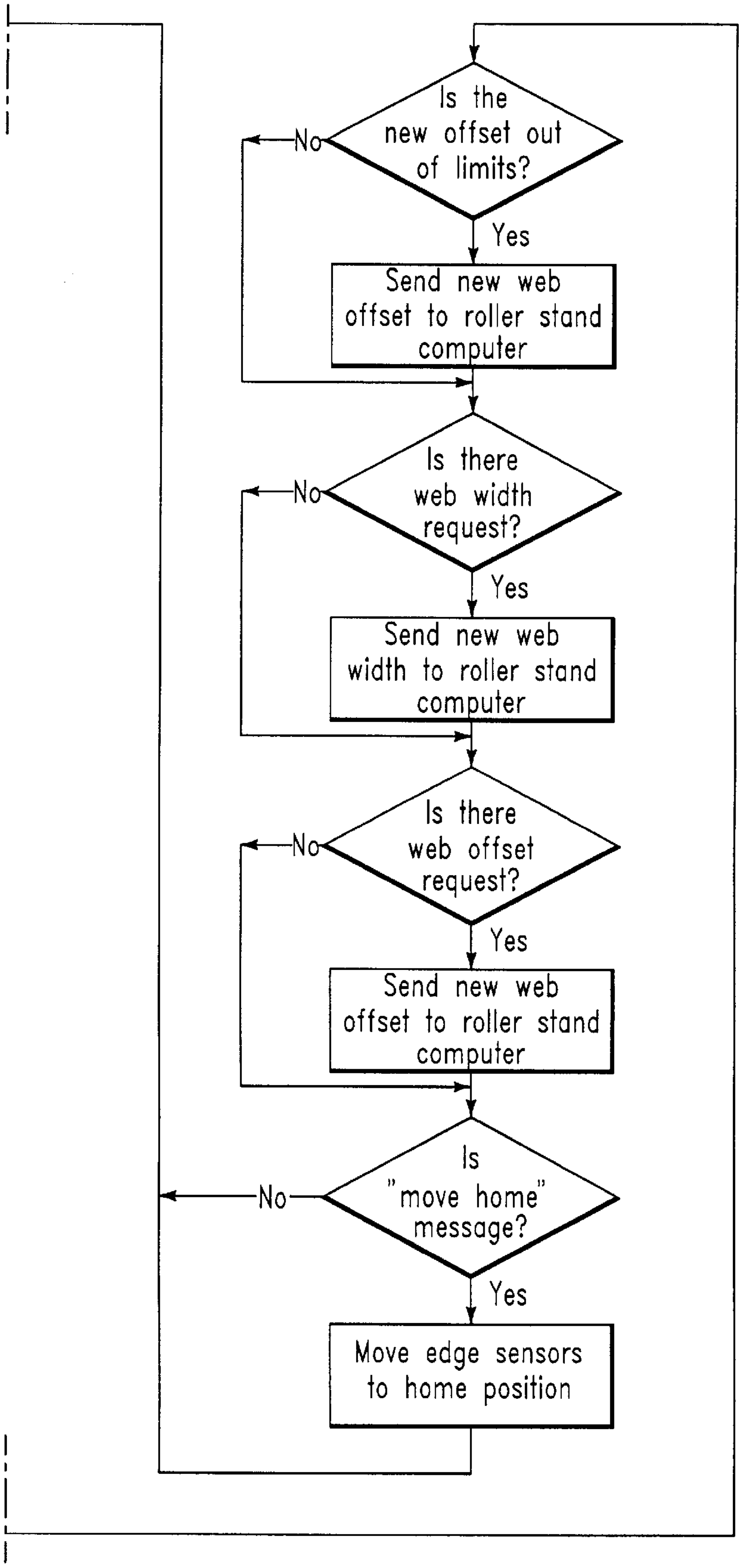
FIG. 6.4b

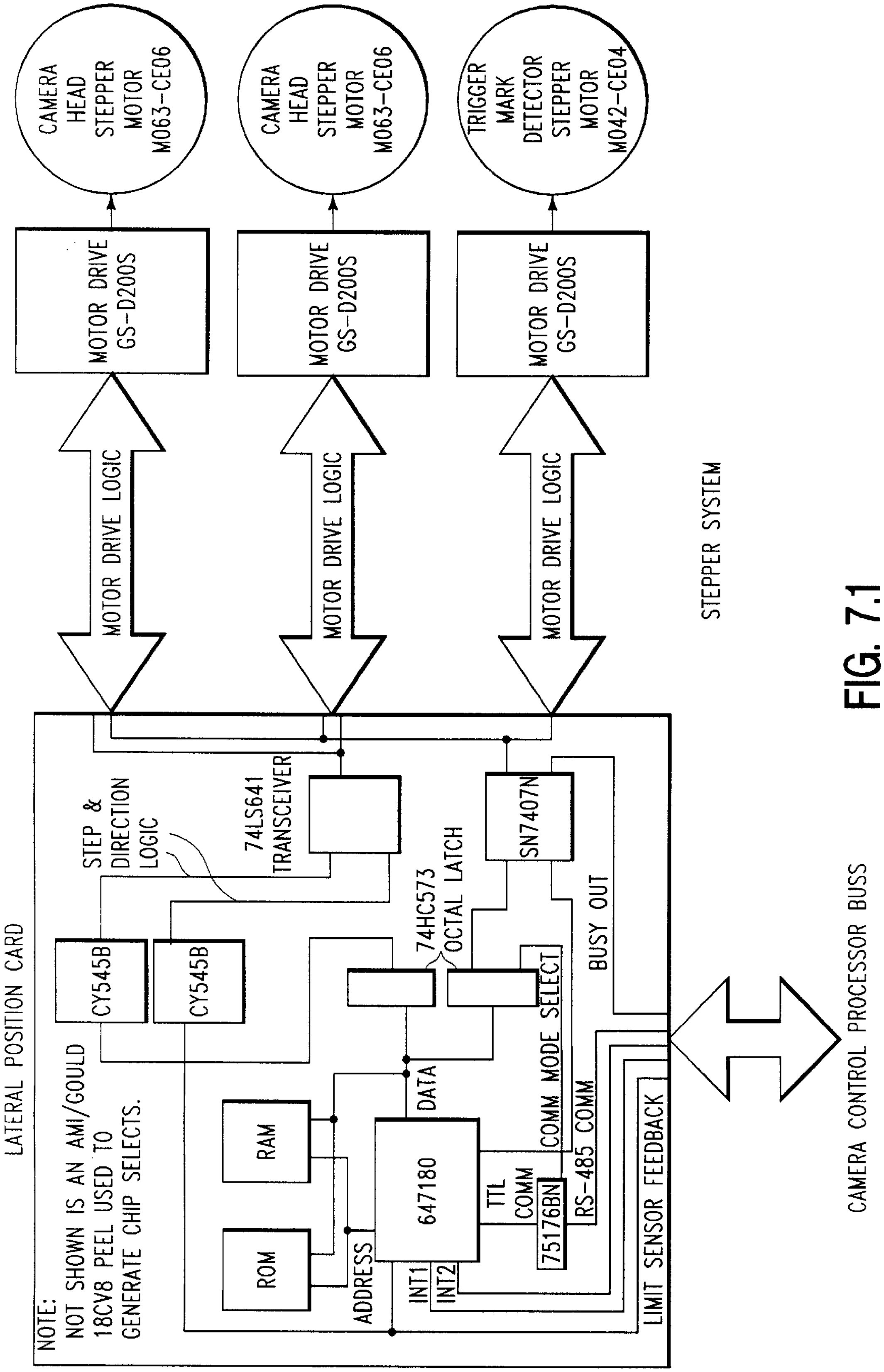
FIG. 7.1

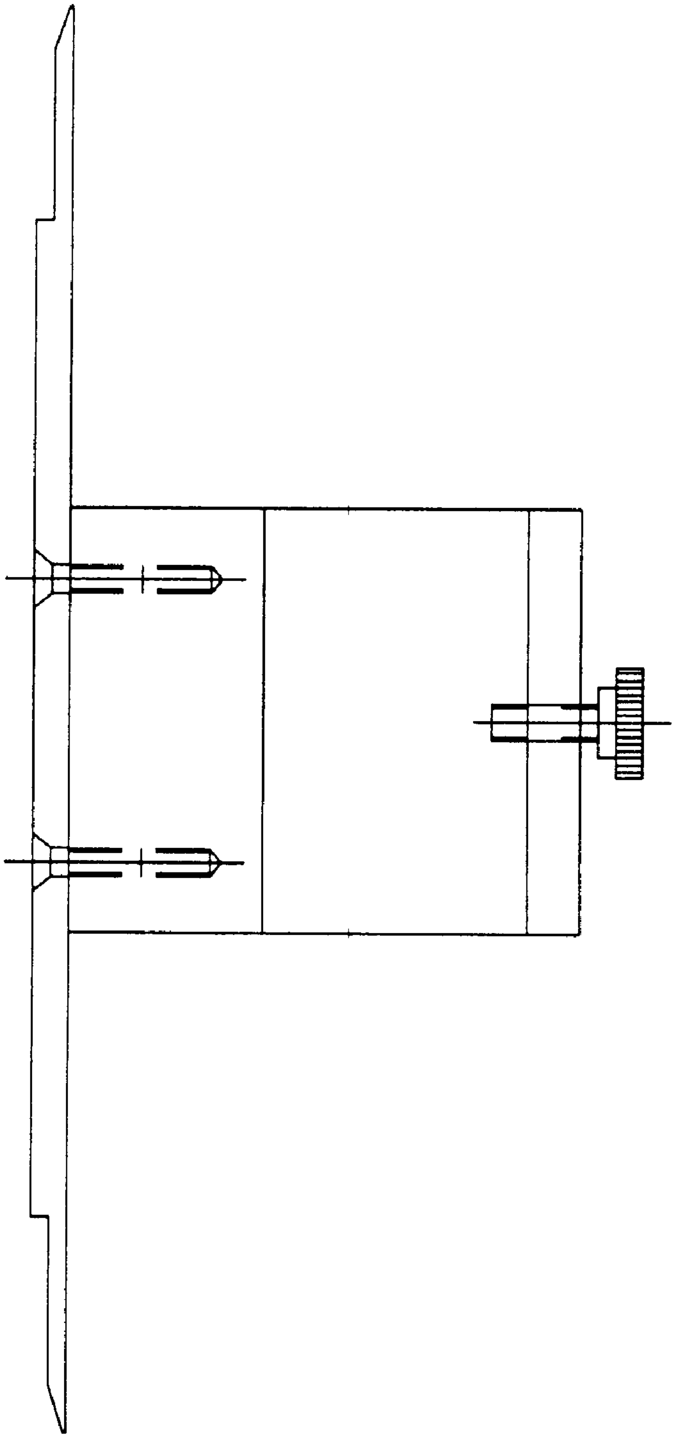
FIG. 7.2

Lateral Scan Control Software Process
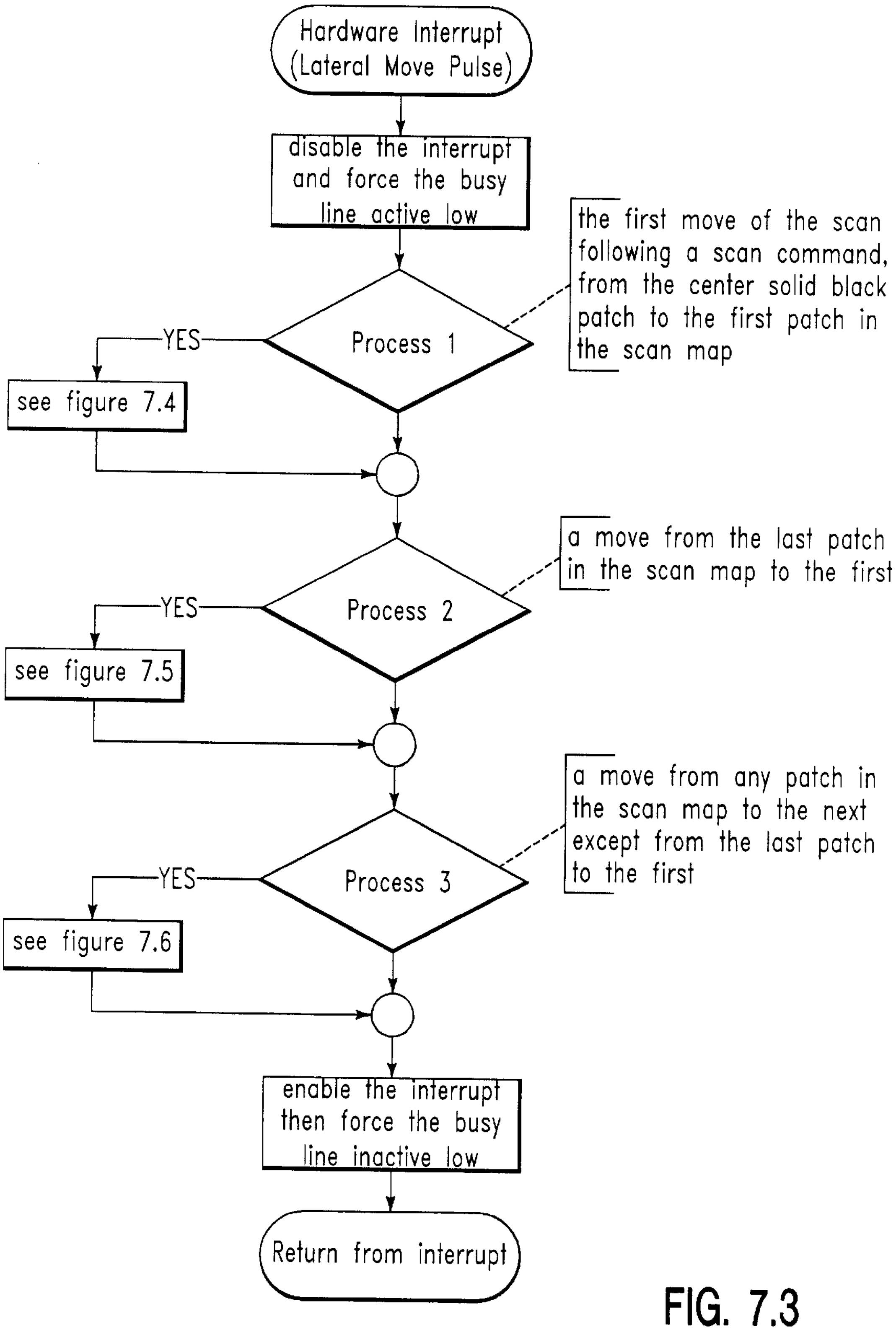
FIG. 7.3

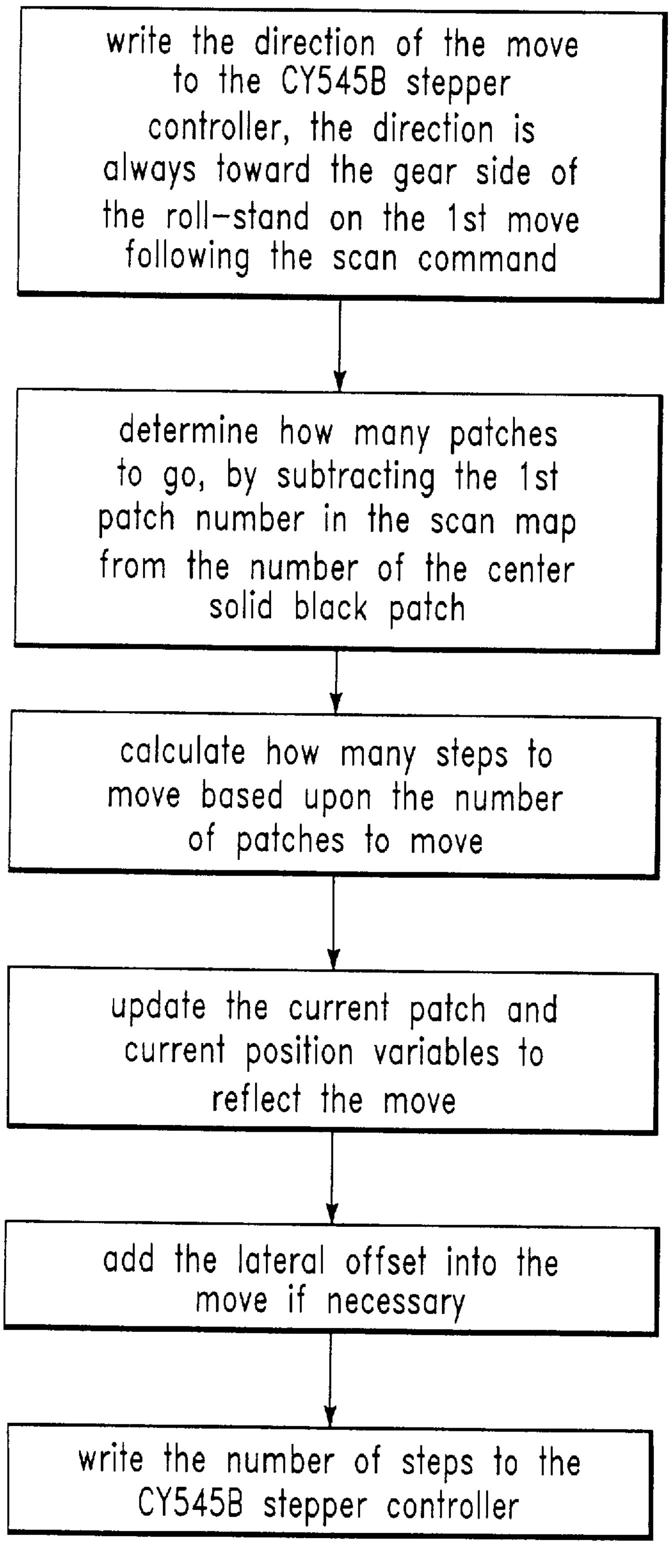
FIG. 7.4

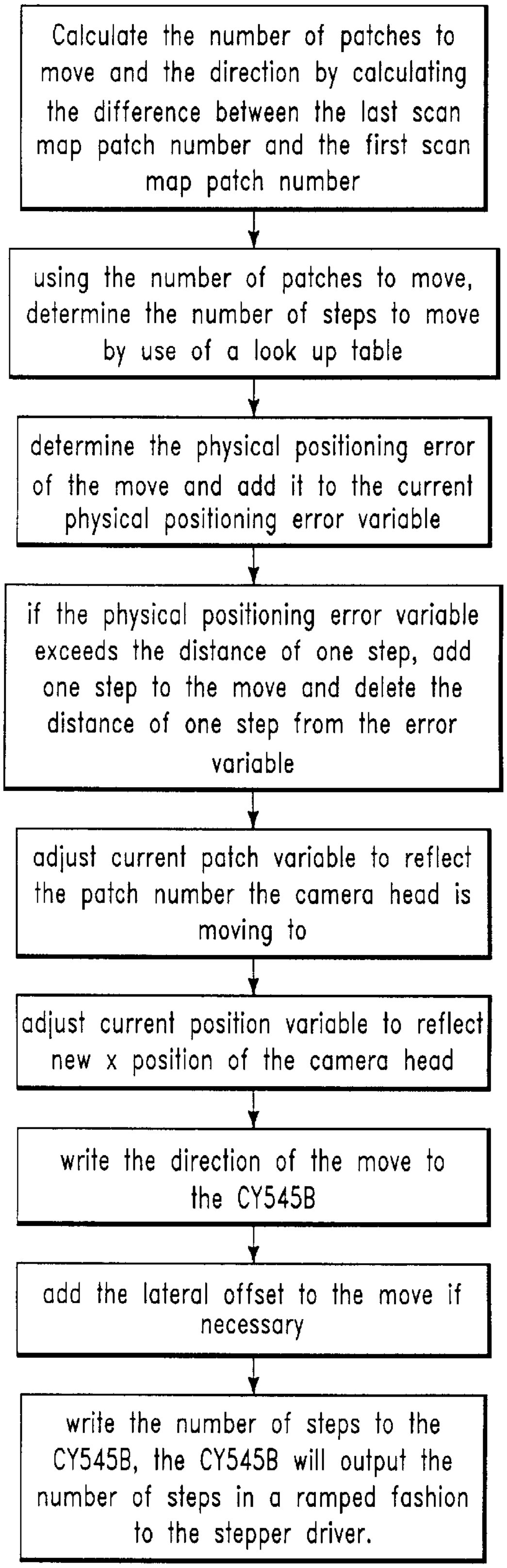
FIG. 7.5

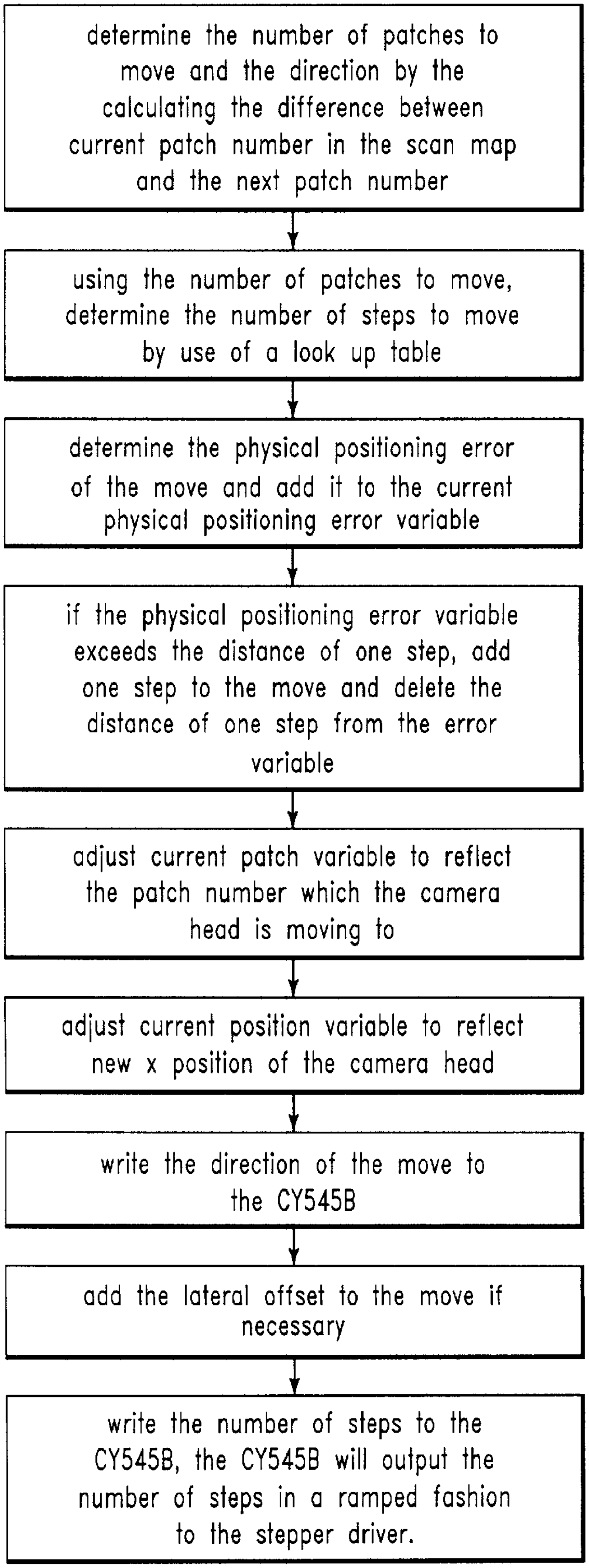
FIG. 7.6

SYSTEM FOR MAINTAINING INK DENSITY

CROSS REFERENCE TO RELATED APPLICATION

This application is a continuation-in-part of our U.S. application Ser. No. 08/141,991 filed Oct. 28, 1993, now abandoned.

BACKGROUND OF THE INVENTION

1. Field of the Invention

This invention relates to maintaining the densities of inks put down on a paper web as same is being fed from a multi-color printing press.

2. Description of the Prior Art

In a typical printing press, multi-colored data is printed repetitively on a web of paper fed from the press using a plurality of zone controlled inking units. The number of inking units corresponds to the number of different colors that may be applied to the web while the number of zones in a unit corresponds to the number of patches of ink that can be put down by a given inking unit.

The density of each patch is dependent on the amount of ink deposited on the paper during printing. Ordinarily, the amount to be deposited is preset prior to the commencement of a run.

From a quality standpoint, proper color density must be established and maintained throughout the run. In the past, there have been systems to monitor the quality of the print and correct it when there is a variation from a preset standard. This is accomplished by adjustment of the inking elements to change the amount of ink being deposited.

Prior art teaches some methods to detect the density of the ink laid down on the paper by evaluating a color bar with some type of detector means. Variations in density are noted and ink adjustments are made to correct for the variation. Examples of same are found in: Schramm, et al., U.S. Pat. No. 4,200,932; Lecha, U.S. Pat. No. 4,752,892; Brunner, U.S. Pat. No. 4,852,485; Keller, et al., U.S. Pat. No. 4,975,862; Pfeiffer, U.S. Pat. No. 5,122,977; Kipphan, et al., U.S. Pat. No. 5,182,721; and, Christie, Jr., et al., U.S. Pat. No. 4,003,660.

It is also known that video inspection is an important part of some process controls. A key element of the inspection of a high speed object, such as a printed web, is the synchronization of a stroboscopic light source and video source. This is done in such a way as to stop the action of motion with the area or object of interest in the field of view of the video source. An example of same is found in Gneuchtel, et al., U.S. Pat. No. 4,794,453.

SUMMARY OF INVENTION

The present invention differs from the known prior art, as typified by the above, in that, among other things, a standard RGB (red, green, and blue) CCD (charge coupled device) camera is utilized to translate what is seen in an image of the color patch to density. This achieves higher quality print. The invention further differs from the prior art by providing greater precision of synchronization of the stroboscopic light source and video acquisition relative to the color bar. This allows for acquisition of color bars with widths of 2 mm or greater to be scanned at press speeds in excess of 3,000 feet per minute. A still further distinction is that in our present invention, lateral movement of the web, web shrinkage, distortion and changes in position of the printed data on the web relative to the centerline of the moving web are compensated for dynamically. This allows for precise lateral positioning of the scanning head relative to the color patch. Another difference is our unique stroboscopic light source assembly including its light guide system to provide even illumination across the area of interest without producing electromagnetic interference which would degrade the video signals.

Accordingly, an object of the invention is an improved system for establishing and maintaining ink density of inks put down on a paper web as it is being fed from a printing press with press speeds in excess of 3,000 feet per minute.

Another object of the invention is a system that will scan both sides of the web independently to establish correct ink density quickly upon press start up. This reduces the time it takes to produce acceptable impressions.

Still another object of the invention is to minimize encroachment on the usable portion of a paper web by decreasing the width of the color bar to 2 mm.

A further object of the invention is to use a unique method to dynamically synchronize the stroboscopic light source to the video camera and to the color bar on the moving web. This allows the color patches to be accurately centered in the field of view of the camera and evenly illuminated during acquisition for press speeds in excess of 3,000 feet per minute.

A still further object of the invention is to use a unique method to compensate dynamically for web lateral movement, distortion, shrinkage and change of the printed data position relative to the centerline of the moving web. This allows the invention to hold the patches more or less centered in the field of view of the camera during acquisition.

Another object of the invention is to provide a more accurate system, over prior art, for establishing and maintaining ink density throughout the press run.

Still another object of the invention is to provide a stroboscopic light source and novel light guide system to produce short duration, even illumination of a patch without the adverse effects of electromagnetic interference of the video signal.

Further objects of the invention are to provide software process control of the closed loop ink control system. They include: software process control of actuation of video acquisition; software process control of video acquisition; software process control of lateral motion of scanning; software process operator workstation control; software process infeed control for detecting web position movement; software process roller stand control for detecting web lateral position; and software process control of ink density control by RGB (red, green, blue) conversion to ink density, ink density evaluation, and ink density correction

BRIEF DESCRIPTION OF DRAWINGS

FIG. 1.1 is a block diagram of the invention and a web printing press configuration in which it operates. When referenced in conjunction with the system overview the closed loop ink control function is easily understood.

FIG. 2.1 represents a schematic diagram of a typical multi-color web printing press. Incorporated in the press line, in accordance with the invention, is a closed loop color control system.

FIG. 2.2 is a representation of the scanning means (#32 in FIG. 2.1) showing the illumination source, carriage, linear rail, camera, etc.

FIG. 3.1 is a schematic of 4 zones of a typical pre-defined color bar where each zone consists of 8 patches. The total number of zones is dependent on the printing press width, and the width of the ink fountain key.

FIG. 3.2 is an illustration showing the various modular cards that make up the camera control processor and their passive back plane.

FIG. 3.3 is a schematic showing the typical wave forms of signals generated during the timing sequences of image capture.

FIG. 3.4 is a schematic of the trigger mark detector and its typical output waveforms.

FIG. 3.5 is a block diagram of the camera control processor (#52, FIG. 2.1).

FIG. 3.6 is the schematic of the logic level trigger circuitry, counter unit, and typical waveforms.

FIG. 3.7 shows a pictorial of a typical web press and closed loop color control system with communication paths.

FIG. 3.8 is a schematic of the trigger mark acquisition circuitry.

FIG. 3.9 is a schematic of the edge detector sensor head circuitry and associated waveforms.

FIG. 3.10 is a pictorial of the infeed edge detector system.

FIG. 3.11 is a schematic representation of the electromechanical function of the edge detector system.

FIG. 4.1 is a flow chart of the closed loop windows work station.

FIG. 4.2 is a flow chart of the bar and map set up.

FIG. 4.3 is a flow chart of the mark and image processor set up.

FIG. 4.4 is a flow chart of the ink density evaluation.

FIG. 4.5 is a flow chart of the work station target density set up.

FIG. 5.1 is a schematic representation of the data structure of the closed loop system.

FIG. 5.2 is an illustration of a pixel data matrix used in obtaining intensity values.

FIG. 5.3 is an illustration of a hue map with a range of 1 to 255.

FIG. 5.4 is a graph representing the Status "T" spectral profile.

FIG. 5.5 is a graph of the spectral response of the CCD camera as defined by the manufacturer.

FIGS. 5.6, 5.7 are flow charts representing the scanning process, video capture, density calculation and communication transmittal to the work station.

FIG. 5.8 is a flow chart representing the density calculation process

FIGS. 6.1, 6.2 are illustrations of the web and press parameters which must be monitored during the closed loop color control process.

FIG. 6.3 is a software flow chart of the roller stand edge detector operation.

FIG. 6.4 is a software flow chart of the infeed edge detector operation.

FIG. 7.1 is a schematic representation of the electromechanical stepping system.

FIG. 7.2 shows the calibration bar for the infeed and roller stand edge detectors.

FIGS. 7.3, 7.4, 7.5, 7.6 comprise the software flow charts for the lateral scan process.

DETAILED DESCRIPTION OF THE PREFERRED EMBODIMENT SYSTEM OVERVIEW.

SUMMARY OF THE CLOSED LOOP INFORMATION FLOW. The following steps illustrate how parts of the closed loop system (FIG. 1.1) work to control printed ink density.

STEP ONE OPERATOR WORKSTATION. The operator workstation sets up and controls the closed loop ink control process. Information and control instructions flow through the system, to and from the workstation, (FIGS. 1.1 and FIG. 4.1) in the following way. Users select color, density, and patch locations at the system work station (FIGS. 4.1, 4.2, 4.3, 4.4 and 4.5). Selections are sent, by a RS-485 network, to the image processor.

STEP TWO IMAGE PROCESSOR. Two parallel arrays (FIG. 5.1), in the image processor memory, hold user selections. The first of these is the color bar patch layout array. It contains the color and patch location information. The second is the patch map. The binary bit state, of each patch map element, enables or disables the use of information, in the color bar patch layout array. Based on these two arrays and a scanning algorithm, (FIGS. 5.6, 5.7, 5.8) the image processor calculates scan map sequences.

STEP THREE CAMERA CONTROL PROCESSOR. Next, (FIG. 1.1) the image processor conveys these scan sequences, by a RS-485 network, to the camera control processor. It combines this information with web offset and web width from the infeed and roller stand motion detection systems (FIGS. 6.3 and 6.4). In addition, the trigger mark detection provides timing information (FIGS. 3.3, 3.4, and 3.11). The camera control processor (FIGS. 3.2, 3.5, 7.1, 7.3, 7.4, 7.5, 7.6) controls the video camera through the lateral position card. It controls the video camera scanning of the color bar.

STEP FOUR IMAGE PROCESSOR. During scanning, the video camera transmits, to the image processor, red green and blue patch information (FIG. 1.1). The image processor calculates the density of each real world patch (FIGS. 5.6, 5.7, 5.8) and stores the values in the patch color density structure (FIG. 5.1).

STEP FIVE WORKSTATION. Finally, the image processor sends, to the workstation, (FIGS. 1.1 and 4.1) by a RS-485 network, the color density information. If necessary, (FIGS. 4.4 and 1.1) the workstation sends ink color control changes to a printing press ink control system. These result in the color correction of the actual printed color bar. Consequently, the entire web data image ink density follows such ink changes.

Let us define the closed loop ink system in greater detail.

Referring now to FIG. 2.1, there is shown in the illustration so much of a printing press 10 as is required for an understanding of the present invention. In particular, a continuous web W of paper is fed through the press 10 in the direction indicated by the arrow. Inks of varying colors are applied to the web via a plurality of inking units, for example, units 11 through 14 for black, cyan, magenta and yellow, respectively. Each inking unit is capable of putting down patches P of color on the web W, with the number of possible patches equaling the number of blades or zones 15 in each unit. The position of the blades is varied by servomotors 16 to change the amount of ink put down on the web W at the position corresponding thereto.

In between data that is being printed on the paper, the inking units are arranged to put down the patches in a straight line across the paper transversely of the direction of feed so as to form a color bar for testing purposes.

A typical color bar, which is printed, in between the printed data is illustrated in FIG. 3.1.

The ink density being laid down in the color bar is representative of the ink density being applied to the paper in the printed data portion. Good quality control dictates that the ink laid down in the printed data be of uniform density.

Therefore, by measuring and controlling the density of the color bar, the invention is controlling the density of the printed data.

Prior to the commencement of a printing cycle, the amount and location of ink to be put down on the web is preset at a color console 21, so that the console 21 automatically sets the servomotors 16 via a distribution microprocessor 22. In that way the inking units 11–14 have the proper gap to allow the right amount of ink to come through. These initial ink feed settings may be determined prior to the start up of the press. This is done by optically scanning the printing plates (not shown) beforehand to determine the apparent density for each representative color.

As noted above, from a quality standpoint the color density of the ink laid down on the paper web W should be maintained constantly throughout the run. In accordance with the teachings of the present invention such a system 31 is provided. Basically, what the system 31 does is read the densities of the ink patches. When there are variations it tells the ink control console 21 how much to adjust in order to maintain the preset levels.

Referring to FIGS. 2.1 and 2.2, system 31 includes a scanning means 32 to traverse the web W for scanning the color bar FIG. 3.1 Since data may be printed on both sides of the web W, scanning means 32 will be mounted on both sides of the web W. The dual scanning means can function independently of one another.

The scanning means 32 (FIG. 2.2) is coupled to a belt 33 and is driven across the web W on a linear track 34 by an incremental stepper motor 45 which is capable of moving the scanning means 32 in 0.015 inch increments across the web W.

The scanning means 32 further includes: a strobe light 35 with associated electronics 36 for illuminating a color patch P in the color bar C (FIG. 2.1); an r.g.b. (red, green, blue) c.c.d. (charge couple device) camera 37 for photographing the illuminated color patch P; and a light guide and diffuser 43. The scanning, illumination and diffuser apparatus ride on a carriage assembly 39 on track 34. Rail guide chassis 40 provides mechanical support for the scanning means. The cover 41 is shown in removed position.

FIG. 3.7 is an illustrated block diagram of the closed loop ink system 31 including its communications links. Closed loop operator workstation A is the main operator terminal. It houses the operator workstation computer 56, image processor computer 55, and the power regulation transformer. A graphical user interface incorporating a Sony VGA monitor and touch screen is employed for data entry and system control. The operator workstation computer is an Intel 80486 based personal computer. It is connected to the graphical user interface, image processor, and ink control console H. Ink density values are sent from the image processor to the operator workstation computer via an RS-485 serial link. The operator workstation computer displays these density values on the graphical user interface and transmits any necessary control signals to the ink control console H via serial link I. The electrical protocol of serial link I is dependent on the manufacturer of the ink control console H. In the case of a Perretta P2100A ink control console, serial link I would be an RS-485 twisted pair.

The image processor communicates with the camera control processor 52 through a separate RS-485 serial link F as well as some discrete conductors (not shown) used for image acquisition handshaking. Also, video signals generated by an acquisition are transmitted to the image processor via multiple coaxial cables K. The camera control processor 52 communicates with the infeed controller D through RS-485 serial link G. Power is supplied to the entire system by the output of a 1 KVA regulation transformer (not shown) in the base of the operator workstation. The regulated 115 volts AC are transmitted via conductors J to the power supply box C. Power supply box C houses the high voltage strobe power supplies, stepper motor power supplies, and the camera control processor logic power supply. The regulated 115 volts AC is transmitted from this box to the infeed controller D via conductors M. Strobe light, stepper motor and logic power are transmitted via conductors L to the rollstand B.

The image processor 55 is an Intel 80486 based personal computer with two standard serial ports. One serial port is used to communicate with the operator workstation computer and the other is used to communicate with the camera control processor. An input/output port is also provided to support handshaking signals used between the image processor and camera control processor during video acquisitions. The video signal is acquired with an Imaging Technologies MFG3M color framegrabber card. This framegrabber card is plugged into the input/output bus of the image processor. Video cables K are connected to it. Upon video acquisition, red, green and blue video signals as well as a composite synchronization signal are output from the camera 37 to image processor 55 via coaxial conductors K (FIG. 3.7). The framegrabber captures and stores all three video signals in separate memory planes. These images are then read into the image processor main memory and manipulated to calculate ink density of the acquired patch.

The video data stored in framegrabber memory must be read by the image processor and manipulated before a new image overwrites it. This is accomplished by the image processor transmitting an active low busy signal L via conductors to the camera control processor 52 while the memory manipulation and calculations take place. Busy signal L is connected to the circumferential positioning card in the camera control processor. It is gated with the source of trigger pulse D using a Gould PEEL 18CV8 programmable logic device so that a new trigger pulse D is not allowed while the busy line is low. Thus, a new acquisition cannot begin until the busy signal is high.

The camera control processor controls: the video acquisition; camera head 32 lateral positioning; trigger mark detector lateral positioning; trigger mark detection; edge detector 61 positioning; edge detection and evaluation; communications with the infeed controller; and communications with the image processor 55. FIG. 3.5 is a block diagram of the camera control processor 52. FIG. 3.2 is an illustration showing the various modular cards that make up the camera control processor. It is comprised of: a passive backplane; processor and memory card; camera timing card; circumferential positioning card; edge sensor card; and lateral position card. All cards and the passive backplane are custom designed but employ commercially available components.

The passive backplane consists of a printed circuit card with a series of DIN 41612 compliant connectors soldered to it. Each connector has 64 contacts. The first 44 contacts carry common signals between all of the connectors. These signals consist of address/data lines, power and control signals such as read write and interrupts. The remaining 20 contacts are used for board specific input/output signals. These input/output signals are brought out to screw terminals and other connectors for interfacing to the various system components.

The processor and memory card plugs into the first connector on the backplane. This card consists of: an Intel 80C188EB microprocessor used for the execution of the various process control software methods; a 64K 27512 ROM non-volatile memory for the storage of the process control software; a 32K 62256 RAM volatile memory for the storage and manipulation of variables during the execution of the process control methods; two 75176 RS-485 interface chips for serial communications with the image processor 55 and the infeed controller D; and input/output buffers to connect the address/data and control signals to the system bus on the passive backplane. When power is initially applied to the camera control processor, this card initializes all hardware on the remaining cards in the system and waits for further commands from the image processor.

The card adjacent to the processor and memory card is the camera timing card. This card consists of a series of Intel 8254 counter units; various input and output buffers; and system bus interface logic. The card produces all camera timing and video acquisition signals. It also produces the signals necessary to fire the Xenon strobe lights. All signals generated on this card are initiated by the rising edge of the circumferential trigger pulse D.

The video camera 32, depicted in FIG. 2.1, is a standard Sony XC-711 RR RGB video camera. It is capable of both NTSC color output or true red, green, blue output. The invention makes use of the wider bandwidth of the RGB outputs even though RGB signal transmission requires more cabling. The resultant video data and synchronization signal is sent to the image processor 55 via coaxial cable K. The camera may be configured in one of several modes. The invention makes use of a combination of the restart reset mode and the non-interlaced field integration mode. The restart reset mode allows video acquisition of one or both video fields asynchronously. The non-interlaced field integration mode allows the camera to acquire just one valid video field. This allows the invention to retrieve data in half the time than if it had to wait for both video fields to be transmitted. The camera 32 requires only two input signals other than power. Referring to FIG. 3.3, they are the horizontal drive clock K and the vertical drive pulses G. Both horizontal drive and vertical drive conform to the EIA RS-170A video signal standard. Both cameras operate identically. Therefore, waveforms and schematics only illustrate one drive system.

The horizontal drive signal is generated by a six bit synchronous state machine. The state machine is implemented in a Gould 18CV8 programmable logic device. A 2 megahertz clock is applied to the input of the state machine and the output goes to a low logic level for the first 9 counts. For counts 10 through 126 the output is high and then the sequence repeats. This produces one horizontal time period of 63.55 microseconds with an active low 4.5 microsecond pulse at the beginning of each period. The output of the state machine is fed to an SGS Thompson 293D high current buffer. This buffer produces enough current to drive the 75 ohm input of the camera module.

The vertical drive pulses G are also the restart reset pulses. The vertical drive is initiated and synchronized by the active high edge of the Trigger signal D. The vertical drive is synchronous to the image acquisition and the strobe illumination. Referring to FIG. 3.6, the vertical drive pulses are generated by an Intel 8254 counter unit and a Gould 18CV8 programmable logic device. The 18CV8 is used to implement some basic logic gates such as an OR gate and an AND gate used in combining the outputs of the 8254. All three counters are fed by a 2 megahertz clock source. All subsequent timing is based on this clock source. Counter two is setup in mode 1 to produce an active low pulse B for the duration of the video acquisition. Counter one is set up in mode 2. Mode 2 is described as a rate generator in the Intel literature. A count equal to 262 horizontal periods is written into counter one's count register. Upon terminal count, a single active low pulse is generated and the count restarts. Thus, the waveform C with a period of 262H is generated by counter one. This count is the vertical drive period as defined by EIA RS-170A. The output of counter one is gated with the duration pulse of counter two and fed into the gate of counter zero. This assures that only two vertical drive pulses occur even though the output of counter one is continues. Counter zero is setup in mode 1. This counter produces an active low pulse equal to 9 horizontal drive periods every time the gate is active. This sequence produces waveform D. Referring to the relationship between waveforms G and J of FIG. 3.3, the first vertical drive pulse resets the cameras internal circuitry and produces irrelevant video data. The second vertical drive pulse is the restart or acquisition pulse. It captures and transfers the valid video field data out of the camera to the framegrabber in the image processor 55 via coaxial cables.

In order to capture the correct video field and store it in the framegrabber memory, a capture signal must be sent from the camera control processor to the framegrabber board. The rising edge of a vertical drive pulse signifies the beginning of a new video field. Therefore, the signal must occur before the vertical drive pulse that precedes the valid video field in waveform J (FIG. 3.3). To accomplish this, an Intel 8254 counter unit on the camera timing card is used. The counter is set in mode 1 with a count equal to 100 horizontal time periods loaded into the count register. The count is initiated by the rising edge of trigger pulse D. The count will expire approximately half way between the two vertical drive pulses G resulting in waveform E. Signal E is transmitted via coaxial conductors K to the framegrabber trigger input. The rising edge of signal E causes the framegrabber to capture and store the next video field. Because the framegrabber is an intelligent card plugged into the image processor input/output bus, the image processor is not automatically affected by the video acquisition sequence. The image processor itself must be signaled when the image acquisition is complete. However, the framegrabber has no provision to signal the host computer. Therefore, the camera control processor must generate the signal. This signal must be active after the entire video signal has been captured and stored by the framegrabber. This occurs approximately 32.274 milliseconds after the rising edge of trigger pulse D. An Intel 8254 counter unit on the camera timing card is set to mode 1 with a count equal to the duration of the video signal loaded into the count register. The count is initiated by the rising edge of trigger pulse D. The resulting waveform F is transmitted via conductors (not shown) and read by the image processor through an input port. The rising edge of waveform F signifies that the entire video field has been stored in framegrabber memory and may now be read by the image processor.

In order to insure proper and consistent illumination of the area of interest, the Xenon flashtube 35 (FIG. 2.2) must be fired at precisely the same time relative to the video acquisition for every acquisition. To accomplish this, the strobe is synchronized to the video acquisition rather than trying to synchronize the camera to the strobe as was done in prior art. The Xenon strobe system consists of a commercial Vision Engineering model 8032 high voltage power supply (not shown), a high voltage capacitor board 36 (FIG. 2.2), a high voltage strobe trigger transformer 42 (FIG. 2.2), a linear Xenon flashtube 35 (FIG. 2.2) and logic level trigger circuitry illustrated in FIG. 3.6. The capacitor board is in parallel with the Xenon flashtube and the high voltage power supply. This board stores the energy needed to fire the flashtube upon excitation. The Xenon flashtube produces a consistent output and has a very long life expectancy with minimal degradation. The logic level trigger circuitry resides on the camera timing card in the camera control processor 52. As stated previously, the vertical drive pulses G perform two functions. The first resets the camera logic and the second performs the acquisition and initiates the transmission of video data to the image processor 55. Therefore, it is beneficial to fire the strobe light on the rising edge of the second vertical drive pulse. This insures that the strobe light fires at exactly the same time during every acquisition. To generate this strobe firing pulse, an Intel 8254 counter unit is used. The counter is setup in mode 1 with a count equal to 100 horizontal time periods loaded into the count register. The count is initiated by the rising edge of the trigger pulse D (FIG. 3.3). At the rising edge of pulse D, the output H of the 8254 counter unit goes low for a count of 100 horizontal time periods and then goes back high. Referring now to the schematic in FIG. 3.6, the strobe pulse H is connected to the data input of a 7474 flip flop. The clock input of the flip flop is connected to the source of the vertical drive pulses G. Therefore a logic low is clocked into the flip flop during the first vertical drive pulse. This produces no change on the output. The second vertical drive pulse, clocks a high logic level into the flip flop. This produces a change on the outputs of the flip flop. The non-inverted output (signal I) of the flip flop is sent via conductors to the lateral position card to initiate movement of the camera head to the next patch. The falling edge signal on the inverted output of the flip flop is used to trigger the strobe light. This falling edge is transmitted via conductors (not shown) to the trigger input of the high voltage power supply. This is the strobe trigger pulse M. As a result, the high voltage power supply generates a 200 volt DC output pulse which is sent via conductors (FIG. 3.7 L) to the high voltage strobe trigger transformer 42 (FIG. 2.2). Along with the high voltage trigger pulse, a constant 600 volt DC is supplied by the high voltage power supply to the capacitor board 36 and the Xenon flashtube 35. The 200 volt trigger pulse is stepped up to 6,000 volts by high voltage strobe trigger transformer. This voltage is applied to the high voltage trigger plate 44 located behind and centered on the flashtube. The high voltage pulse excites the internal gases of the Xenon flashtube. This allows the 600 volts, stored in capacitor board 36, to discharge through the Xenon flashtube. In turn, this produces a short duration high intensity light pulse. The light pulse is guided through and diffused by a light guide, FIG. 2.2. The light beam is projected onto the moving web in the correct pattern and the correct angle. The strobe electronics in the camera head are minimal. The strobe power supply is remotely located. This reduces electromagnetic interference in the camera head to a negligible amount. Also, the weight of the head is minimal allowing fast acceleration/deceleration cycles needed to scan the moving web.

The next card in the system is the circumferential positioning card. This card consists of: circuitry to detect a valid trigger mark even though it may be interspersed with other marks or printed data; an interface for the high resolution optical encoder 53; and circuitry for the generation of the circumferential trigger pulse D.

From the time the printed web impression leaves the last printing unit until the same impression reaches the camera heads 32 of system 31, the web W undergoes many physical changes. For example, it is heated, cooled and subjected to tension changes. It is known, from prior art, that signals can be derived from sensors, such as encoders, placed on the printing press to identify, the start of an impression cycle. Sensors applied in this fashion monitor the impression cycle indirectly and thus do not provide feedback indicative of the now distorted web. Application of such a sensor system to read a color bar would result in an unstable acquisition. The color bar may or may not appear in the field of view and it would not be stable with respect to the center of the field of view. In order to scan the color bar at high speeds with a high degree of consistency, the color patch must be accurately centered in the field of view. A high degree of consistency means that the color patch is acquired and its resulting data is accurate enough to be used to control printed ink density. A high degree of synchronization precision is needed to consistently stop the action of the moving web with the color patch centered in the field of view. This high degree of precision is achieved by the system comprising of a: trigger mark detector 51; camera control processor 52; optical encoder 53; web driven roller 54; and trigger mark T. All are depicted in FIG. 2.1.

In addition to putting down ink for inclusion in the printed data and control strip C, an inking unit, typically the black unit, puts down a trigger mark T on the web W. This mark must be unique in dimension in the direction of web travel from all other marks or printed data that are in line with it. The trigger mark's dimension as well as its distance from the centerline of the print are input to the operator workstation 56 by the operator prior to start up. This mark is used in conjunction with encoder 53 and camera control processor 52 to initiate acquisition and compensate for circumferential distortion of web W. Upon system start up, this data is sent via RS-485 twisted pair serial link to the image processor 55 and from there to the camera control processor 52. This data is used by the camera control processor to seek out the proper mark even though other marks or printed data may be in line with it.

Camera control processor 52 applies direction and position pulses to a stepper motor system (not shown) to position the trigger mark detector 51 above the expected path of travel of the trigger mark T. Trigger mark sensor 51 is a SICK OPTIC NT816412 electro-optical sensor. It's output goes to a logical high level whenever an image, such as a trigger mark, darker than the background travels under it's sensing beam. Therefore, for every mark of print, such as a trigger mark, traveling orthogonal to, and under the sensor 51, an active high level signal is produced. The output signal returns to a low level when the data under the sensor is no longer darker than the background This happens when the trigger mark moves on and only the blank web W is under the sensing beam. Thus, the width of the active high pulse is directly proportional to the width of the mark or data that passed under the sensor. This active high pulse is input to the circumferential positioning card FIG. 3.2 in the camera control processor 52. Along with that signal, the output of the web driven encoder 53 is also input to the circumferential positioning card FIG. 3.2. Encoder 53 is an IVO model GI350020B135 high resolution optical shaft encoder capable of outputting as many as 20,000 pulses per revolution. The encoder 53 is mechanically coupled to the 6 inch diameter web driven roller 54. Roller 54 is in close proximity to the camera heads 32 and the trigger mark detector 51. This allows the invention to compensate for any type of web distortion that has occurred prior to reaching the scanning unit. Because all sensors and the camera heads are in close proximity, no detectable distortion can occur between trigger mark detector 51 and the camera heads 32.

This allows the invention to measure distances with an accuracy of up to plus or minus 0.0009424 inches.

Referring to FIG. 3.4, the output of trigger mark detector 51 is connected to the gate inputs of a multiple timer/counter unit such as the Intel 8254. Counter 0 and counter 1 are setup in mode 1 by the microprocessor control card in the camera control processor 52. Counter 2 is setup in mode 2 and merely provides a readable number relative to the valid trigger marks size. Counter 2 is used for diagnostic purposes only and is not essential to proper operation. In mode 1, the counters output will be initially high and will go to a low logic level on the clock pulse after an active high gate pulse is applied. The counters output will return high upon expiration of the count that has been stored in its register. The clock inputs of all three counters are tied to the output of the encoder 53. This allows the invention to measure the width of every mark that passes under the sensing beam of the trigger mark detector. Counter 0 is setup such that the terminal count is equal to the expected trigger mark size minus 5 percent. Counter 1 is setup such that the terminal count is equal to the expected trigger mark size plus 5 percent. This sets up a window of acceptance of +/−5%. The output of counter 0 is connected to an input of an AND gate. The output of counter 1 is inverted and applied to the other input of the AND gate. The actual logic used is a Gould PEEL173 programmable logic device. However, discrete logic gates such as a 7408 AND gate and a 7404 inverter may be used. In either case, the resulting output of the AND gate would be a signal that is at an active high logic level when the counter 0 count has expired and counter 1 is still counting. Thus, the signal is only active high in the ten percent window setup by counter 0 and counter 1. The output of this AND gate is connected to the data input D of a 7474 flip flop. The output of trigger mark detector 51 is inverted and connected to the clock input C of the same 7474 flip flop. This inversion allows the high to low transition of the sensor output signifying the trailing edge of a mark to become a low to high transition needed to properly clock the 7474. The low to high transition of the clock input of the 7474 transfers the logic level at the data input D to its output pin Q. Thus, if the printed mark being evaluated is longer than the minimum size setup by counter 0 and shorter than the maximum size setup by counter 1, the data D input would be high when the clock input is changed from low to high resulting a high logic level signal at the flip flop output Q. This active high going edge signifies the recognition of a valid trigger mark. If the mark being evaluated is longer or shorter than the expected mark, the data input D would be at a low logic level when the clock input C changes from low to high thus output Q would remain at a low logic level. The output of counter 1 is also connected to the reset input of the 7474 flip flop. This accomplishes two tasks. One, if the mark being evaluated exceeds the maximum expected size setup in its terminal count register, counter 1's output will go high forcing the 7474 flip flop to reset and hold the output Q low. Two, if the mark is of valid size and the 7474 output Q goes high, the expiration of counter 1 will force the flip flop to reset which resets the 7474 output to its low initial state. This process is repeated continuously in real time on all data that passes under the sensing beam.

There is a latency between the event (input) and reaction (output) of any sensor. The trigger mark detector 51 has such a latency. As press speed increases, the pulse widths of the marks passing under the sensor, decrease slightly. To compensate for this, a linear correction equal to PRESS SPEED * 0.034 encoder pulses is subtracted from the initial values stored in counter 0 and counter 1. This maintains the proper acceptance window setup by these two counters.

The valid trigger mark pulse FIG. 3.3 C is active at the trailing edge of the trigger mark. This pulse is used to find the color bar C. The means to accomplish this is an Intel 8254. The circuitry illustrated in FIG. 3.8 is on the circumferential positioning card. The clock input of the counter is connected to the output of optical encoder 53. The encoder resolution is plus or minus 0.0009424 inches therefore an output pulse can be generated that coincides with the color bar C so that the video acquisition can be initiated. The output of the valid trigger mark circuit is connected to one input of an AND gate. The other input of the AND gate is connected to the busy line L FIG. 3.3. By gating the valid mark pulse C with the busy line, no trigger pulse can be generated while the busy line is low. The busy line is low whenever the image processor 55 is evaluating an image or the camera is in motion. When the busy line is high and a valid trigger pulse C is generated, it is transferred to the gate input of the 8254. The 8254 is programmed to mode 5. Mode 5 is a hardware triggered one-shot mode. In this mode, the count is reset and initiated by the rising edge of a signal applied to the gate input. The output pin is initially high and then goes low for one clock count upon expiration of the count loaded into the count register. The offset count is input at the operator workstation 56 by the operator. The offset count is equal to the distance from the trailing edge of the trigger mark to the center of the color bar C. When the operator starts the system this parameter is sent via RS-485 serial link to the image processor. From the image processor it is sent via another RS-485 serial link to the camera control processor. The microprocessor control card then reads the parameter and loads it into the count register of the 8254. Thus, the occurrence of a valid trigger mark resets the counter and initiates a new counting sequence. The count expiration coincides with the passing of the color bar and trigger signal D is generated. Trigger signal D is sent via conductors on the camera control processor motherboard to the camera timing card. Here trigger signal D is used to synchronize all camera and strobe timing during the video acquisition as well as the subsequent video data transfer to the image processor. The combination of a high resolution encoder to measure distances and the use of the trigger mark to reset the counter on every impression allows for very consistent acquisitions within the color bar regardless of press speeds or web tension upsets.

In order to accurately position the camera head 32 laterally centered on the color patch, a series of edge detectors 61 are used. Two such detectors are positioned directly before the first printing unit on either side of the web. These two sensors are driven by the infeed controller D (FIG. 3.7). Data derived from them is transmitted over RS-485 serial link to the camera control processor. Two other identical sensors are placed on either side of the web in the roller stand B (FIG. 3.7). In both cases, the sensors 61 connect via ribbon cables to the edge detector card. This card contains: logic to incrementally step the edge detectors 61 across the web; logic to read limit sensors (not shown); logic to provide drive signals to the linear array in sensor 61; and logic to read the exposed pixel count from the linear arrays. FIG. 3.9 illustrates the circuitry located in the sensor head 61. The sensor itself is a TSL216 opto sensor available from Texas Instruments. The sensor comprises of a linear array of 192 sensor elements referred to as pixels as well as the underlying drive circuitry. The pixel spacing is 0.005 inches. The sensor requires that a pixel clock A and start integration pulse B be input to it for proper operation. The sensor then generates an output that is an analog value of each pixel. Each analog value is shifted out of the TS216 consecutively generating waveform C. The magnitude of each analog value is proportional to the amount of light striking the corresponding pixel. Also, the sensor generates an end of conversion pulse F which indicates that all of the pixels have been transferred out of the sensor and a new integration period can begin. All signal timing originates with the pixel clock A. Pixel clock A is generated by an Intel 8254 counter unit. It is located on the edge detector board (FIG. 3.11) and is set in mode 3. Mode 3 is described by Intel as the square wave mode. In this mode, a count is loaded into the count register and the count begins. When half of the count has expired, the output goes from high to low. Output returns high when the second half of the count expires. The sequence repeats continuously. Thus, a 4 megahertz system clock generated by the microprocessor and memory card is applied to the clock input of the counter. A value of 16 is loaded into the count register. This produces a 250 kilohertz square wave which is the pixel clock A. The pixel clock is connected via conductors directly to the Texas Instruments TSL216 opto sensor. The interval between start integration pulses B defines the integration period of the sensor. The application of the start integration pulse to the TSL216 causes the analog data C from the last integration period to be output from the sensor. The analog data C is fed to the non-inverting input of an LM339 comparator. The inverting input is fed by a voltage divider which sets up a threshold voltage of 2 volts. Whenever the pixel data C is above this 2 volt threshold, the output of the LM339 goes to a high logic level. Whenever the pixel data C is below 2 volts, the output of the LM339 is a logic low. A typical output for the LM339 is depicted by waveform D. The output of the LM339 is fed into the data input of a 7474 flip flop. For timing purposes, the pixel clock is inverted and connected to the clock input of the flip flop. This causes the data on the falling edge of the pixel clock to be transferred to the flip flop output. Thus, a square wave E is produced at the output of the flip flop. The active high portion of the waveform E is equal to the number of exposed pixels. Waveform E is transmitted via ribbon cable to the edge detector card. On the edge detector card (FIG. 3.11 ), waveform E is ANDed with the pixel clock to reproduce waveform D and connected through the system bus to the counter input of the 80C188EB microprocessor on the microprocessor controller card. The 80C188EB has two counter inputs. Therefore, one sensor is connected to channel 0 and the other sensor is connected to channel 1. The end of conversion output from the TSL216 is connected to the edge detector card also. It is buffered and connected via the system bus to an interrupt input on the 80C188EB. Thus, the value stored in the internal counters when the end of conversion signal goes active is equal to the number of exposed pixels in each sensor. Upon sensing the interrupt, the process control software reads the two counters to determine the number of exposed pixels. The light source A is an infrared LED connected to the 5 volt logic supply through a current limiting resistor. An infrared light filter is applied over the face of the opto sensor B so that it will not be affected by normal ambient light.

The sensor is connected to a belt which is driven by an incremental stepper motor so the sensor can traverse across the web W. Each incremental motor step is 0.009 inches. Limit sensors are provided on the ends of the bar holding the belts to serve as home limit sensors. The sensors 61 are stepped by the application of direction and clock pulses to an GS-D200S motor driver (not shown). The GS-D200S is coupled via a gear to the drive belt. The direction and clock are generated by an 74LS573 data latch on the edge sensor card. The stepper motor increments one step on the rising edge of every clock pulse. The process control software writes a logic low to the latch then a logic high producing the desired waveform. The direction pulse is held at a logic high level to move the motor towards the home limit sensors and at a low logic level when moving towards the web W.

Upon system startup, the edge detectors 61, are driven towards the home limit sensors. The limit sensors are connected to an input port on the edge detector card. The microprocessor and memory card monitors the limit switch status. When a limit is sensed, the microprocessor controller stops sending drive signals to the stepper motor drive. When both sensors have reached their respective limit sensors, the sensors are calibrated. During calibration the sensors' exposure time is adjusted by lengthening the interval between start integration pulses until all pixels have been illuminated by the infrared light source. This compensates for degradation of the light source as well as any build up of dirt and dust on the sensors' face. The sensors are then moved towards the web one step at a time. In between each step the edge detector is read to check for the edge of the web. If all pixels are still illuminated, the step count is stored in the microprocessor controller's volatile memory and another step is taken. Thus, the total number of steps made by the stepper motors system is accumulated in the microprocessor controller's volatile memory. One count is kept for the right side sensor and one count is kept for the left side sensor. When the pixel count is less than the total number of pixels the sensor is at the edge of the web. The stepper motor continues to step towards the web until approximately half of the sensor is exposed. The pixel count is added to the step count to determine the position of the edge of the web with respect to the home sensor. This dimension is calculated for both sides of the web.

The edge detectors placed before the first printing unit are too far away from the camera control processor to be connected directly to it. Therefore, a second control computer referred to as the infeed controller is used to collect data from the edge detectors and transmit this data via an RS-485 serial link G (FIG. 3.7) to the camera control processor. FIG. 3.10 is an illustration of the infeed control system. The edge detectors 61 and all drive electronics are identical to that of the roller stand and camera control processor. The dimensional data derived from the edge detectors 61 is used by the camera control processor to accurately find the center of the printed image, thus the center of the color patches, on the printed web W. This is necessary because the printed data may not always be centered on the web. Also, the web may have changed in width due to the printing, heating, and cooling processes.

Referring to FIG. 3.10, the infeed system comprises: an infeed controller box 1, and an infeed sensor bar J. The infeed controller box I further comprises: a power supply A for logic level power to the infeed controller D; a power supply B for the generation of power for the stepper motors E; motor drivers C for interfacing between the logic level signals of the computer D and the stepper motors E; and infeed controller D. Infeed sensor bar J further comprises: incremental stepping motors E; edge detectors 61; limit sensors F; motor control cable G; and sensor cable H. Sensor bar J is identical to the sensor bar located in the roller stand B (FIG. 3.7). Infeed controller D is made up of the same microprocessor and memory card and edge sensor card used in camera control processor 52. The infeed controller is only responsible for the positioning and reading of the edge detector data and transmission of the resulting data to the camera control processor. Therefore, the passive backplane is slightly different than the one used in the camera control processor. It has only enough connectors for the microprocessor and memory card and the edge sensor card. The edge detector process control software is the same as that of the camera control processor 52. Cable H connects all signals relating to the sensor 61 to the infeed controller. Cable G carries the output of motor drivers C to the stepper motors E.

Closed Loop Color Bar Mapping Method

The Color Bar Patch Layout array (Data Structure Diagram FIG. 5.1) is arranged by the user at the system work station, to match the layout of the Actual Printed Color Bar, by assigning one of the pre-defined Ink Zone Definitions (Data Structure Diagram FIG. 5.1) to each ink zone. An ink zone is defined as an 8 patch block whose position is relative to a printing press ink key in a printing press ink fountain. The number of ink zones is dependent upon the printing press width and ink fountain key size. The Ink Zone Definition in its basic form has 4 of the 8 patches always defined such that indices 0, 2, 4, 6 are assigned Color 1, Color 2, Color 3, Color 4 respectively. Currently, the Color 1=Cyan, Color 2=Magenta, Color 3=Yellow, Color 4=Black. It is possible that in future applications additional Ink Zone Definitions may assign Color 1, 2, 3, 4 in a different sequence or that the colors will be defined as special colors other than Cyan, Magenta, Yellow and Black. Regardless of the color assignment however, Color 1,2,3,4 will always be placed at indices 0, 2, 4, 6 respectively. Tones and paper patch assignments are defined at indices 1, 3, 4, 7.

The Patch Map (Data Structure Diagram FIG. 5.1) is an array parallel to the Color Bar Patch Layout. The binary bit state of each Patch Map element is a flag indicating that the corresponding color patch will be used. If an element in the Patch Map array is set to 1, then the corresponding element in the Color Bar Patch Layout will be included in the generation of the Scan Map array, otherwise the corresponding patch will be ignored.

The user configured Color Bar Patch Layout array, Patch Map Array along with the Ink Zone Definitions are sent from the work station to the image processor via an RS-485 network. A copy of the arrays and definitions are sent to the camera controller from the image processor via an RS-485 link. Both the image processor and the camera controller use the two parallel arrays, the Ink Zone Definitions and an empirically derived sequence algorithm to calculate the scanning sequence. The sequence of patch numbers representing the path and pattern of the scanning sequence is stored in the Scan Map array. The sequence algorithm is defined as follows:

1) During the first half of the first pass, as the camera traverses from the first patch to the last patch, the camera reads colors 1, 2, 3, and 4.
2) During the second half of the first pass, as the camera traverses from the last patch to the first, colors 2 and 1 are read.
3) During the first half of the second pass, the camera reads colors 3 and 4.
4) During the second half of the second pass, the tones and paper patches are read.

A pass is defined as the traversal of the camera from the lowest index of the Actual Printed Color Bar to the highest index and then back to lowest index. A scan is defined as two complete passes of the camera across the Actual Printed Color Bar.

An additional data structure is created in the image processor memory that stores indices of physical patch locations that are used by the image processor as it controls and processes the scan sequence. The indices point to patches in the Actual Printed Color Bar. The data is defined as follows:

The following examples and descriptions are based on the Data Structure Diagram FIG. 5.1.

| Variable Name | Patch Number | Description |
|---|---|---|
| first_patch = | 0 | The first occurrence of a printed patch. |
| last_patch = | 31 | The last occurrence of a printed patch. |
| first_solid = | 0 | The first occurrence of a defined solid patch. |
| last_solid = | 30 | The last occurrence of a defined solid patch. |
| first_cyan = | 0 | The first occurrence of Color 1. |
| first_mag = | 2 | The first occurrence of Color 2. |
| first_yel = | 4 | The first occurrence of Color 3. |
| first_blk = | 6 | The first occurrence of Color 4. |
| last_cyan = | 24 | The last occurrence of Color 1. |
| last_mag = | 26 | The last occurrence of Color 2. |
| last_yel = | 28 | The last occurrence of Color 3. |
| last_blk = | 30 | The last occurrence of Color 4. |

The Scan Map algorithm defines the following: 1) The sequence algorithm governs the color sequence to be followed; 2) The first patch number to be scanned, in the first half of the pass, is defined by the first_solid patch number; 3) the first patch number to be scanned, in the second half of the pass, is the first occurrence of color 3 that follows the first_solid patch number; 4) Colors 1 through 4 are located at every other patch number, starting at index 0 of each ink zone; 5) Tones and paper patches are located at every other patch number, starting at index 1 of each zone.

The Scan Map is created for the first half of the first pass by placing the first_solid patch number at index 0 of the Scan Map. Stored at each successive index of the Scan Map is the previous patch number incremented by 2. The process is continued until the value stored in the Scan Map reaches the last_solid patch number. The second half of the first pass starts by storing the patch number of the last occurrence of Color 2 (last_mag=26) at the next Scan Map index. At each successive index of the Scan Map, the patch number stored is decremented by 2 for Color 2 or by 6 for Color 1. The process is continued until the patch number reaches the first_solid patch number. The first half of the second pass starts at the first occurrence of Color 3 after the first_solid patch number (first_yel=4). The first_yel patch number is stored at the next Scan Map index. At each successive index of the Scan_Map, the previous patch number is incremented by 2 for Color 3 and by 6 for Color 4 and stored. The process continues until patch number reaches the last occurrence of Color 4 (last_black=30). The second half of the second pass starts by storing the patch number of the tone or paper patch that occurs immediately prior to the last_solid patch number at the next Scan Map index. At each successive index the previous patch number is decremented by 2 and stored in the Scan Map.

At this point, the Scan Map data is complete. In order to process a scan however, additional information is needed in conjunction with Scan Map to coordinate the retrieval and processing of data coming from the camera. By following the path of indices stored in the Scan Map, the image processor can determine the Scan Map index that will be used to indicate which pass is being performed within a scan. Using the example (Data structure Diagram FIG. 5.1) Scan Map and by following the sequence algorithm, it can be calculated that index 23 of the Scan Map is the point where pass 1 will be completed, index 31 is the completion of pass 2A and that index 39 is the completion point of pass 2B. The indices of pass 1, 2A & 2B will be referred to as pass indicators.

Video Data Processing

During a video acquisition in a standard color frame grabber, the picture information is digitized and stored in 3 separate memory planes representing the primary color components. (RGB=red, green, blue). A memory plane is organized as a matrix of 1024×1024 picture elements (pixels) where each pixel represents an intensity value with a range of 0 through 255. Pixels that have a value of 255 represent the highest intensity of a color. Conversely pixels having a value of 0 represent the lowest intensity of color. The RGB values of the actual video 'picture' acquired by the camera are stored in each respective memory plane as a 640×480 matrix starting at coordinate 0,0. The area of interest within the matrix from which the color samples will be read, originates at coordinates 304,216 and is 32×48 pixels in size. Given a total camera field of view of approximately 0.250 inches, the physical size of the area sampled is approximately 0.020" high by 0.020" wide. The pixel data within the sample area of each color plane is moved from the frame grabber memory to the image processor memory for processing. Each block of RGB pixel data is stored in its own respective 32×48 sample matrix. RGB data for the overall 640×480 matrix remains unaltered in frame grabber memory. The average intensity of a particular color's sample matrix is computed by summing all the values within the 32×48 sample matrix and then dividing by the total number of pixels summed.

All the matrices processed by the image processor are addressed in row, column order. The example 3×3 matrix (FIG. 5.2) contains 9 pixels. To obtain the average intensity of the example matrix, sum the elements P(0,0)+P(0,1)+P(0,2)+P(1,0)+P(1,1)+P(1,2)+P(2,0)+P(2,1)+P(2,2). Then divide the result by 9. To calculate the average intensity of the center column within the matrix, sum P(0,1)+P(1,1)+P(2,1) and then divide the result by 3.

Closed Loop Scanning Process

Although the closed loop control system operates with a camera for each side of the web, the process description will describe a single camera since the second camera is a redundant process. Both cameras follow the scanning process concurrently. The scanning process is centrally controlled from the image processor. By pressing a start button at the operator workstation, the operator initiates the transfer of the color bar mapping data followed by a unique command code, via the RS-485 network. The command code instructs the image processor to start the scanning procedure. The image processor sets the busy signal (L of FIG. 3.3) of the camera control processor to a low level through a standard 8 bit parallel output port. This signifies a 'busy' condition exists, in effect causing the camera control processor to ignore trigger mark signals. The color frame grabber is then initialized as follows:

1) The frame grabber's red, green, and blue analog to digital converter high and low references are set to values that are determined by a calibration procedure that is periodically performed by the operator. Calibration is accomplished by setting the camera color balance (see ink density processing) and then reading a 18% reflectance factor neutral gray photographic standard and setting the red, green and blue negative analog to digital converter references to values that cause the respective outputs to output a value of 45. Output values range from 0 through 255. Therefore, an output of 45 is 18% of the total range. A 98% reflectance factor neutral white standard is read and the red, green and blue positive analog to digital outputs are adjusted to cause the outputs to output 250 respectively.

2) The acquisition and frame registers are set such that a single video frame of red, green, and blue values is stored in respective red, green and blue memory planes when a capture signal is received.

The image processor passes a copy of the bar mapping data to the lateral position card. A Scan Map and the pass indicators are calculated simultaneously by the image processor and the lateral position card. The image processor then instructs camera control processor to initialize the web edge detection system and lateral position card. The camera control processor responds with an acknowledgment that the initialization process is completed. The lateral position card responds by informing the image processor that the initial physical positioning of the cameras and the trigger mark sensor are completed. Before the scanning process begins, the camera must be moved to a black solid color patch located near the center of the web. The patch position is calculated by the formula ((number of ink zones/2)*8)+black solid color index. (Black solid index=6 as defined by Data structure Diagram FIG. 5.1 ink zone definition). In the Data structure Diagram FIG. 5.1 example, the target patch in the Actual Printed Color Bar would be patch number 22. The lateral position card is sent a command, via the RS-485 network, to move to the center solid black patch. The image processor sets the busy signal (L) to a high level. This allows the camera control processor to process a trigger mark signal and acquire a video frame. Signal F of FIG. 3.3 is monitored through a standard 8 bit parallel input port by the image processor. A rising edge signifies that a video acquisition is completed. The busy signal (L) is set low to disable further trigger mark signal processing.

The area of interest (AOI) within the red, green, and blue frame grabber memory planes is processed for hue and intensity. Hue and intensity software and hardware functions are provided by the frame grabber manufacturer. Intensity is a magnitude of brightness of particular color. It is represented by a number ranging from 0 to 255 where 0 signifies no intensity and 255 represents the brightest intensity. Hue is a relative value that represents a color in the spectrum. Hue values (see FIG. 5.3) range from 0 through 255.

An average intensity level of 50 or lower signifies that the sample is in fact a black patch. The left and right edge of the black patch is located using the following process:

1) Read the average intensity value of a column pixels starting from the center of the red memory plane AOI. The y coordinates of the column correspond to the top and bottom of the memory plane AOI. (y=216 to y=264). The center column x coordinate is at x=319. The red memory plane AOI is used arbitrarily since black ink filters all three of the primary RGB colors.

2) Compare the intensity value within the column with the average intensity of the entire red memory plane AOI.

3) If the columns average pixel intensity is not at least double that of the entire AOI pixel intensity then the edge is not found; decrement (for finding left edge)/increment (for finding right edge) the column coordinate and repeat step 2. Otherwise the column coordinate is saved as an edge coordinate.

Using the column coordinates of the left and right edge with respect to center column coordinate, the actual longitudinal position of the camera, when the video was acquired, can be calculated. Each pixel covers a field of view of approximately 0.00045". The width of the black patch can be computed by subtracting the left edge column coordinate from the right edge column coordinate and then multiplying the result with field of view dimension. The position of the memory plane AOI with respect to the center of the black patch video image is calculated as follows:

1) Compute the distance from the center of the memory plane AOI by subtracting the center column coordinate from the left edge column coordinate and then multiply by 0.00045".

2) Divide the calculated patch width by 2.

3) Subtract the result of step #2 from the result of step #1.

The value computed in step #3 is the actual distance from the camera field of view center to the center of the black patch video image. If the computed distance is greater than 0.012", the image processor sends a command via the RS-485 network to the lateral position card, instructing it to move toward the center by the amount of the computed distance. The sign of the correction value determines the direction the camera needs to travel.

Once the camera position is determined to be within the 0.012"limit, the actual process of scanning the Actual Printed Color Bar can begin. A 'run' command is sent from the image processor to the lateral position card. From this point, each time the image processor drives the busy signal (L) to a high level, a trigger mark signal is processed by the camera control processor and a video image is acquired. The lateral position card will also position the camera at the next patch number indicated in the Scan Map after the video acquisition. The scanning process will continue until a 'stop' command is received by the image processor from the operator workstation. The image processor may also receive a 'stop' command from the camera control processor for exceptions such as control system failures or printing press problems.

The FIGS. 5.6 and 5.7 flowcharts describe the image processor's software scanning process.

Ink Density Processing

As defined by American National Standard CGATS.4-1993, a densitometers spectral response is the product of spectral power distribution of the lamp, attenuation of the optics and filters, and the spectral response the detector used. Optical density is the light absorbing property of a material, expressed as the logarithm of the reciprocal of the reflectance factor. (Density=LOG10[1/Reflectance]). The reflectance factor is the ratio of the reflected flux from the sample material to the reflected flux from a perfect reflecting diffuser. A Status 'T' response was defined to closely match characteristics of graphics arts materials normally used in the United States such as ink-on-paper printed materials, off-press proofs and original art to be color separated. The status 'T' response consists of a red, green, and blue filter set whose response is determined by a combination of the filter, the detector and the light source, and must conform to the curve defined in FIG. 5.4.

The FIG. 5.5 response curve is defined by the manufacturer of the CCD camera. It represents the combined response of a 3200° K halogen light source, red-green-blue filters and a CCD sensor. An adjustment in the camera is provided by the manufacturer allowing for color balancing when using light sources of different color temperatures such as a stroboscopic flash tube. The Xenon flash tubes peak response is in the blue/green region, creating a color imbalance that exceeds the cameras color balance compensation capabilities.

A 455 nm optical filter is added to the camera lens to attenuate the level of blue light the camera sensor is exposed to. The camera's blue color balance adjustment is used to fine tune the peak amplitude of the blue output to match the status 'T' blue peak level. Green peak levels are equal and require no adjustment. The camera's red color balance adjustment is boosted to match the status 'T' red peak level. Bandwidths for the camera's filter/sensor response are narrower than the status 'T' definition at the red and blue extremes. Bandwidth compensation is performed in the density calculation software process.

The density calculation software process is performed after each image acquisition as illustrated by the scanning process flow chart. Using the patch number of the current image, Color Bar Patch Layout and Ink Zone Definition information, the process ink color of the patch image stored in the frame grabber memory planes is determined. The red, green, and blue memory plane AOIs are moved from frame grabber memory to their respective matrices in image processor memory. Using the frame grabber manufacturers hardware/software functions, the hue and intensity value of the composite RGB color is calculated. The intensity level of each individual memory plane AOI is calculated. The current color being analyzed determines which color memory plane AOls are to be used to determine the reflectance. Printing process colors have the following characteristics:

CYAN—filters red and passes most green and blue light.

YELLOW—filters blue and passes mostly red and green light.

MAGENTA—filters green and passes red and blue light.

BLACK—filters all three colors of light.

As previously stated, CYAN ink filters red and passes mostly green and blue light. Looking at the CCD spectral response graph, it can be seen that the red response region is overlapped by a portion of the green region and a small portion of the blue region. To obtain the reflectance factor for CYAN, ideally the integral value of the red memory plane AOI would be used. Since the green and blue responses overlap the red response, a proportional amount of their values are used to compensate for bandwidth differences between the CCD camera response and the status 'T' response curves. The following formula is used to calculate the total reflectance factor:

reflectance factor=((red weight*average red memory plane AOI intensity)/250)+((green weight*average green memory plane AOI intensity)/250)+((blue weight* average blue memory plane AOI intensity)/250).

The number 250 is the output value established for the red, green and blue outputs when reading the 98% neutral white calibration standard.

Weights for each colors RGB filter response were determined empirically by comparing density readings from an industry standard status 'T' densitometer to the readings obtained with the CCD camera.

For CYAN the red, green, and blue weights are set as follows:

| | | | | | | | | |
|---|---|---|---|---|---|---|---|---|
| Hue <= | 156 - | red weight = | 0.90 | green weight = | 0.10 | blue weight = | 0.00 |
| Hue = | 157 - | red weight = | 0.915 | green weight = | 0.85 | blue weight = | 0.00 |
| Hue = | 158 - | red weight = | 0.93 | green weight = | 0.07 | blue weight = | 0.00 |
| Hue = | 159 - | red weight = | 0.935 | green weight = | 0.065 | blue weight = | 0.00 |
| Hue >= | 160 - | red weight = | 0.945 | green weight = | 0.055 | blue weight = | 0.00 |

For MAGENTA the red, green, and blue weights are set as follows:

| | | | | |
|---|---|---|---|---|
| Hue <= | 4 - | red weight = 0.00 | green weight = 0.65 | blue weight = 0.35 |
| Hue = | 5 - | red weight = 0.00 | green weight = 0.70 | blue weight = 0.30 |
| Hue >= | 6 - | red weight = 0.00 | green weight = 0.75 | blue weight = 0.25 |

For YELLOW the red, green, and blue weights are set as follows:

| | | | |
|---|---|---|---|
| All yellow hues - | red weight = 0.04 | green weight = 0.04 | blue weight = 0.92 |

For BLACK the red, green, and blue weights are set as follows:

| | | | |
|---|---|---|---|
| All black hues - | red weight = 0.33 | green weight = 0.33 | blue weight = 0.33 |

The calculated reflectance factor for the current patch is then plugged into the industry standard reflectance density formula and the result is stored in the Patch Color Density matrix.

A flowchart (FIG. 5.8) describes the software process for density processing.

Web Position Detection and Correction Method.

The position of the web on the printing press is continuously monitored during the closed loop ink control process at two locations. First location is the infeed sensor assembly 62 of FIG. 2.1, located before the first inking unit 11. Second location is the roller stand sensor assembly 63, located on the roller stand before scanning means 32. Each sensor assembly consists of two edge detectors 61.

Two parameters of the web are measured at both locations. These are web width and web position relative to center of the printing FIG. 6.1. At the start of the control process edge detectors 61 move from home position to the center of the press until they sense the edges of the web FIG. 6.3 and 6.4. The distances traveled from home positions to the edges of the web are measured as LHE (left home to edge distance) and RHE (right home to edge distance). Since the left and right home sensors are in fixed position relative to the center of print, parameters LC (left home to center), RC (right home to center) and HH=LC+RC (home to home dimension) are constant dimensional parameters of the printing press. These parameters are measured at the calibration of the system.

The web width WW is determined form FIG. 6.1 as WW=HH−LHE−RHE. Center of the web relative to the left home sensor is WC=LHE+WW/2. Finally web offset is determined as the difference between center of print and center of the web relative to left home sensor, WO=LC−WC.

The web width WW and web offset WO measured at 62 of FIG. 2.1 before the first inking unit are sent to the roller stand as infeed web width IWW and infeed web offset IWO. A second set of web parameters are measured at 62 of FIG. 2.1. These are roller stand web width RWW and roller stand web offset RWO. In reference to FIG. 6.1 a total web offset TWO is then computed, as TWO=IWO+RWO where IWO represents the lateral offset of the print on the web and RWO represents the offset of the web at the location of scanning means 32 of FIG. 2.1.

A new parameter called shrinkage factor, FIG. 6.2, SHF is determined as the ratio of web width before the first inking unit and the web width at the roller stand, as SHF=IWW/RWW. Then a step factor STF is computed as STF=SHF * BASE_STEP. Where BASE_STEP is the basic step size of the camera drive stepper motor, expressed in inches multiplied by 1,000,000. In our case the BASE_STEP=15,000. It may vary by using different drive components for the camera drive.

Total web offset, FIG. 6.2, TWO and step factor STF are constantly monitored during the control process. At the start of the control process the first samples of TWO and STF are taken as valid samples. If there is a significant difference (greater then 0.009 inches) between the latest sample and the valid sample of the total web offset, then the latest sample value of TWO is taken as the valid sample of TWO. It is sent to camera control processor's lateral position card 52 of FIG. 2.1 to correct lateral position of scanning means 32 during a scan. Also the latest sample of step factor STF is taken as valid. It is sent to camera control processor's lateral position card 52 of FIG. 2.1 if the difference between the last sample and valid sample of STF is greater then 0.0015 inches.

Stepper System Hardware:

Precise lateral positioning of the camera head and trigger mark detector is accomplished with a stepper motor system FIG. 7.1. The system consists of: a Lateral Position Card 7.1 housed in the camera control processor FIG. 2.1 52; three standard SGS-Thompson GS-D200S stepper drivers; three conventional 1.8Â SLO-SYN stepper motors (two of Type M063-CE06 for the camera heads; and one of type M062-CE04 for the trigger mark detector); and six Omron photo detectors (EE-S G3M) FIG. 7.1. The camera head stepper motors are connected to a belt driven carriage FIG. 2.2. These motors, operating in half step mode with the 1.91" pitch diameter timing gear, create 0.015 inches of camera head motion along the linear rail per motor step. In other words, the camera head can be positioned anywhere along the linear rail in 0.015" increments. The trigger mark detector motor is also operating in half step mode but it is connected to a 1.146" pitch diameter timing gear. This arrangement yields a 0.009 inch step size for the trigger mark detector positioning.

The task of the lateral position card FIG. 7.1 is to provide positioning information to the top camera head and bottom camera head stepper drivers. The two camera heads operate independently of one another. It also provides positioning information to the trigger mark detector stepper driver. Included in the information is compensation for print positional changes with respect to the center of the roller stand. Positioning information includes: step motor pulses, motor direction signals, and motor torque signals.

The lateral position control software requires initialization information from the operator workstation and the image processor. The operator workstation provides: roller stand center dimensions, the number of ink zones, and the width of an ink zone. The image processor sends a scan map FIG. 5.1. The map defines the pattern in which the camera heads will scan the actual printed color bar.

The card is located in the camera control processor on the remote I/O bus FIG. 3.5. An 8 bit Hitachi HD647180 microprocessor controls the card. External to the microprocessor are, 32 Kbytes of 62256 RAM (Random Access Memory), and 32Kbytes of 27256 ROM (Read Only Memory), for program and data storage. Communications to the card is via a RS-485 interface.

The stepper motor system requires a method of accelerating the camera head mass up to a constant speed and decelerating the mass back to zero speed. This is accomplished by step motor pulses that are provided to the two camera head stepper motor drivers by two Cybernetics CY545B stepper controller devices. The devices are programmed by the control software to provide suitable running and ramping characteristics. Motor direction signals are also generated by the CY545B devices.

The trigger mark detector motor step pulses are not ramped as are the step pulses to the camera head stepper motors. Motor step pulses and a motor direction signal to the trigger mark detector stepper motor driver are achieved by latching HD647180 data bus bits via a 74HC573 octal latch. Essential to the design of a stepper motor system is a means for providing high and low torque conditions to the motors. This is accomplished by latching the HD647180 data bus as torque signals, for all three stepper motor drivers, via a 74HC573 octal latch.

All step pulses, direction signals, and torque signals are buffered before exiting the card. The step pulses and direction signals are buffered through an open collector 74LS641 octal transceiver. The torque signals are buffered by a Texas Instruments open collector SN7407N buffer.

The motion of both camera heads and the trigger mark detector are limited by limit sensors 46 FIG. 2.2. The limit sensors on the left side of the press are referred to as home sensors. The camera head limit sensors are tied directly to the HD647180 and to the CY5454B devices. The trigger mark detector assembly limit detectors are tied directly to the HD647180. Lateral motion is inhibited anytime a camera head or trigger mark detector activates the limit sensor.

Edge Detector Feedback:

A key feature of the invention is the reliability of the stepper system to compensate for the lateral print positional variations quickly enough such that each image acquired is of the desired color patch. Three factors cause lateral print position variations. As the print is applied to the web, it may not be centered on the web. Also, as the web travels through the roller stand, it weaves laterally with an unpredictable magnitude and frequency. The web also shrinks in width due to being stretched and losing moisture from being heated by ovens.

Two types of information, obtained asynchronously from the edge detector system, are used by the lateral positioning card in compensating for print position variations. The first type is referred to as lateral offset. This is the offset of the center of the print from the center of the roller stand. The second type of information is referred to as step factor which is derived from the web shrinkage factor. The step factor is used to mathematically create a smaller motor step size in order to compensate for the print shrinkage. It represents the lateral distance of the print before shrinkage which will be traversed by the physical motion of the camera head after print shrinkage has occurred. Physically, one step of a camera head stepper motor always results in 0.015" of lateral movement. Prior to web shrinkage, 0.015" of the original print is being traversed by one motor step. As the paper shrinks, one physical step of the camera head motor will traverse more than 0.015" of the print prior to shrinkage.

Because lateral offset compensation is identical for the two camera heads and the trigger mark detector, only the top camera head will be detailed. There are two variables in the control software which are used to manipulate lateral offset. The first, called new_offset, keeps track of the most recently received lateral offset from the edge detector system. The second, named top_step_offset, represents the distance of the camera head from center of the roller stand to which lateral offset was last corrected. Each time a new lateral offset is received, the control software calculates the number of steps and direction to move the camera heads and trigger mark detector based upon the difference of the two variables. Using the number of steps, the top_step_offset variable is updated to reflect the current distance of the camera head from center. It is calculated as follows: top_step_offset Â=number of steps*step size, to within Â one half the distance of one step from the new_offset dimension. Because of the small size of lateral offset, web shrinkage is negligible and is ignored. If a camera motion is not currently being made the offset is corrected immediately. If a camera motion is being made, the offset is added or subtracted to the end of the current move.

During the development of the invention, it was determined that web shrinkage is linear from the center of the web toward the edges. This implies that there is no change in the position of the print due to web shrinkage at the center of the web and maximum change at the edges.

To compensate for shrinkage, the control software replaces the step size prior to shrinkage with the step factor in the calculation of the number of steps to move a given distance: number of steps=distance/step factor. It is seen that an increasing step factor in the equation decreases the number of steps to move a distance.

There is, inherent in physical constraints of a stepper motor, an error induced into the positioning of the camera heads and trigger mark detector. That error will be called the physical positioning error. The step size is not directly divisible into distance of the move. In other words, there is a fractional difference between the distance a stepper motor can move the camera heads or trigger mark detector and the distance they need to move. That fractional difference is stored in an error variable each time a movement is made. When the fraction accumulates in magnitude equal to a step of the motor, it is added to the next move and one step of motion is subtracted from the error variable. This insures that positioning is never off by more than a single step due to constraints of the stepper motor.

Description of Lateral Positioning:

There are two methods of initiating lateral positioning of the camera heads. One is by commands received from the operator workstation. The other is by hardware interrupt from the camera timing card FIGS. 3.2, 7.3, 7.4, 7.5, 7.6. A lateral position variable in the control software keeps track of the x dimension of the camera heads and the trigger mark detector. The x dimension is referenced to a home limit sensor located on the left side of the linear rail FIG. 2.2 which acts as a home position.

Because the positioning of the top and bottom camera heads are identical to one another, the operation of only one is described below.

There are three commands from the image processor which cause lateral positioning of the camera heads to an x dimension. Those commands are: Move to Center, Move to X, and Move to Patch. Upon receipt of any of these commands, the control software calculates the number of steps required to move the camera head or trigger mark detector from its current x dimension to the new x dimension. The position variable is updated during the calculation of steps. The number of steps is written to the CY545B, in the case of positioning a camera head, or to a 74HC573 latch, in the case of positioning the trigger mark detector. During movement of a camera head stepper motor, an active low busy signal is provided to the camera timing card FIG. 3.5. A Move to Home command issued by the operator workstation causes the camera head to move in the direction of the left side until the home detector is reached.

The image processor is expecting a response following a completion of a command to Move to Center or Move to Home. At the end of the move, the card responds to these commands by transmitting the current patch number which the camera head is located at. A response is also expected following a trigger mark detector Move to X command or move to home. Upon the completion of these commands, the card transmits the current x position of the trigger mark detector.

Upon receipt of a lateral scan command from the operator workstation, lateral motion of the camera head is initiated by an active low lateral move pulse I FIG. 3.3. The pulse is generated by the camera timing card. The lateral move pulse is connected to the HD647180 external interrupt INT1 (INT2 for the lower camera). Upon receipt of a lateral move pulse, the control software determines how many patches to move the camera head from the scan map. Using the number of patches to move, a look up table in the control software determines how many steps are required to move to the next patch. The physical positioning error is compensated for in another look up table. While the camera head is in motion, the active low busy signal is provided to the camera timing card in the camera control processor. This prevents another video acquisition from occurring during movement. After the camera head reaches its destination, the busy signal is driven high (inactive) and the card is ready for another lateral move pulse. When a camera head is positioned at the last patch of the scan map, it will loop back to the first patch in the map upon the next lateral move pulse. This process repeats until the controller is taken out of the scan mode by a lateral stop command issued by the operator workstation.

Infeed and Roller Stand Edge Detector Position Calibration

Upon installation of the invention on the press, a calibration procedure must be performed on the infeed and roller stand edge detectors. The purpose of the calibration procedure is to determine the distance from each home detector to the center of the press and the distance between the two home detectors. The calibration procedure is required because the infeed edge detector assembly FIG. 3.10 is a retrofit to the press and its position relative to the center of the press is not defined. Since the procedure is identical at both locations only one will be described.

To perform the calibration, a calibration bar FIG. 7.2 of known length is secured to the infeed edge detector assembly at the center of the press. The processor and memory card must be put into calibration mode by use of a switch on the card. At reset, the two edge detectors locate their respective home sensors, then locate the calibration bar. An LCD (liquid crystal display) on the processor and memory card will display the distance from the left and right home detectors to the center of the calibration bar. Those numbers are manually entered into the image processor as part of the installation procedure.

What is claimed is:

1. In a press for printing multicolored data from inking units onto a web as same is fed through the press, the data including a plurality of spaced-apart control bars made up of color patches from a respective one of the inking units, extending across the width of the paper and wherein means are provided to control the amount of ink fed from the inking units onto the web, a system for establishing and/or maintaining the density of the colored inks put down on the moving web comprising: scanning means including, strobe means for illuminating a color patch in the color bar, camera means to photograph the color patch, and, drive means for moving the strobe means and camera means, incrementally transversly across the web;

means to capture an image of the patch that includes means to enable and disable the camera means;

means for timing the actution of the scanning means;

means for determining the density of the color patch photograph;

means for calculating the amount of adjustment of the ink control required to maintain the density of the color patch photograph;

means for effecting adjustment of the ink control required to maintain the density of the color patch photographed;

means for effecting adjustment of the ink control means;

edge detectors for detecting web lateral movement or distortion;

means to adjust lateral motion of the scanning means based on a signal received from the edge detectors; and, software process control means for the scanning, timing, actuation, density determining, ink adjustment calculating, ink adjustment control and lateral web motion detection means.

2. The invention defined by claim 1 wherein the camera means comprises a red, green and blue charge coupled device camera for reading printed color bar patches.

3. The invention defined by claim 1 wherein the timing means includes an electro-optical sensor for sensing a printed trigger mark and microprocessor means to control the actuation of the strobe means and the camera means and lateral motion of the scanning means upon receipt of a signal from the electro-optical sensor when a trigger mark is sensed on the moving web.

4. The invention defined by claim 3 wherein the timing means further includes a rotary optical encoder mechanically coupled to the movement of the web which provides after each trigger mark a specific count of signal pulses to the microprocessor means for precise synchronization of the scanning means with the position of the printed color bar on the moving web.

5. The invention defined by claim 1 wherein the timing means includes a microprocessor means to control activation of the scanning means and wherein the density determining means includes an ink density digital computer means for computing ink density based on a signal sent from the camera means.

6. The invention defined by claim 1 wherein the calculating means includes an operator workstation digital computer means to effect adjustment of the ink control means via a command signal sent from the operator workstation digital computer means and based on signals received from sn ink density digital computer means.

7. The invention defined by claim 1 wherein the means for detection of the web lateral movement further includes: said edge detectors for detecting web lateral position, web shrinkage, web distortion (scalloped edges, tears), and the position of a printed image on the web; and microprocessor means to adjust lateral position of the scanning means, based on a signal received from the edge detectors, in order to maintain the proper lateral alignment between the scanning means and a color bar patch.

8. The invention defined by claim 7 comprising microprocessor means for interpreting lateral web data and control of the drive means for the strobe means and camera means lateral positioning.

9. The invention defined by claim 1 wherein the software process control means further comprises means that include: software process control means for actuation of the strobe means and camera means; software process control means for the strobe and camera image capture means; software process control means for lateral positioning of the scanning means; software process workstation control means; software process infeed control means for detecting web lateral movement; software process control roller stand means for detecting web lateral movement; and, software process control for the ink density control means.

10. The invention defined by claim 9 wherein the software process control means for actuation of the strobe means and camera means further comprises software means for implementing functions for controlling: trigger mark sensor and means for precise synchronization of the scanning means with the position of the printed color bar on the moving web.

11. The invention defined by claim 9, wherein the software process control means for the strobe and camera image capture means further comprises software means for implementing functions for controlling: frame grabber board; and enabling and disabling of a camera patch image capture process.

12. The invention defined by claim 9, wherein the software process control means of lateral position of the scanning means further comprises software means for implementing functions for controlling a lateral position scanning process.

13. The invention defined by claim 9, wherein the software process workstation control means further comprises software means for implementing functions for controlling: setup of bar patch layout, patch map; and issuing ink fountain control commands to the ink control means.

14. The invention defined by claim 9, wherein the software process control infeed means for detecting web lateral movement further comprises software means for implementing functions for controlling: web lateral movement detection; web distortion detection; and, image position detection.

15. The invention defined by claim 9, wherein the software process roller stand control means for detecting web lateral movement further comprises software means for implementing functions for controlling: web lateral movement detection; web distortion detection; and, image position detection.

16. The invention defined by claim 9, wherein the software process control of ink density control means further comprises software means for implementing functions for controlling RGB value (red, green, blue) conversion to ink density, ink density evaluation, and ink density correction.

* * * * *